United States Patent
Byeon et al.

(10) Patent No.: US 8,851,695 B2
(45) Date of Patent: Oct. 7, 2014

(54) DISPLAY APPARATUS

(75) Inventors: Jonghyun Byeon, Seoul (KR); Moungyoub Lee, Seoul (KR); Yunjoo Kim, Seoul (KR); Sangdon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 13/281,682

(22) Filed: Oct. 26, 2011

(65) Prior Publication Data

US 2012/0106048 A1     May 3, 2012

Related U.S. Application Data

(60) Provisional application No. 61/407,919, filed on Oct. 29, 2010.

(30) Foreign Application Priority Data

Oct. 27, 2010   (KR) .................. 10-2010-0105548
Oct. 27, 2010   (KR) .................. 10-2010-0105569

(51) Int. Cl.
    G09F 13/04    (2006.01)
    H04N 5/645    (2006.01)
    G02F 1/1333   (2006.01)
    H04N 5/64     (2006.01)

(52) U.S. Cl.
    CPC ............ *H04N 5/645* (2013.01); *G09F 13/0413* (2013.01); *G02F 1/133308* (2013.01); *H04N 5/64* (2013.01)
    USPC ....... 362/97.2; 349/58; 361/679.01; 362/632; 362/633

(58) Field of Classification Search
    CPC ............. G02F 1/133308; G02F 1/133602; G02F 1/133608; G09F 13/18; G09F 13/0413
    USPC .......... 362/97.1, 97.2, 632–634; 361/679.01; 349/58
    See application file for complete search history.

(56) References Cited

U.S. PATENT DOCUMENTS

| 7,940,347 B2* | 5/2011 | Ono et al. ................. 349/58 |
| 2012/0062815 A1* | 3/2012 | Kim et al. ................. 349/61 |

FOREIGN PATENT DOCUMENTS

| KR | 10-2008-0068329 A | 7/2008 |
| KR | 10-2010-0050446 A | 5/2010 |
| KR | 10-2010-0071892 A | 6/2010 |
| KR | 10-2010-0094159 A | 8/2010 |

OTHER PUBLICATIONS

International Search Report dated May 25, 2012 issued in Application No. PCT/KR2011/008103.

* cited by examiner

*Primary Examiner* — Stephen F Husar
(74) *Attorney, Agent, or Firm* — Ked & Associates, LLP

(57) ABSTRACT

A display device includes a display panel including a front substrate and a back substrate, a backlight unit disposed in the rear of the display panel, and a plurality of brackets attached to a non-display area of a back surface of the display panel. Each of the plurality of brackets includes a first portion and a second portion positioned between the first portion and the back substrate. A width of the second portion is greater than a width of the first portion. The second portion is positioned adjacent to the back substrate.

20 Claims, 79 Drawing Sheets

DISPLAY APPARATUS

This application claims the benefit of Korean Patent Application Nos. 10-2010-0105548 and 10-2010-0105569 both filed on Oct. 27, 2010 and U.S. Provisional Application No. 61/407,919 filed on Oct. 29, 2010, which are incorporated herein by reference for all purposes as if fully set forth herein.

BACKGROUND OF THE INVENTION

1. Field of the Invention

Embodiments of the invention relate to a display device.

2. Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

In one aspect, there is a display device including a display panel including a front substrate and a back substrate, a backlight unit disposed in the rear of the display panel, and a plurality of brackets attached to a non-display area of a back surface of the display panel, each of the plurality of brackets including a first portion and a second portion positioned between the first portion and the back substrate, a width of the second portion being greater than a width of the first portion, the second portion being adjacent to the back substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
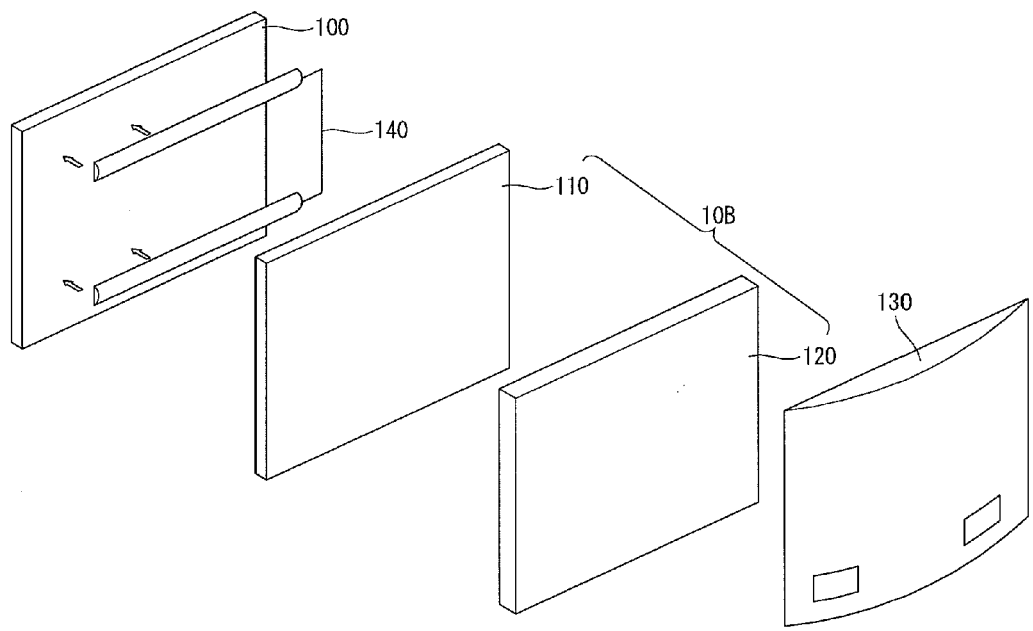
FIGS. 1 to 3 illustrate a configuration of a display device according to an example embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Hereinafter, a liquid crystal display panel is used as an example of a display panel. Other display panels may be used. For example, a plasma display panel (PDP), a field emission display (FED) panel, and an organic light emitting diode (OLED) display panel may be used.

Figure 2:
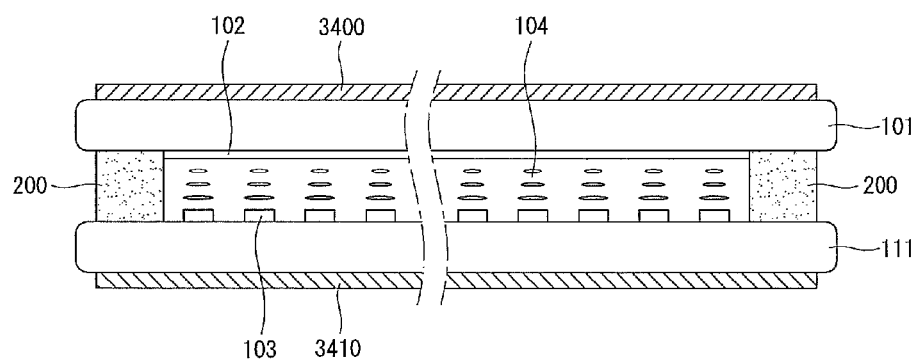
Figure 3:
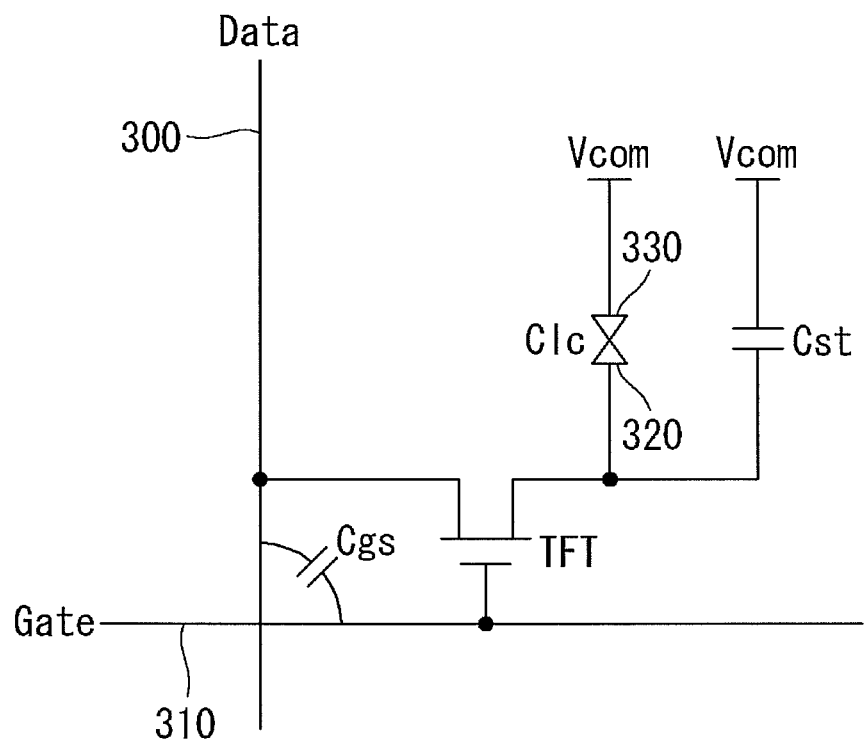

FIGS. 1 to 3 illustrate a configuration of a display device according to an example embodiment of the invention.

As shown in FIG. 1, a display device according to an example embodiment of the invention may include a display panel 100, a backlight unit 10B including an optical layer 110, a light source 120, a back cover 130, and a bracket 140.

Although not shown, the display panel 100 may include a front substrate and a back substrate that are positioned opposite each other. The bracket 140 may be attached to a back surface of the back substrate of the display panel 100.

The optical layer 110 may be fixed to the bracket 140. The optical layer 110 may include a plurality of sheets. For example, although not shown, the optical layer 110 may include at least one of a prism sheet and a diffusion sheet.

The backlight unit 10B may be positioned in the rear of the optical layer 110. Although not shown, the backlight unit 10B may further include a frame as well as the light source 120. In the embodiment disclosed herein, the backlight unit 10B includes the light source 120, the optical layer 110, and the frame (not shown). However, the backlight unit 10B may include a light guide plate (not shown). Further, in the embodiment disclosed herein, the backlight unit may be used as the light source 120 and thus may indicate the light source 120. In other word, the backlight unit 10B may be referred to as the light source. The configuration of the backlight unit may be variously changed.

Various types of light sources 120 may be used in the embodiment of the invention. For example, the light source may be one of a light emitting diode (LED) chip and a LED package having at least one LED chip. In this instance, the light source may be a colored LED emitting one of red, green, and blue light or a white LED.

The back cover 130 may be positioned in the rear of the backlight unit 10B. The back cover 130 may protect the backlight unit 10B and the optical layer 110 from the outside.

The optical layer 110 may be closely attached to the display panel 100. Alternatively, the backlight unit 10B may be closely attached to the optical layer 110. In this instance, a thickness of the display device according to the embodiment of the invention may be reduced.

As shown in FIG. 2, the display panel 100 may include a front substrate 101 and a back substrate 111, that are positioned opposite each other and are attached to each other to form a uniform cell gap therebetween. A liquid crystal layer 104 may be formed between the front substrate 101 and the back substrate 111. A seal part 200 may be formed between the front substrate 101 and the back substrate 111 to seal the liquid crystal layer 104.

A color filter 102 may be positioned on the front substrate 101 to implement red, green, and blue colors. The color filter 102 may include a plurality of pixels each including red, green, and blue subpixels. Other configurations of the subpixels may be used for the pixel. For example, each pixel may include red, green, blue, and white subpixels. When light is incident on the color filter 102, images corresponding to the red, green, and blue colors may be displayed.

A predetermined transistor 103, for example, a thin film transistor (TFT) may be formed on the back substrate 111. The transistor 103 may turn on or off liquid crystals in each pixel. Thus, the front substrate 101 may be referred to as a color filter substrate, and the back substrate 111 may be referred to as a TFT substrate.

The display panel 100 may include a front polarizing film 3400 and a back polarizing film 3410. The front polarizing film 3400 may be positioned on a front surface of the front substrate 101 to polarize light passing through the display panel 100. The back polarizing film 3410 may be positioned on a back surface of the back substrate 111 to polarize light passing through the optical layer 110 positioned in the rear of the back substrate 111. In the embodiment disclosed herein, the front polarizing film 3400 may be referred to as a first front polarizing film, and the back polarizing film 3410 may be referred to as a second front polarizing film.

The liquid crystal layer 104 may be formed of a plurality of liquid crystal molecules, and the arrangement of the liquid crystal molecules may change in response to a driving signal supplied by the transistor 103. Hence, light provided by the backlight unit may be incident on the color filter 102 in response to the molecular arrangement of the liquid crystal layer 104.

As a result, the color filter 102 may implement red, green, and blue light, and thus a predetermined image may be displayed on the front substrate 101 of the display panel 100.

As shown in FIG. 3, each pixel of the display panel 100 may include data lines 300, gate lines 310 crossing the data lines 300, and the TFT 103 connected to crossings of the data lines 300 and the gate lines 310.

The TFT 103 supplies a data voltage supplied through the data lines 300 to a pixel electrode 320 of a liquid crystal cell Clc in response to a gate pulse from the gate lines 310. The liquid crystal cell Clc is driven by an electric field generated by a voltage difference between a voltage of the pixel electrode 320 and a common voltage Vcom applied to a common electrode 330, thereby controlling an amount of light passing through a polarizing plate. A storage capacitor Cst is connected to the pixel electrode 320 of the liquid crystal cell Clc and holds a voltage of the liquid crystal cell Clc.

Since the above-described structure and the above-described configuration of the display panel 100 are only one example, they may be changed, added, or omitted.

Figure 4:
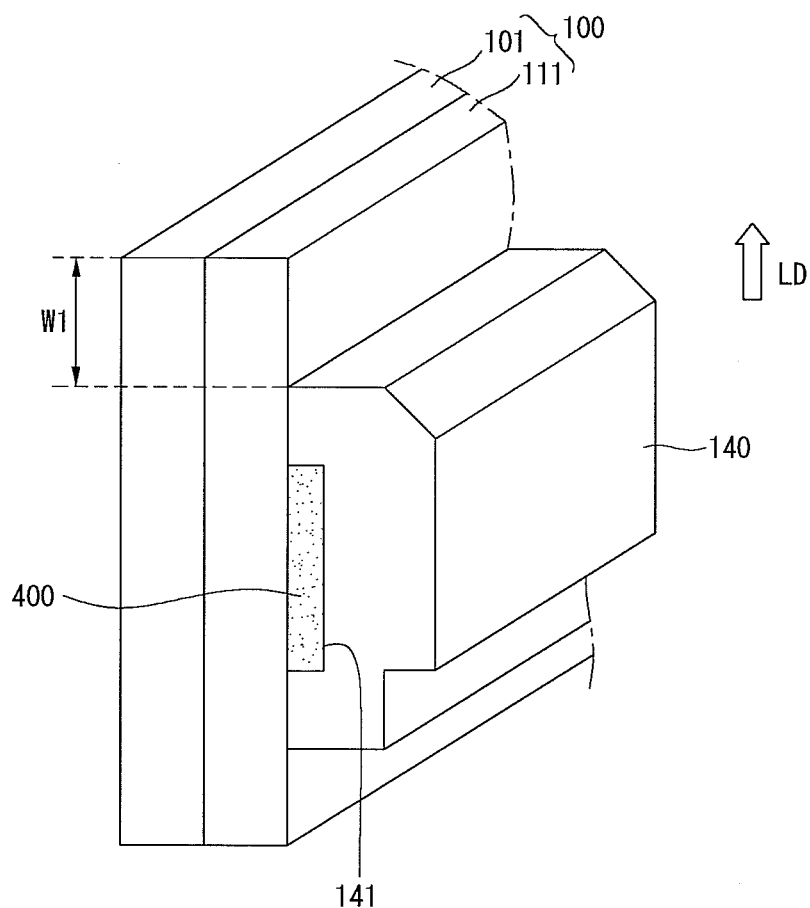
FIGS. 4 to 60 illustrate a display device according to an example embodiment of the invention.
Figure 60:
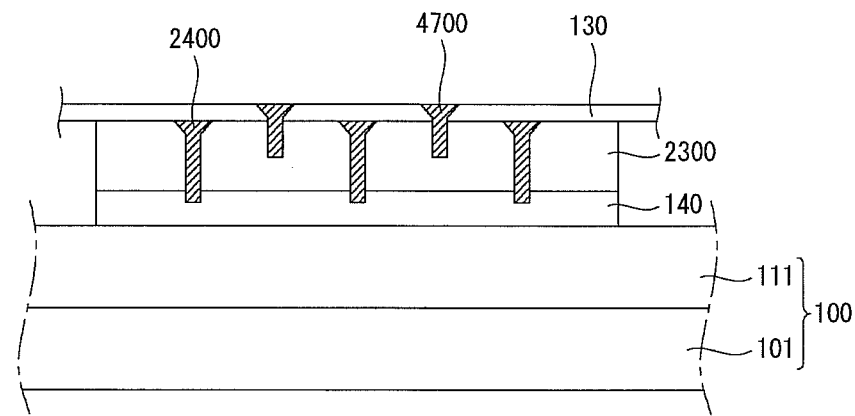

FIGS. 4 to 60 illustrate a display device according to an embodiment of the invention.

As shown in FIG. 4, an adhesive layer 400 may be formed between the back surface of the back substrate 111 of the display panel 100 and the bracket 140. The bracket 140 may be attached to the back surface of the back substrate 111 using the adhesive layer 400.

When the bracket 140 is attached to the back surface of the back substrate 111 using the adhesive layer 400, a supporting member such as a pem nut and a boss and a fastening member such as a screw are not used. Therefore, a fixing process may be simply performed, the manufacturing cost may be reduced, and the thickness of the display device may be reduced.

A groove 141 may be formed in one surface of the bracket 140 facing the back substrate 111, so as to improve an adhesive strength between the bracket 140 and the back substrate 111. It may be preferable that the adhesive layer 400 is formed in the groove 141. The groove 141 of the bracket 140 may be referred to as a first groove. In this instance, because the groove 141 may prevent from an adhesive material of the adhesive layer 400 from being discharged to the outside of the bracket 140, an attaching process may be easily performed.

When the bracket 140 is attached to the back surface of the back substrate 111, the display panel 100 may include a portion W1 extending further than the bracket 140 in a longitudinal direction of the display panel 100.

Figure 5:
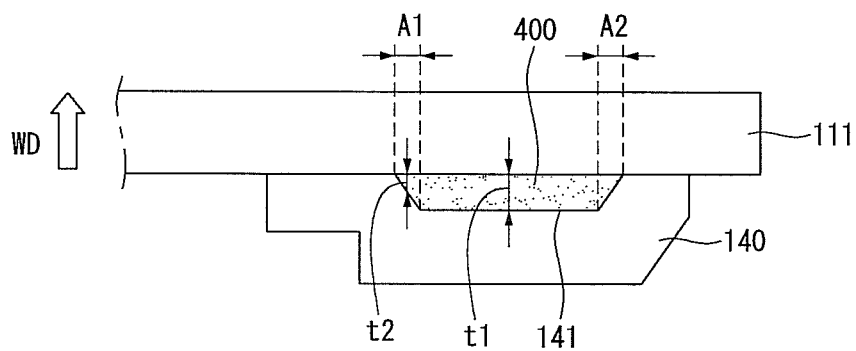

As shown in FIG. 5, the groove 141 may include portions having each a different depth.

More specifically, the groove 141 of the bracket 140 may include portions A1 and A2 each having a gradually decreasing or increasing depth in a width direction WD, so as to further improve the adhesive strength between the bracket 140 and the back substrate 111 while efficiently injecting the adhesive material of the adhesive layer 400 into the groove 141.

For example, a depth t1 of a middle portion of the groove 141 may be different from a depth t2 of an edge portion of the groove 141. A length of the groove 141 in the edge portion of the groove 141 may gradually decrease.

In other words, the adhesive layer 400 formed in the groove 141 may include portions having each a different thickness. For example, a width of a middle portion of the adhesive layer 400 may be greater than a width of an edge portion of the adhesive layer 400.

The bracket 140 may include a portion having different widths. More specifically, the bracket 140 may include a portion having different widths as measured in the longitudinal direction of the display panel 100, i.e., the horizontal direction. In other words, the bracket 140 may include a portion having a gradually deceasing width as the bracket 140 goes in the direction away from the display panel 100.

Figure 6:
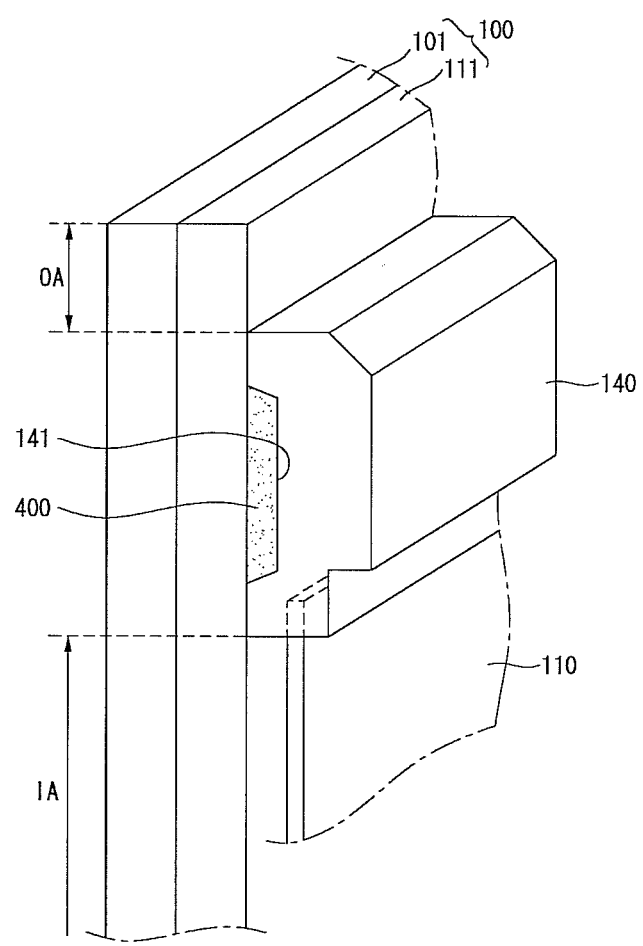

As shown in FIG. 6, the optical layer 110 may be positioned in an inner area IA of the bracket 140. The display panel 100 may extend in an outer area OA of the bracket 140.

Preferably, the optical layer 110 may be fixed to the bracket 140 in the inner area IA of the bracket 140. When the optical layer 110 is fixed to the bracket 140, a portion of the optical layer 110 may overlap the bracket 140. In other words, the portion of the optical layer 110 may be positioned inside the bracket 140 or contact the bracket 140.

Figure 7:
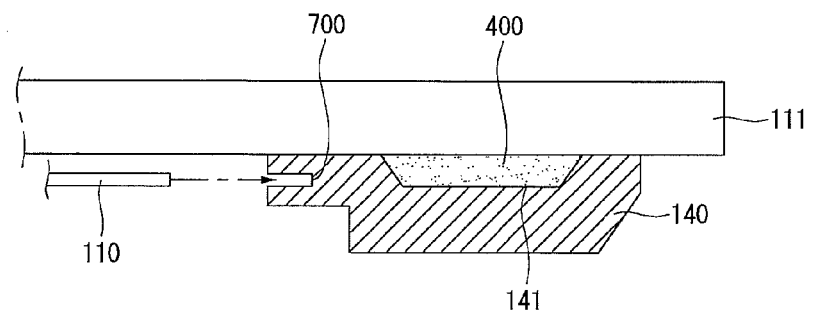

As shown in FIG. 7, a groove 700 may be formed in the bracket 140, so as to fix the optical layer 110 to the bracket 140. The optical layer 110 may be fixed to the bracket 140 by inserting the optical layer 110 into the groove 700. The groove 700 of the bracket 140 used to fix the optical layer 110 may be referred to as a second groove. The second groove 700 may be formed in the side of the bracket 140 and may be depressed in a direction parallel to the longitudinal direction of the display panel 100.

Figure 8:
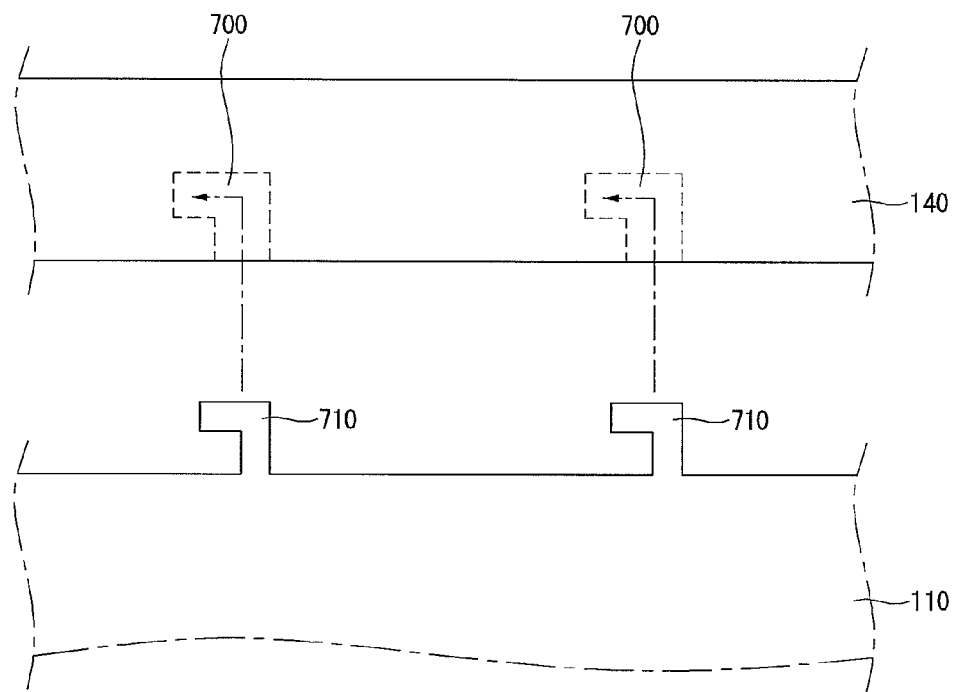

As shown in FIG. 8, the second groove 700 may have a hook shape, so as to improve a coupling strength between the optical layer 110 and the bracket 140. In this instance, a protrusion 701 corresponding to the second groove 700 may be formed in the optical layer 110. The optical layer 110 may be coupled with the bracket 140 by inserting the protrusion 701 into the second groove 700.

Figure 9:
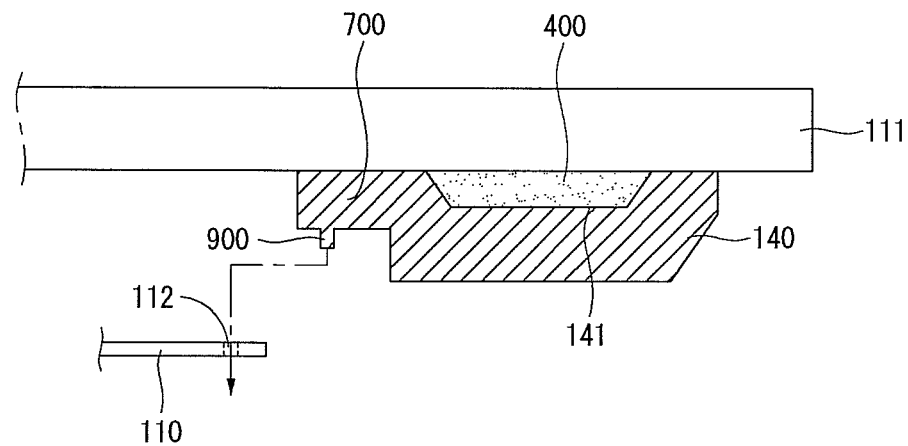

Alternatively, as shown in FIG. 9, a protrusion 900 may be formed in the bracket 140, a hole 112 may be formed in the optical layer 110, and the protrusion 900 of the bracket 140 may pass through the hole 112 of the optical layer 110. Hence, the optical layer 110 may be fixed to the bracket 140.

Figure 10:
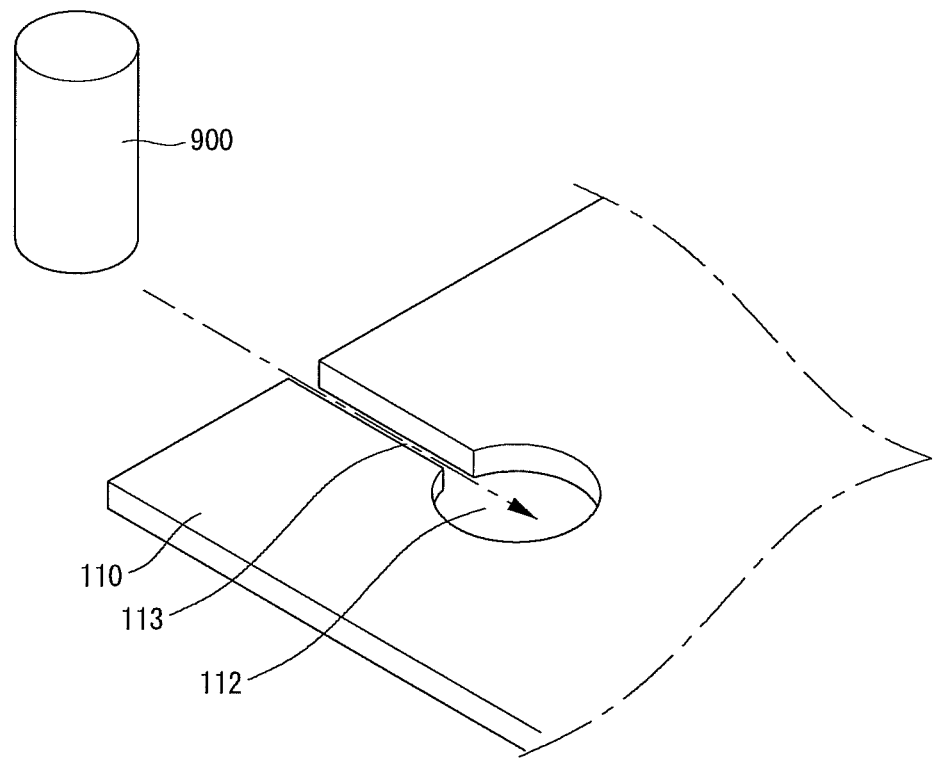

Alternatively, as shown in FIG. 10, the optical layer 110 may include a guide part 113 capable of passing through the hole 112 and the protrusion 900 of the bracket 140. The protrusion 900 of the bracket 140 may pass through the guide part 113 and may be positioned in the hole 112.

Figure 11:
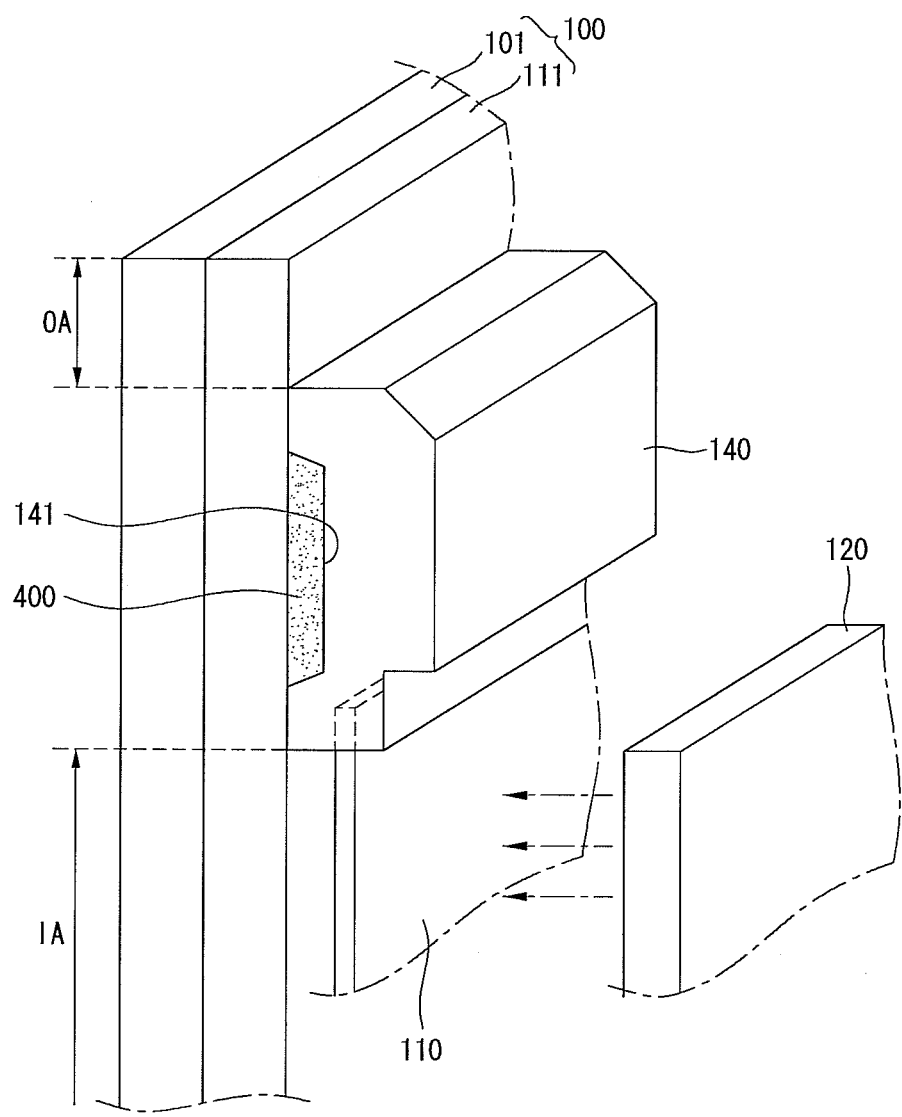

As shown in FIG. 11, the light source 120 may be positioned in the rear of the optical layer 110. The light source 120 may be a direct type light source and also may be an LED module including a plurality of LEDs and a substrate.

Figure 12:
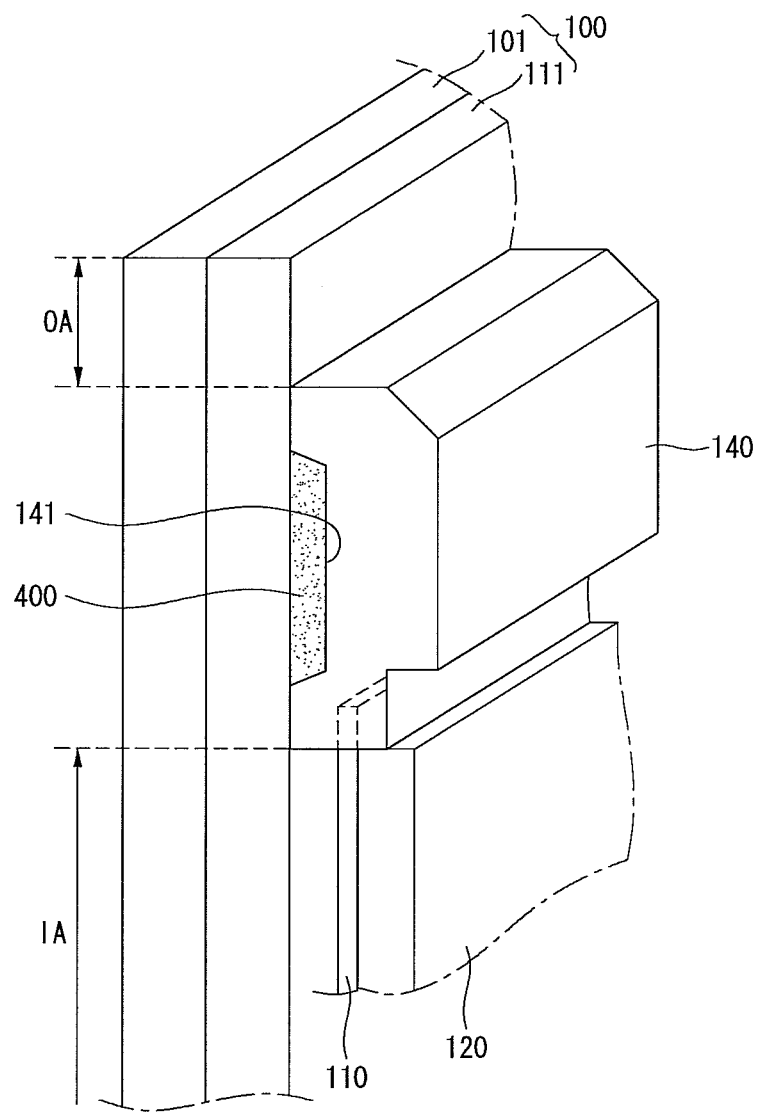

As shown in FIG. 12, the light source 120 may be attached to a back surface of the optical layer 110. For this, an adhesive layer (not shown) may be formed between the optical layer 110 and the light source 120.

Alternatively, unlike the structure illustrated in FIG. 12, the light source 120 may be separated from the optical layer 110 by a predetermined distance.

Figure 13:
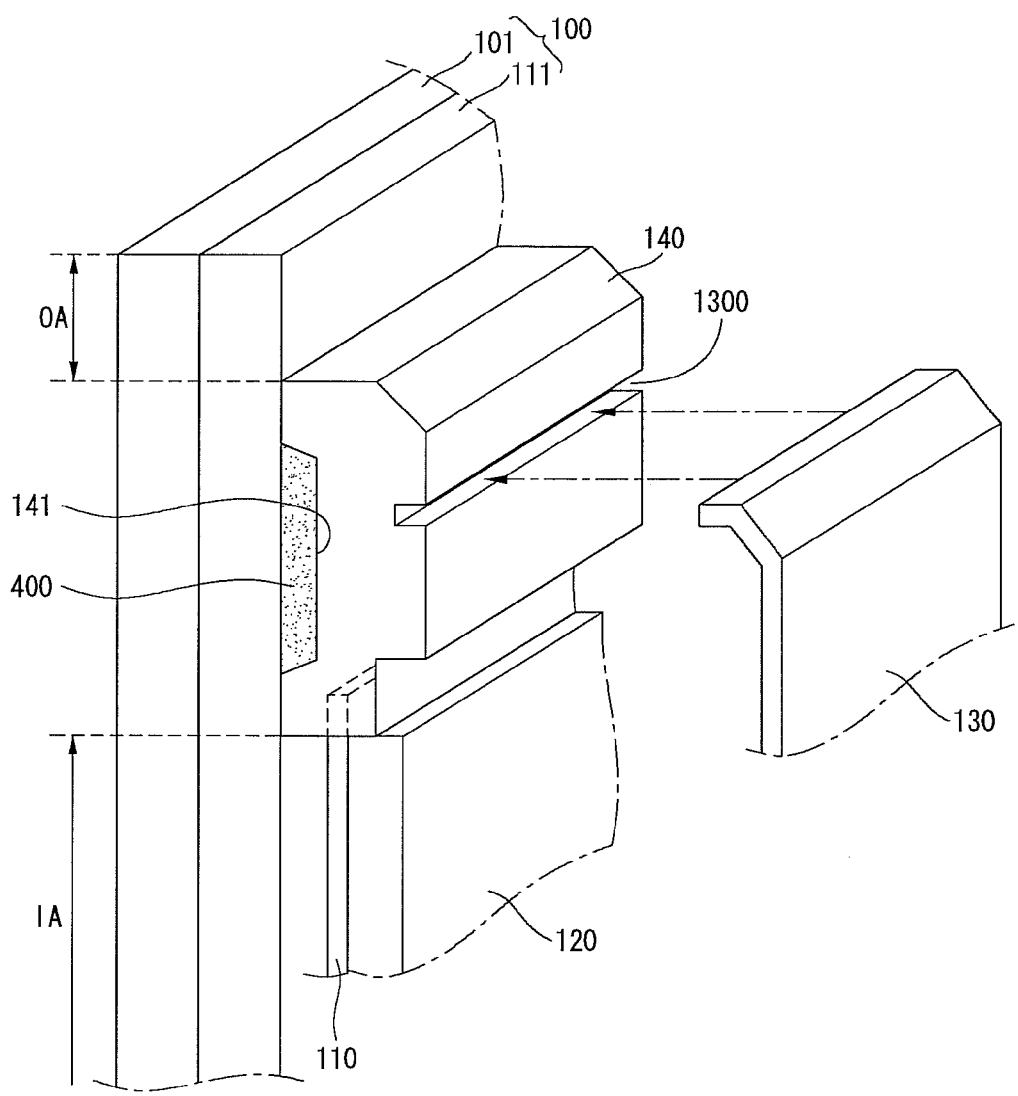

As shown in FIG. 13, the back cover 130 may be positioned in the rear of the backlight unit and may be fixed to the bracket 140. For this, a groove 1300 may be formed in the bracket 140 and may be depressed in a direction toward the display panel 100. The back cover 130 may be fixed to the bracket 140 by inserting an end of the back cover 130 into the groove 1300. The groove 1300 of the bracket 140 may be referred to as a third groove.

Figure 14:
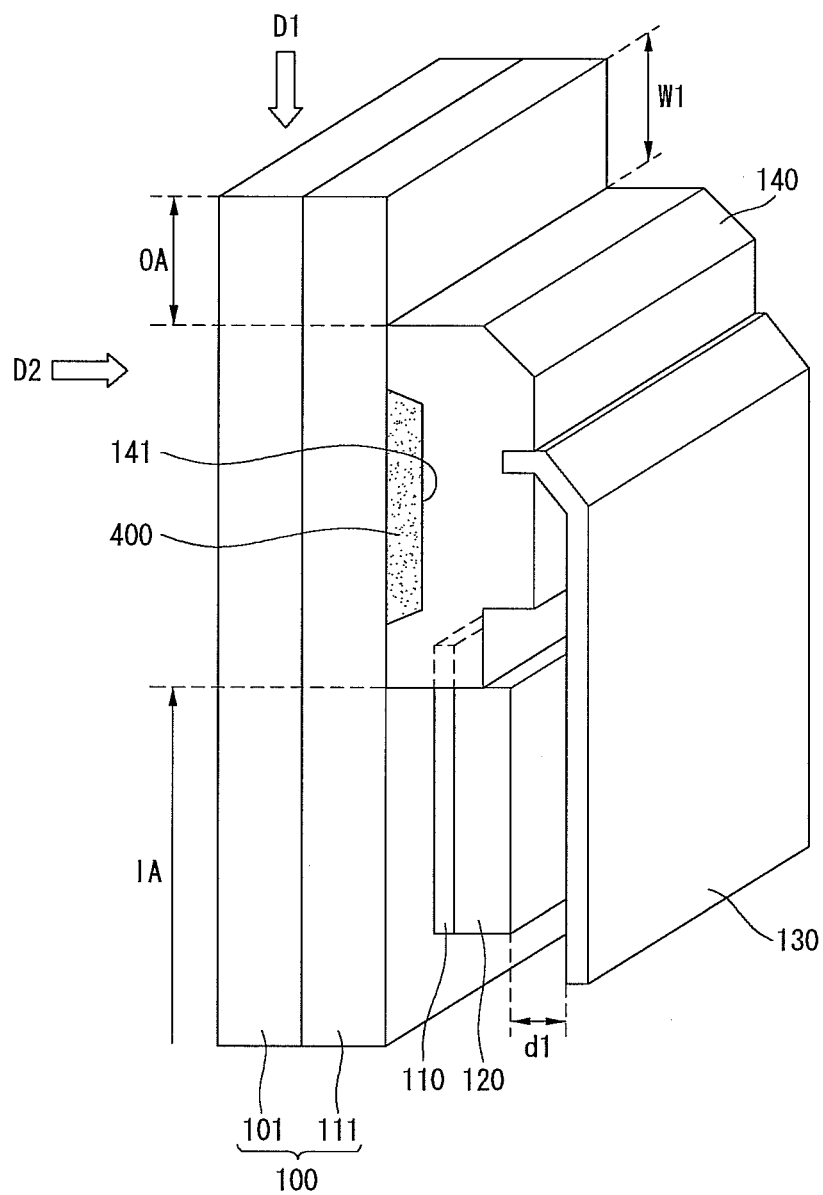

As shown in FIG. 14, when the back cover 130 is fixed to the bracket 140, the back cover 130 and the light source 120 (i.e., the back cover 130 and the backlight unit) may be separated from each other by a predetermined distance d1.

An edge of the front surface of the front substrate 101 or an edge of the side of the front substrate 101 may be exposed in a state where the back cover 130 is fixed to the bracket 140. The exposure of the edge of the front surface of the front substrate 101 may indicate that an edge of a front surface of the front polarizing film 3400 attached to the front substrate 101 is exposed.

The exposure of the edge of the front surface of the front substrate 101 may indicate that an observer can view the edge of the front surface of the front substrate 101 when the observer in the front of the display panel 100 views the front surface of the front substrate 101, i.e., when the observer in the front of the display panel 100 views the display panel 100 in a direction D2. The exposure of the edge of the side of the front substrate 101 may indicate that the observer can view the edge of the side of the front substrate 101 when the observer in the side of the display panel 100 views the front surface of the front substrate 101, i.e., when the observer in the side of the display panel 100 views the display panel 100 in a direction D1.

As above, when the edge of the front surface of the front substrate 101 or the edge of the side of the front substrate 101 is exposed after the back cover 130 is fixed to the bracket 140, the front substrate 101 may be formed of a tempered glass. In this instance, even if the edge of the front surface of the front substrate 101 or the edge of the side of the front substrate 101 is exposed, the front substrate 101 may be prevented from being damaged by an external impact.

Figure 15:
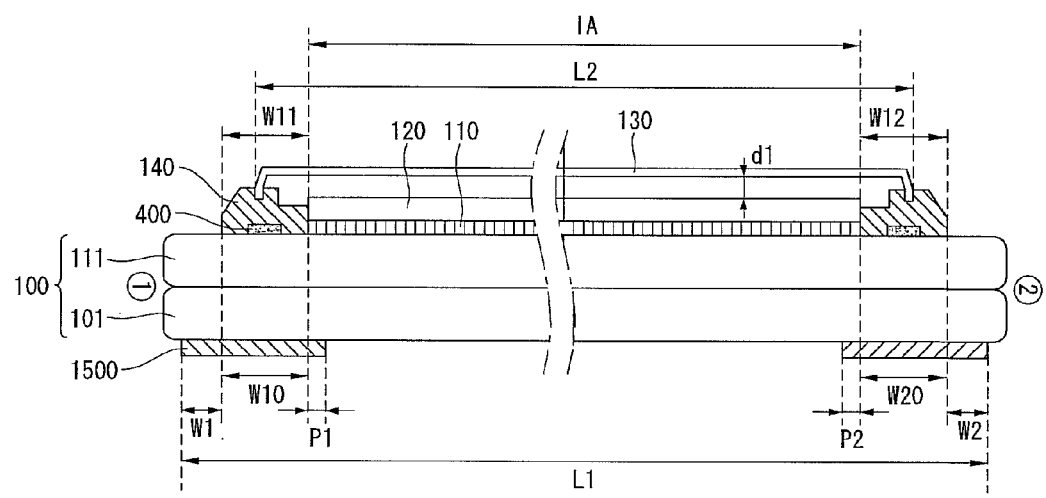

As shown in FIG. 15, a width L2 of the back cover 130 may be less than a width L1 of the display panel 100. In other words, the width L2 of the back cover 130 may be less than a width of at least one of the front substrate 101 and the back substrate 111 of the display panel 100.

In this instance, when the observer in the front of the display panel 100 views the display panel 100, the observer may observe almost the entire area of the display panel 100. Hence, an attractive appearance of the display panel 100 may be provided. Further, because another edge of the side of the display panel 100 may not be showed to the observer, a visual effect, in which the observer may feel that the screen size of the display panel 100 is greater than the real screen size of the display panel 100, may be obtained.

In this instance, the edge of the front surface of the front substrate 101 and the edge of the side of the front substrate 101 in each of an upper part (①) and a lower part (②) of the display panel 100 may be exposed.

It can be seen from FIG. 15 that the optical layer 110 is positioned in the inner area IA of the bracket 140.

A blocking member 1500 may be positioned at the edge of the front surface of the front substrate 101. Preferably, the blocking member 1500 may be attached to the edge of the front surface of the front substrate 101. Because the blocking member 1500 hides a dummy area positioned outside an active area of the display panel 100 on which an image is displayed, the image displayed on the active area may be more prominently showed.

The blocking member 1500 may have lightness lower than ambient lightness. For example, the lightness of the blocking member 1500 may be lower than lightness of the display panel 100. For this, the blocking member 1500 may be substantially black. For example, the blocking member 1500 may be substantially a black tape and may be formed by attaching a black tape to the front surface of the front substrate 101. Thus, the blocking member 1500 may be referred to as a black layer.

Figure 16:
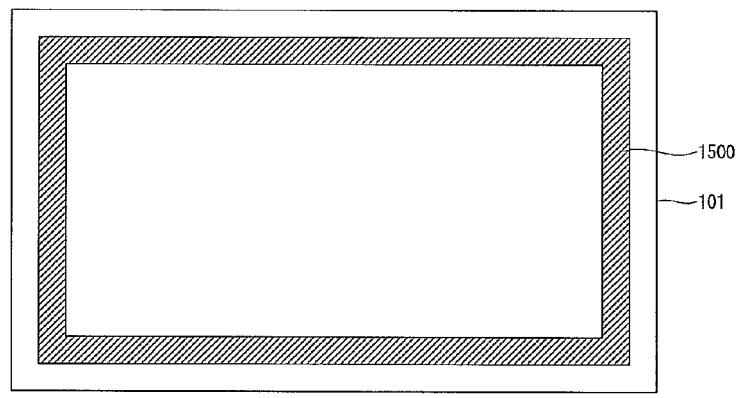

Because the blocking member 1500 is positioned on the front surface of the front substrate 101 and the edge of the front surface of the front substrate 101 is exposed, almost the entire portion of the blocking member 1500 may be exposed as shown in FIG. 16. In other words, when the observer in the front of the display panel 100 views the display panel 100, the observer may view almost the entire portion of the blocking member 1500. Namely, the observe may observe almost the entire portion of the blocking member 1500.

Because the bracket 140 does not display the image, it may be preferable that the bracket 140 is positioned in the dummy area outside the active area. Further, it may be preferable that the bracket 140 is hidden by the blocking member 1500. Hence, as shown in FIG. 15, the blocking member 1500 may overlap the bracket 140. Preferably, the bracket 140 may entirely overlap the bracket 140. More preferably, widths W10 and W20 of the blocking member 1500 may be greater than widths W11 and W12 of the bracket 140. In this instance, the blocking member 1500 may include portions P1 and P2 extending further than the bracket 140 in a middle direction of the front substrate 101. Further, the blocking member 1500 may include portions W1 and W2 extending further than the bracket 140 in the opposite direction of the middle direction of the front substrate 101.

The widths W10 and W20 of the blocking member 1500 and the widths W11 and W12 of the bracket 140 may be a width in a cross section of the display panel 100.

Figure 17:
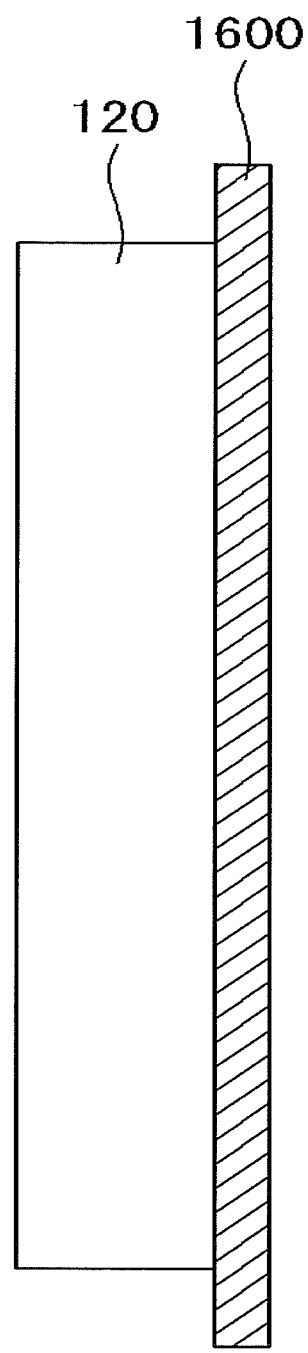

As shown in FIG. 17, a frame 1600 may be positioned in the rear of the light source 120. Namely, the backlight unit may further include the frame 1600. The frame 1600 may improve the structural stability of the backlight unit and the uniformity of light. Preferably, the frame 1600 may be attached to a back surface of the light source 120.

Figure 18:
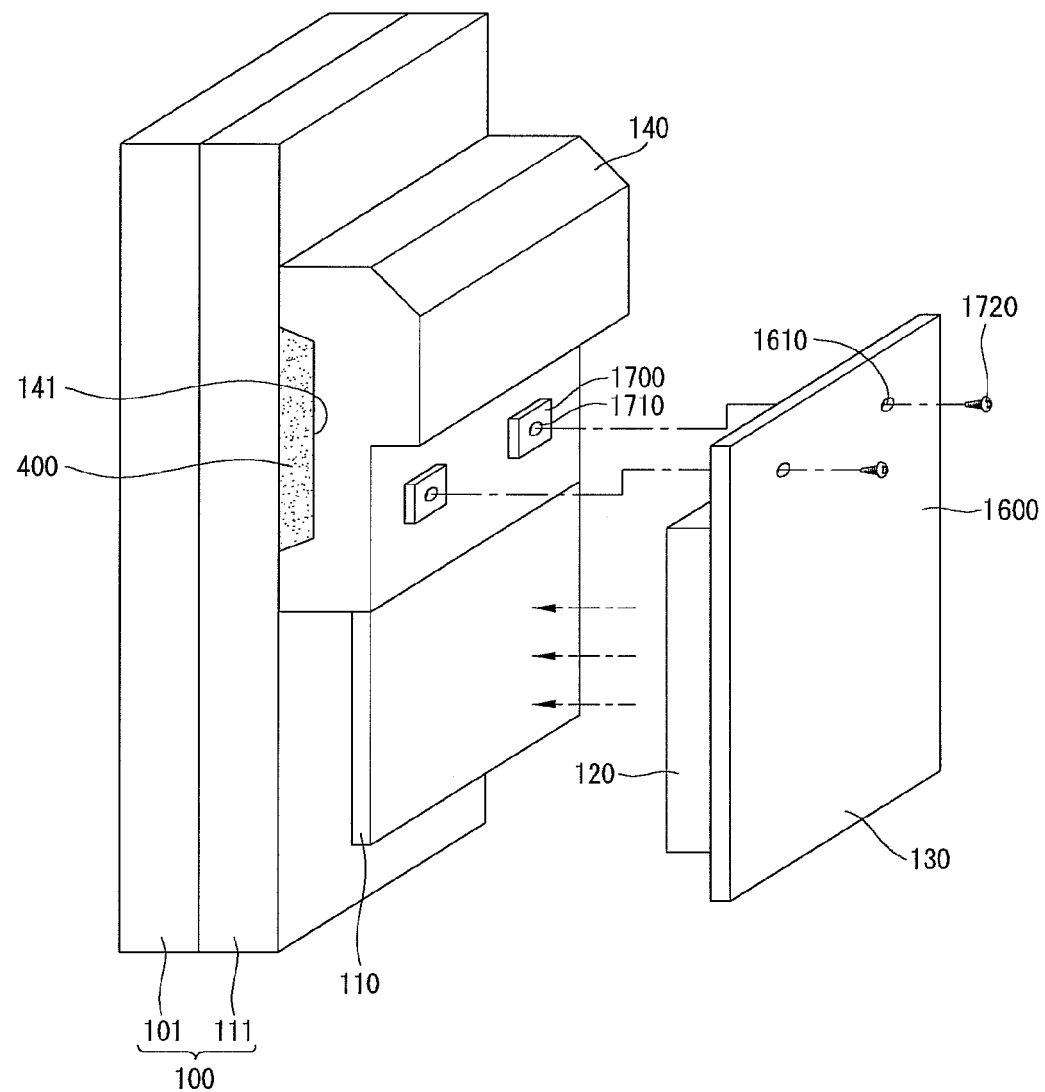

In this instance, the frame 1600 may be fixed to the bracket 140. More specifically, as shown in FIG. 18, a receiving part 1700 may be formed on the bracket 140, a coupling hole 1610 may be formed in the frame 1600, and a coupling member 1720 may pass through the coupling hole 1610 of the frame 1600. Hence, the coupling member 1720 may be fixed to the receiving part 1700 of the bracket 140. As a result, the frame 1600 may be fixed to the bracket 140.

Figure 19:
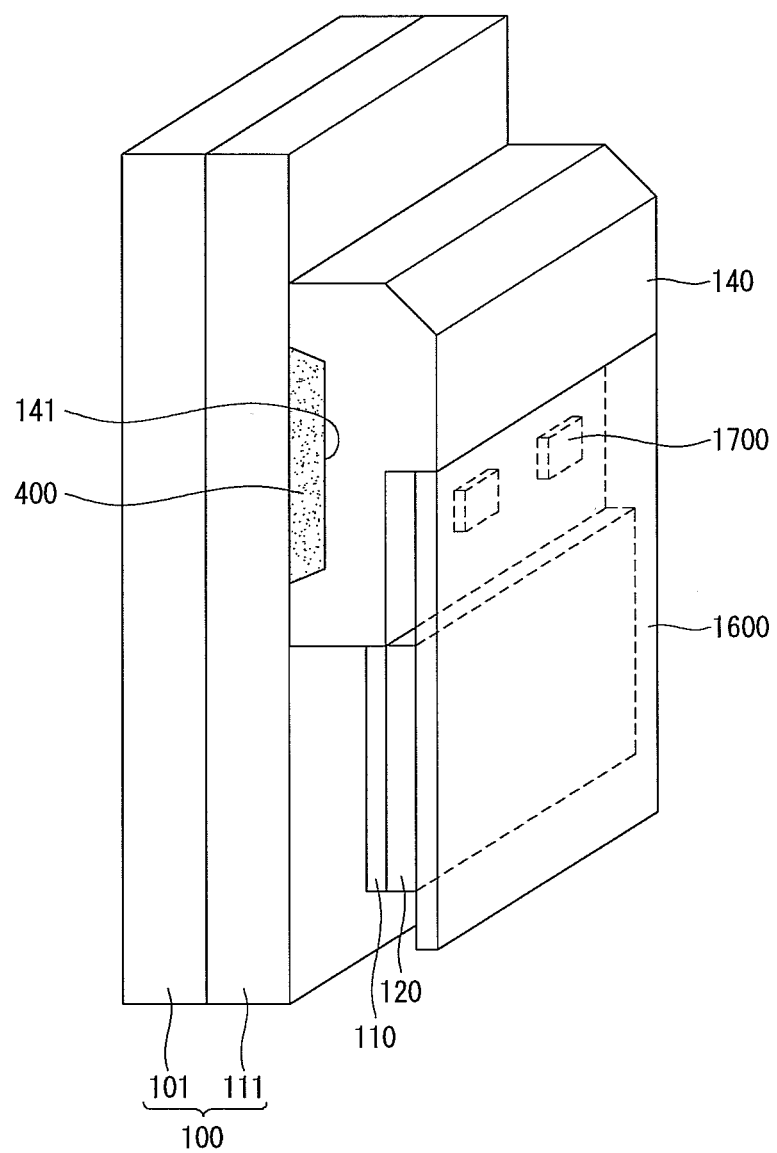

Even in this case, as shown in FIG. 19, the light source 120 and the optical layer 110 may be closely attached to each other.

Alternatively, unlike the structure illustrated in FIG. 19, the light source 120 and the optical layer 110 may be separated from each other.

When the frame 1600 is positioned in the rear of the backlight unit, the back cover 130 may be omitted.

Alternatively, when the frame 1600 is positioned in the rear of the backlight unit, the size of the back cover 130 may be reduced.

Figure 20:
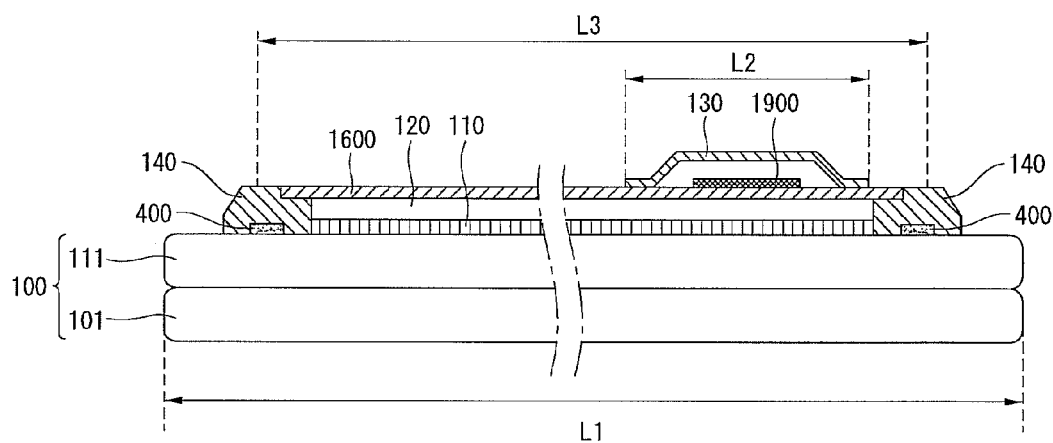

As shown in FIG. 20, the back cover 130 may be positioned on a portion of a back surface of the frame 1600. A driving board 1900 may be positioned between the back cover 130 and the frame 1600 to supply a driving signal to the display panel 100. In this instance, the width L2 of the back cover 130 may be less than a width L3 of the frame 1600. The width of the display panel 100, for example, the width L1 of the front substrate 101 may be greater than the width L2 of the back cover 130 and the width L3 of the frame 1600.

Figure 21:
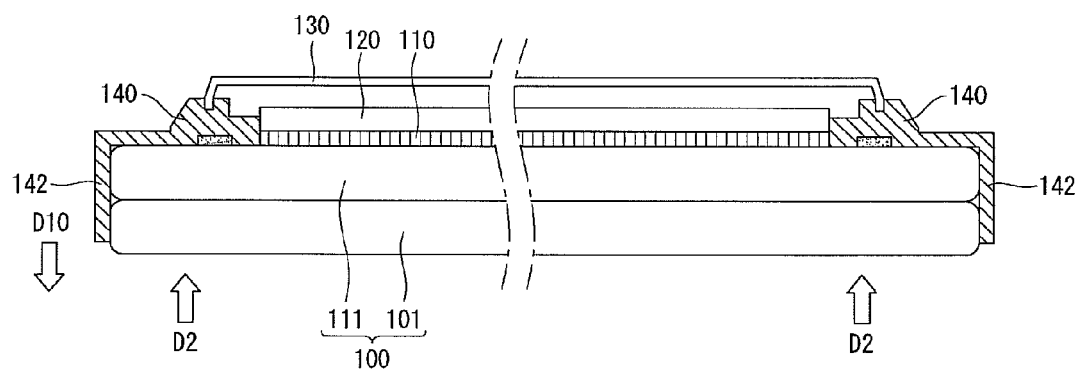

As shown in FIG. 21, the bracket 140 may extend to the side of the display panel 100. Hence, the bracket 140 may include a portion 142 positioned on the side of the display panel 100. For example, the bracket 140 may extend to the side of the back substrate 111 of the display panel 100 and thus may include a portion positioned on the side of the back substrate 111. Alternatively, the bracket 140 may extend to the side of the front substrate 101 of the display panel 100 and thus may include a portion positioned on the side of each of the front substrate 101 and the back substrate 111. In FIG. 21, "D10" indicates an extending direction of the bracket 140.

In this instance, the edge of the front surface of the front substrate 101 may be exposed, and the edge of the side of the front substrate 101 may not be exposed. Hence, the edge of the side of the front substrate 101 may be efficiently protected from the external impact.

As shown in FIG. 21, the fact that the edge of the side of the front substrate 101 is hidden by the bracket 140 may mean that when the observer in the side of the display panel 100 views the front surface of the front substrate 101, the observer may recognize that the entire side or the partial side of the front substrate 101 (or the entire side or the partial side of the back substrate 111) is hidden by the bracket 140.

In other words, the fact that the edge of the side of the front substrate 101 is hidden by the bracket 140 may mean that the bracket 140 overlaps the entire side or the partial side of the display panel 100 (for example, the entire side or the partial side of the back substrate 111 or the entire side or the partial side of the front substrate 101) in the longitudinal direction of the display panel 100.

Figure 22:
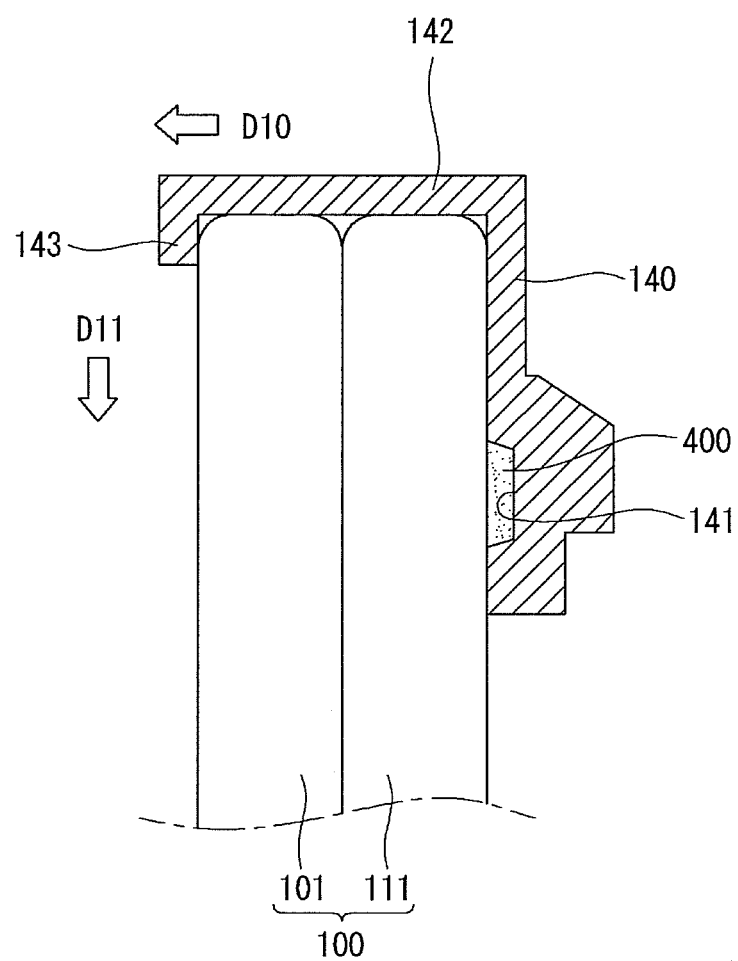

Further, as shown in FIG. 22, the bracket 140 may extend to the side of the display panel 100 and the front surface of the front substrate 101. Hence, the bracket 140 may include the portion 142 positioned on the side of the display panel 100 and a portion 143 positioned on the front surface of the front substrate 101. In FIG. 22, "D10" and "D11" indicate an extending direction of the bracket 140. In this instance, a portion of the edge of the front surface of the front substrate 101 may be hidden by the bracket 140, but almost the entire front surface of the front substrate 101 may be exposed.

Figure 23:
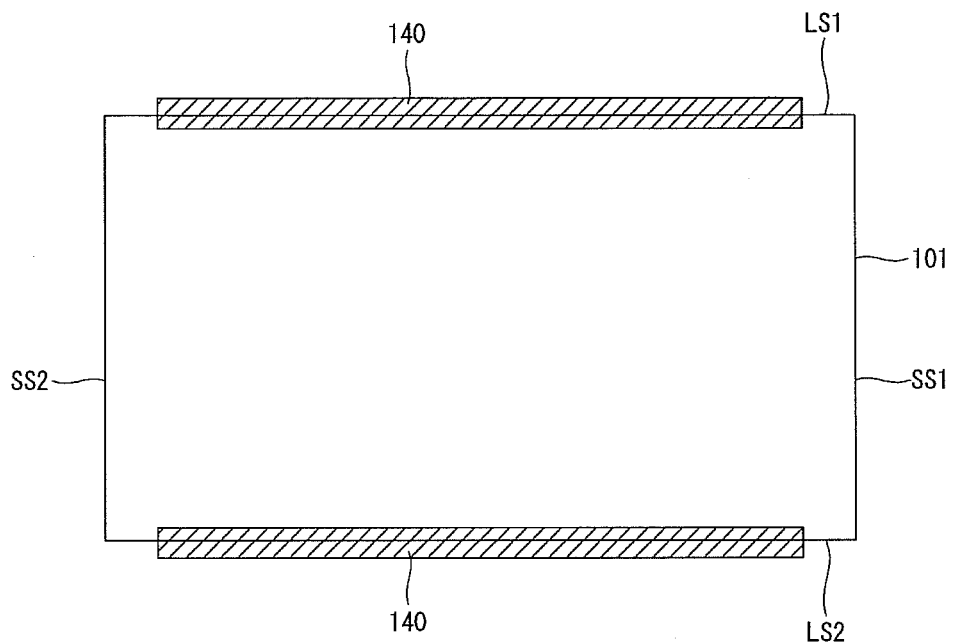

Even if the bracket 140 hides the portion of the edge of the front surface of the front substrate 101, the bracket 140 may not hide the entire edge of the front surface of the front substrate 101. For example, as shown in FIG. 23, the bracket 140 may hide a portion of an edge of each of a first long side LS1 and a second long side LS2 of the front substrate 101. However, edges of a first short side SS1 and a second short side SS2 of the front substrate 101 may be exposed.

Figure 24:
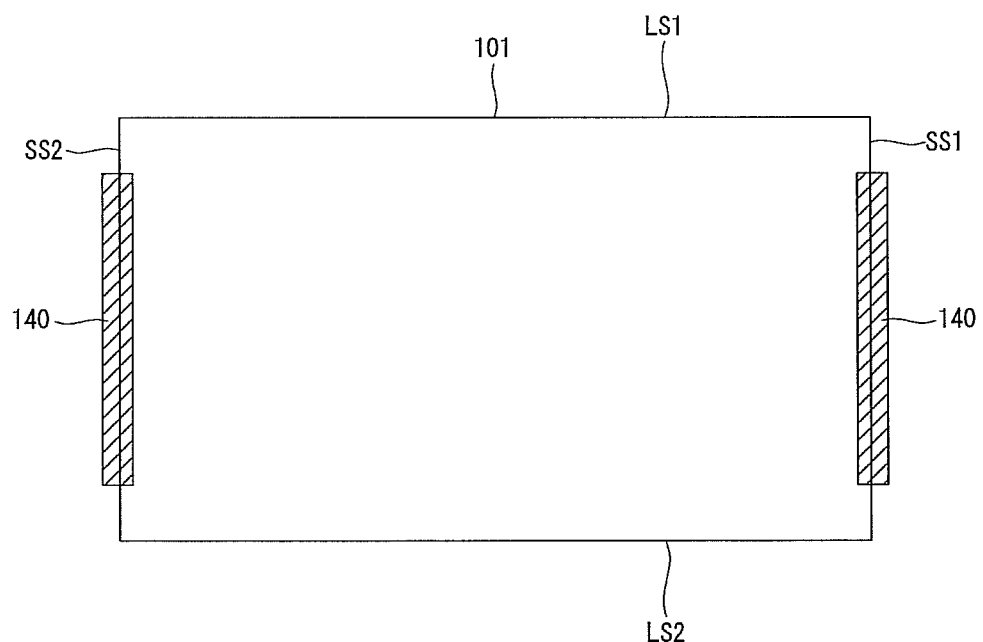

Alternatively, as shown in FIG. 24, the bracket 140 may hide a portion of the edge of each of the first short side SS1 and the second short side SS2 of the front substrate 101. However, the edges of the first long side LS1 and the second long side LS2 of the front substrate 101 may be exposed.

Figure 25:
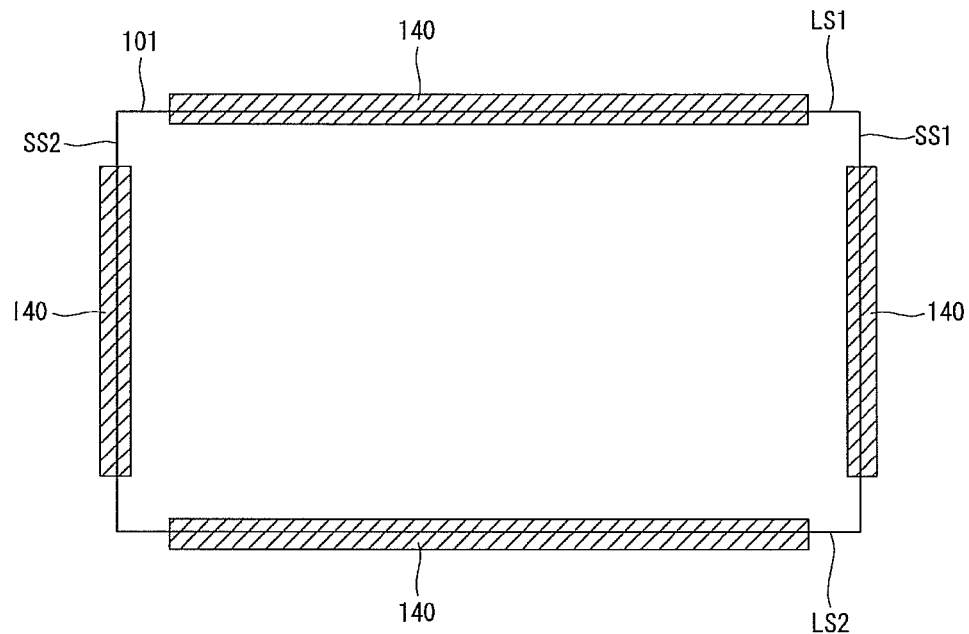

Alternatively, as shown in FIG. 25, the bracket 140 may hide a portion of the edge of each of the first long side LS1, the second long side LS2, the first short side SS1, and the second short side SS2 of the front substrate 101. However, even in this case, almost the entire front surface of the front substrate 101 may be exposed.

The above-described structure illustrated in FIGS. 22 to 25 may be applied to the structure of the display device in which an auxiliary bracket 2300 is added. Namely, the auxiliary bracket 2300 may replace the bracket 140 in the structure illustrated in FIGS. 22 to 25.

Figure 26:
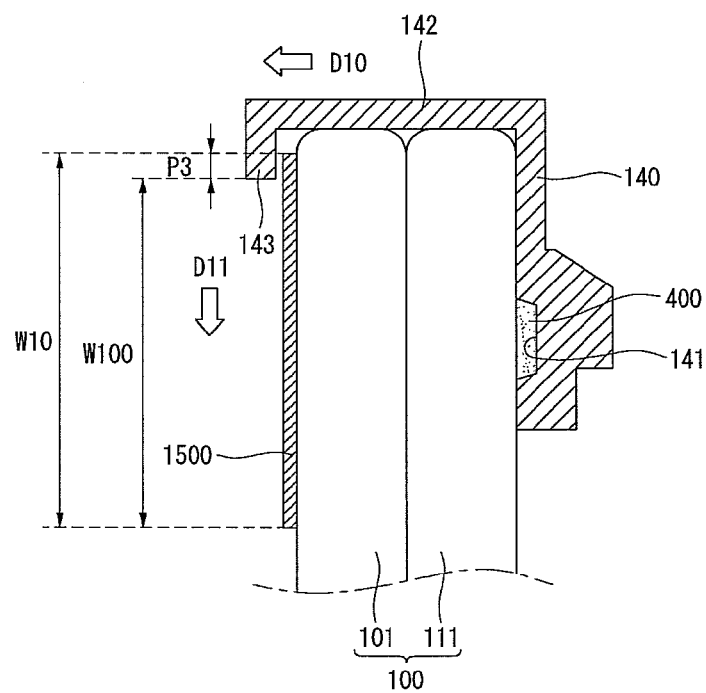

As shown in FIG. 26, when the bracket 140 extends to the front surface of the front substrate 101, the bracket 140 may include a portion P3 overlapping the blocking member 1500 on the front surface of the front substrate 101. In this instance, the bracket 140 may hide a portion of the blocking member 1500. The overlap portion P3 between the bracket 140 and the blocking member 1500 may contact the blocking member 1500.

Even when the bracket 140 hides the portion of the blocking member 1500, the size of the overlap portion P3 between the bracket 140 and the blocking member 1500 may be less than the size of a non-overlap portion between the bracket 140 and the blocking member 1500. For example, the size of the portion P3 of the blocking member 1500 hidden by the bracket 140 may be less than the size of a portion W100 of the blocking member 1500 that is not hidden by the bracket 140 and is exposed.

Figure 27:
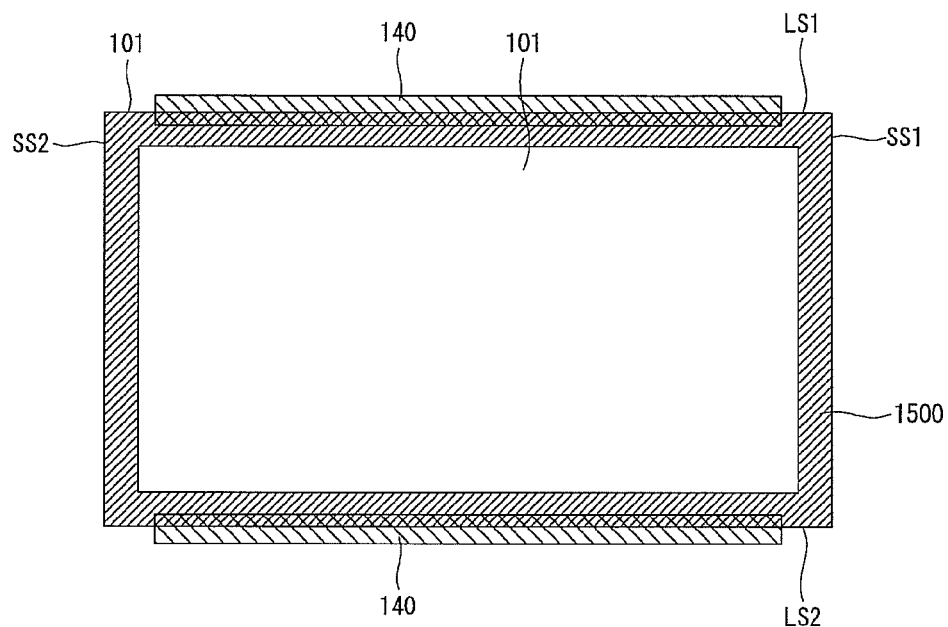

Further, as shown in FIG. 27, the bracket 140 may hide a portion of the blocking member 1500 in the first long side LS1 and the second long side LS2 of the front substrate 101. However, the blocking member 1500 may not be hidden by the bracket 140 and may be exposed in the first short side SS1 and the second short side SS2 of the front substrate 101.

Figure 28:
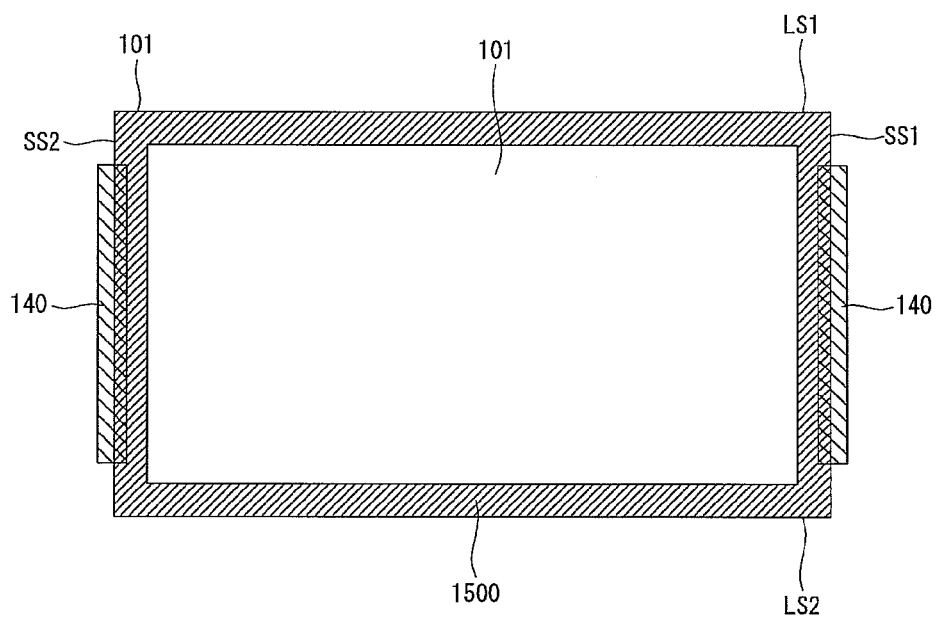

Alternatively, as shown in FIG. 28, the bracket 140 may hide a portion of the blocking member 1500 in the first short side SS1 and the second short side SS2 of the front substrate 101. However, the blocking member 1500 may not be hidden by the bracket 140 and may be exposed in the first long side LS1 and the second long side LS2 of the front substrate 101.

Figure 29:
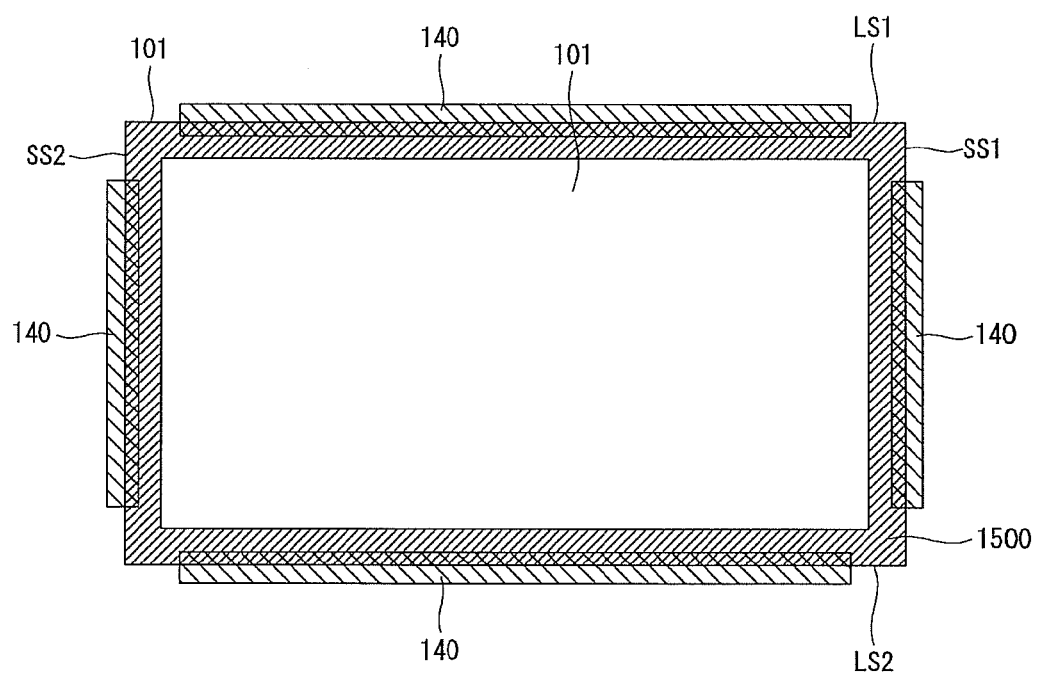

Alternatively, as shown in FIG. 29, the bracket 140 may hide a portion of the blocking member 1500 in the first long side LS1, the second long side LS2, the first short side SS1, and the second short side SS2 of the front substrate 101. However, even in this case, most of the blocking member 1500 may be exposed.

The above-described structure illustrated in FIGS. 26 to 29 may be applied to the structure of the display device in which the auxiliary bracket 2300 is added. Namely, the auxiliary bracket 2300 may replace the bracket 140 in the structure illustrated in FIGS. 26 to 29. In the embodiment disclosed herein, the bracket 140 may be referred to as a first bracket, and the auxiliary bracket 4800 may be referred to as a second bracket.

Figure 30:
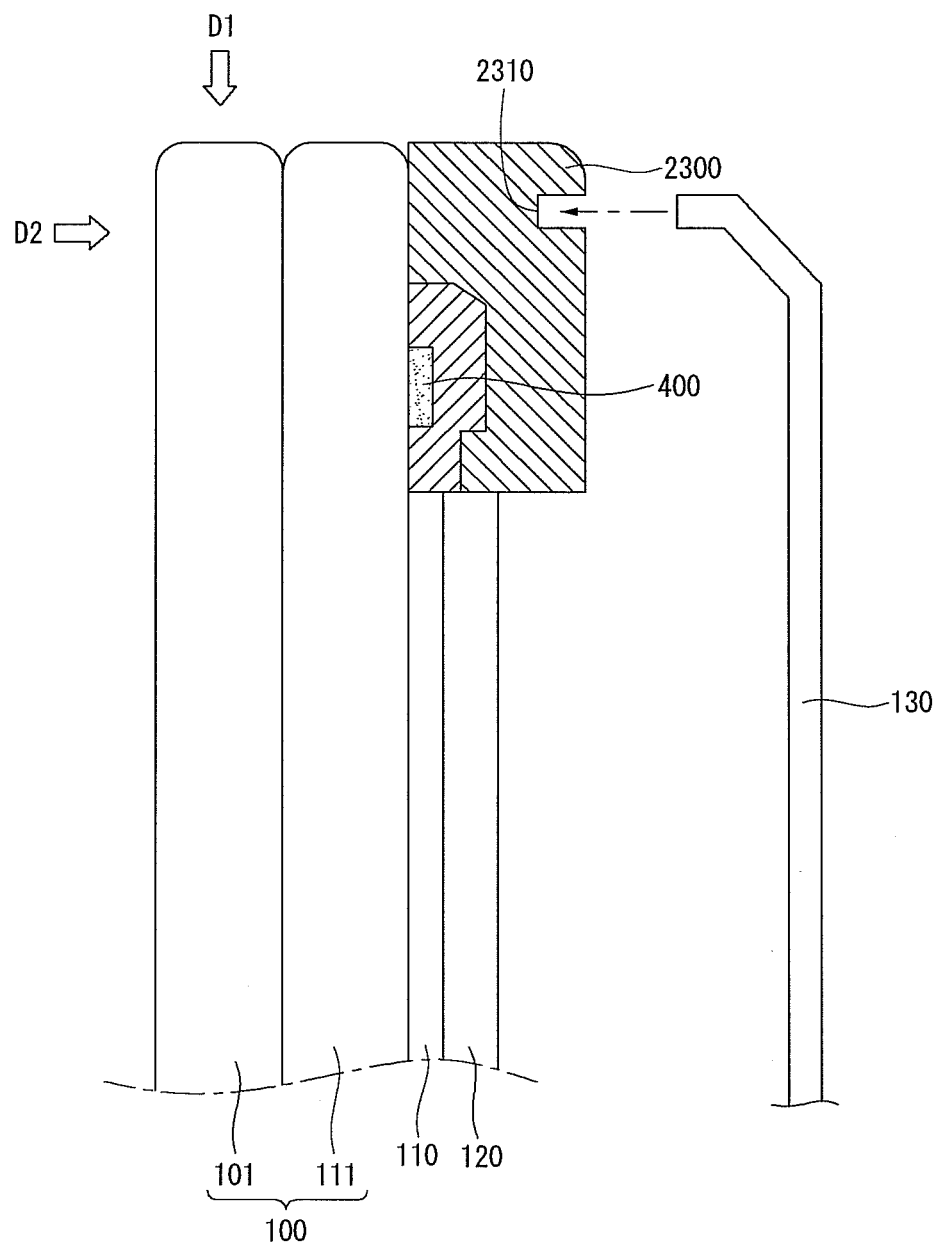

As shown in FIG. 30, the auxiliary bracket 2300 may be positioned between the bracket 140 and the back cover 130. When the auxiliary bracket 2300 is used, a design of the display device may be easily changed by changing the shape of the auxiliary bracket 2300 exposed to the outside without changing the shape of the bracket 140. More specifically, the connection structure of the back cover 130 may be easily changed using the auxiliary bracket 2300 without changing the location structure of the optical layer 110 or the backlight unit. Namely, the external shape such as the connection structure of the back cover 130 may be easily changed without changing the basic structure of the display device.

One side of the auxiliary bracket 2300 may be fixed to the bracket 140, and the other side of the auxiliary bracket 2300 may be fixed to the back cover 130. In other word, auxiliary bracket 2300 provided adjacent to the brackets 140.

The auxiliary bracket 2300 may have a groove 2310, that is depressed in a direction toward the bracket 140, so as to fix the back cover 130 to the auxiliary bracket 2300. An end of the back cover 130 may be inserted into the groove 2310. The groove 2310 of the auxiliary bracket 2300 used to fix the back cover 130 may be referred to as a fourth groove.

When the back cover 130 is fixed to the auxiliary bracket 2300, the back cover 130 and the light source 120 (i.e., the back cover 130 and the backlight unit) may be separated from each other by a predetermined distance. This structure may be substantially the same as the structure illustrated in FIGS. 14 and 15, in which the back cover 130 fixed to the bracket 140 and the backlight unit are separated from each other by the predetermined distance.

Even when the back cover 130 is fixed to the auxiliary bracket 2300, the edge of the front surface of the front substrate 101 or the edge of the side of the front substrate 101 may be exposed. This structure was described above with reference to FIGS. 14 and 15.

Figure 31:
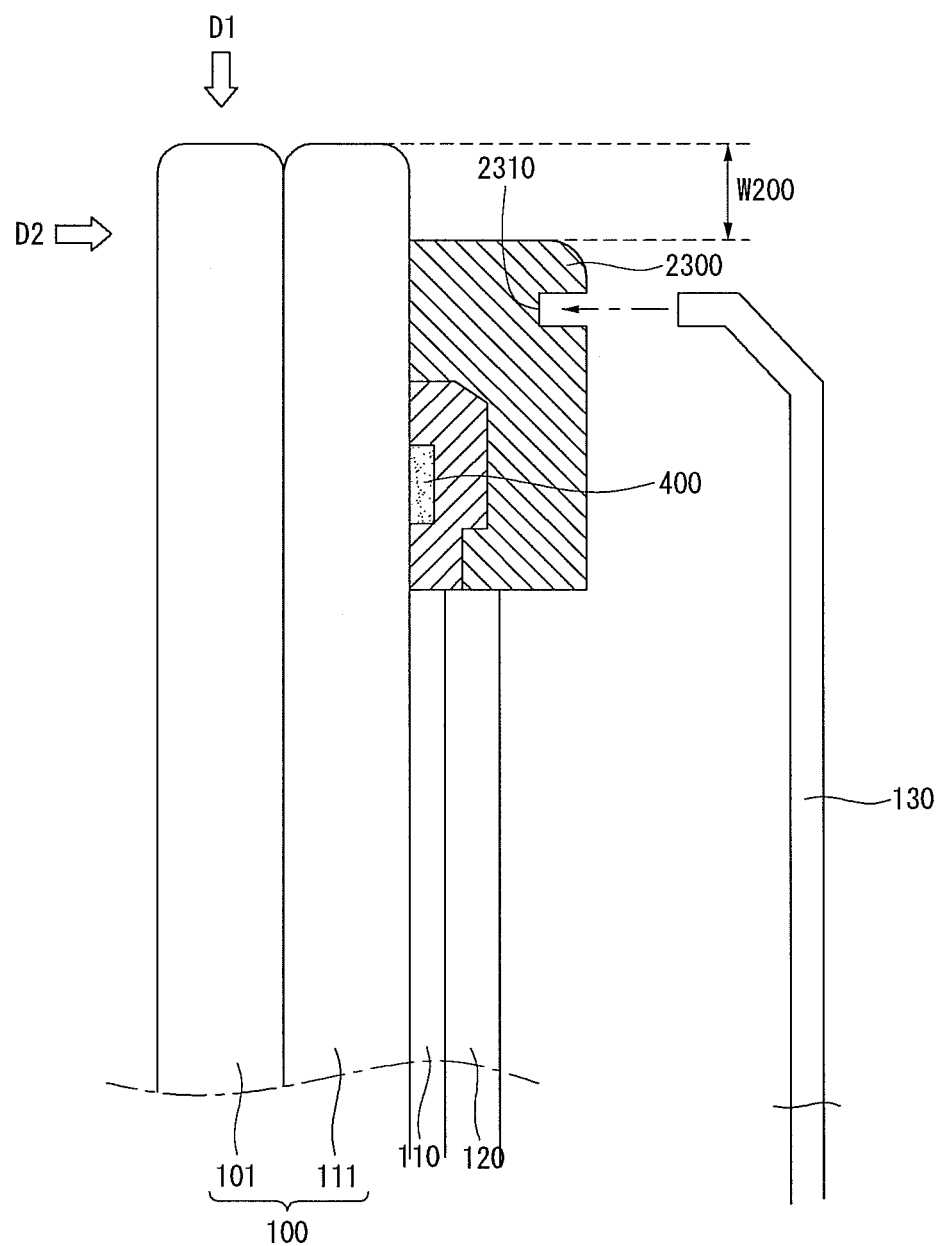

As shown in FIG. 31, the display panel 100 may include a portion W200 extending further than the auxiliary bracket 2300 in the longitudinal direction.

Figure 32:
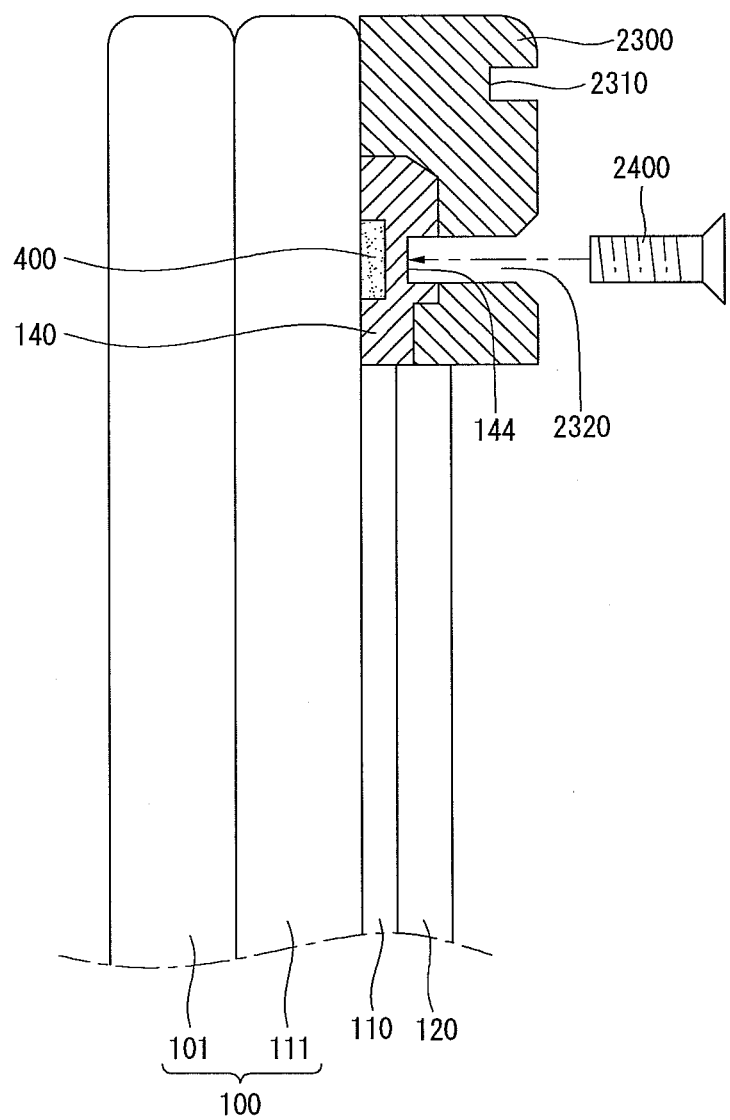

The bracket 140 and the auxiliary bracket 2300 may be coupled with each other using a predetermined coupling member. For example, as shown in FIG. 32, the bracket 140 may have a groove 144 used to couple with the auxiliary bracket 2300, and the auxiliary bracket 2300 may have a hole 2320 for a coupling member 2400. In this instance, the coupling member 2400 such as a screw may pass through the hole 2320 of the auxiliary bracket 2300 and may be fixed to the groove 144 of the bracket 140. The groove 144 of the bracket 140 may be referred to as a fifth groove.

Figure 33:
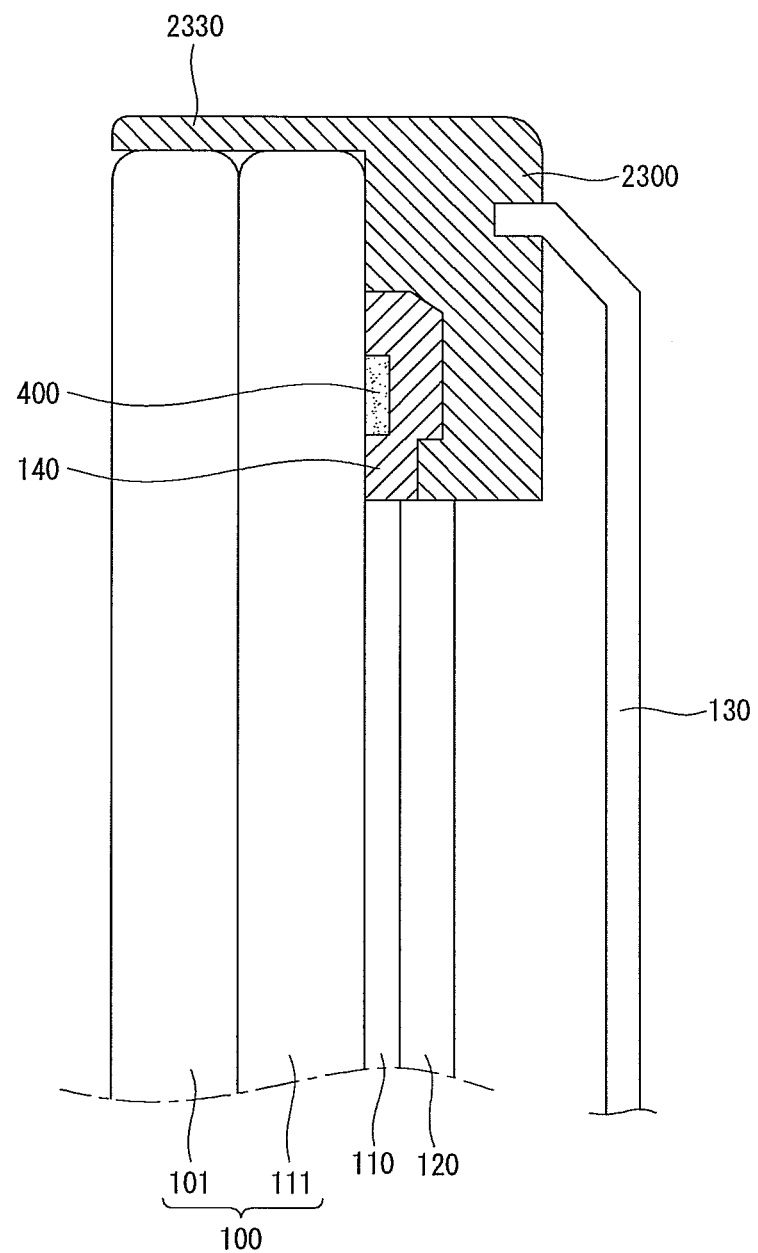

As shown in FIG. 33, the auxiliary bracket 2300 may include a portion 2330 positioned on the side of the display panel 100.

More specifically, the auxiliary bracket 2300 may extend to the side of the display panel 100. For example, the auxiliary bracket 2300 may extend to the side of the back substrate 111 of the display panel 100 and thus may include a portion positioned on the side of the back substrate 111. Alternatively, the auxiliary bracket 2300 may extend to the side of the front substrate 101 of the display panel 100 and thus may include a portion positioned on the side of the front substrate 101.

Figure 34:
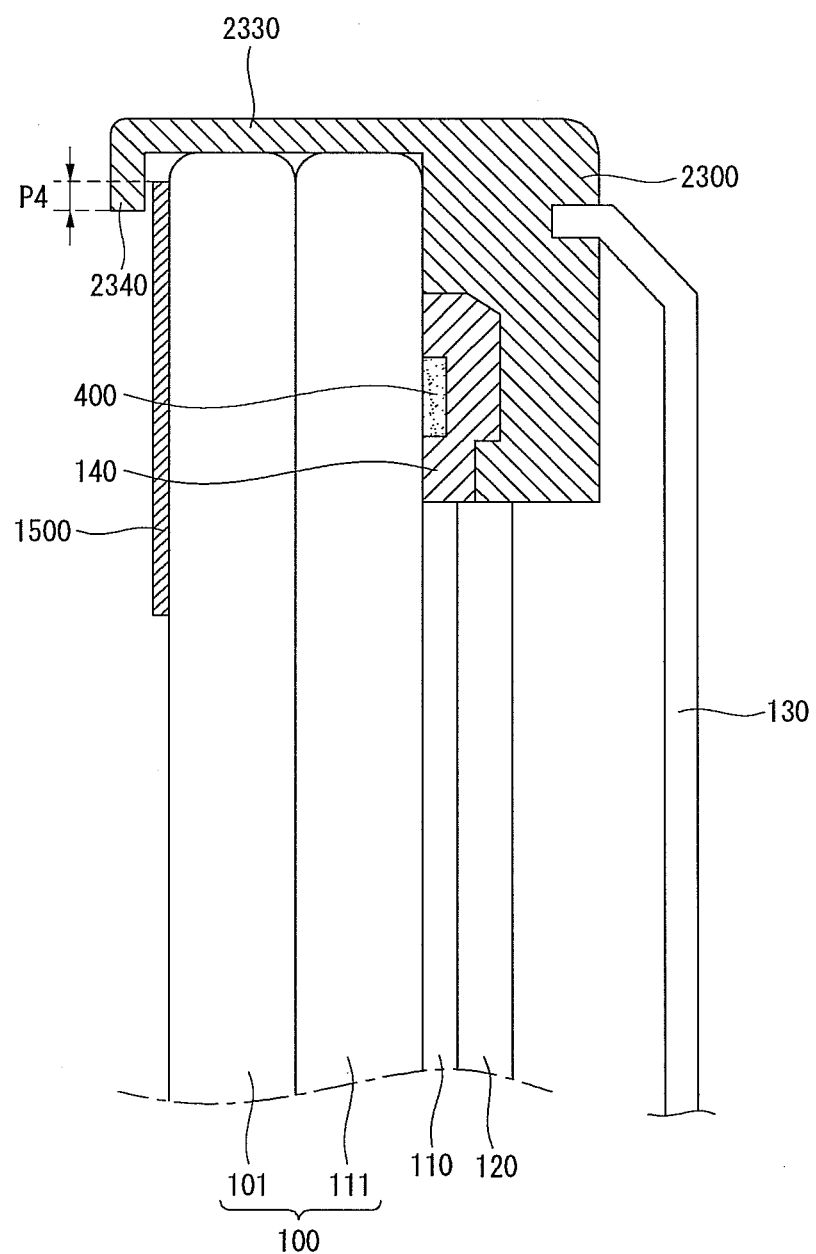

As shown in FIG. 34, the auxiliary bracket 2300 may extend to the side of the display panel 100 and the front surface of the front substrate 101. Hence, the auxiliary bracket 2300 may include the portion 2330 positioned on the side of the display panel 100 and a portion 2340 positioned on the front surface of the front substrate 101.

In this instance, the partial edge of the front surface of the front substrate 101 may be hidden by the auxiliary bracket 2300, but almost the entire front surface of the front substrate 101 may be exposed.

Even when the auxiliary bracket 2300 hides the partial edge of the front surface of the front substrate 101, all of the edges of the front surface of the front substrate 101 may not be hidden by the auxiliary bracket 2300. This structure may be substantially the same as the structure illustrated in FIGS. 23B to 25.

Further, when the auxiliary bracket 2300 extends to the front surface of the front substrate 101, the auxiliary bracket 2300 may include a portion P4 overlapping the blocking member 1500 on the front surface of the front substrate 101. In this instance, the auxiliary bracket 2300 may hide a portion of the blocking member 1500. The overlap portion P4 between the auxiliary bracket 2300 and the blocking member 1500 may contact the blocking member 1500.

Even when the auxiliary bracket 2300 hides the portion of the blocking member 1500, a size of the overlap portion P3 between the auxiliary bracket 2300 and the blocking member 1500 may be less than a size of a non-overlap portion between the auxiliary bracket 2300 and the blocking member 1500. The structure of the auxiliary bracket 2300 may be substantially the same as the structure illustrated in FIGS. 27 to 29.

Figure 35:
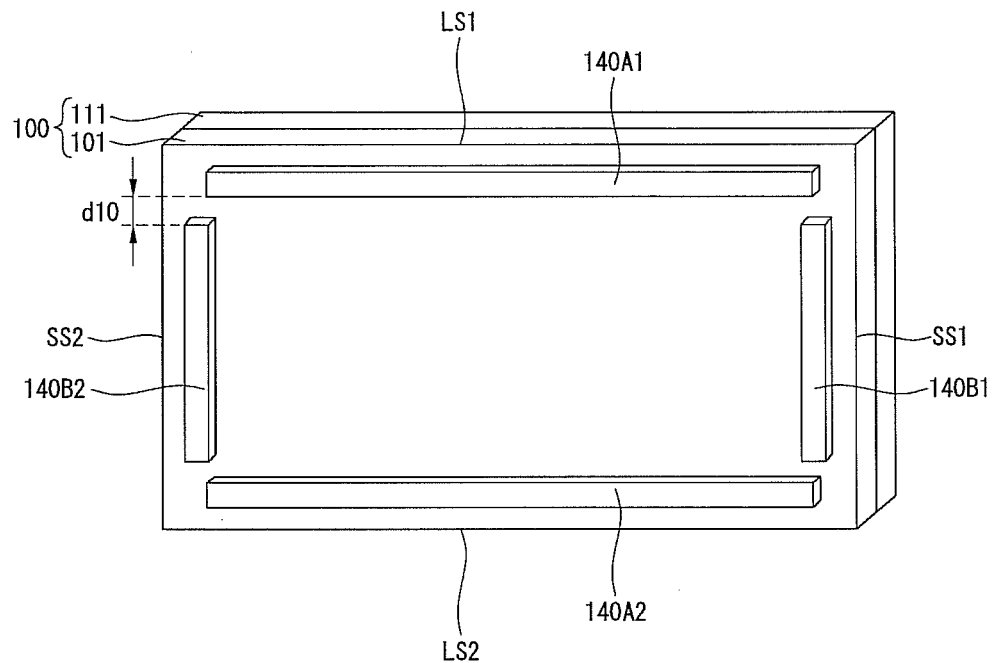

The bracket 140 may be divided into a plurality of parts. For example, as shown in FIG. 35, the bracket 140 may include first brackets 140A1 and 140A2 and second brackets 140B1 and 140B2.

The first brackets 140A1 and 140A2 may be respectively attached to long sides LS1 and LS2 of the back surface of the back substrate 111 of the display panel 100. The second brackets 140B1 and 140B2 may be respectively attached to short sides SS1 and SS2 of the back surface of the back substrate 111.

The first brackets 140A1 and 140A2 may be separated from the second brackets 140B1 and 140B2 by a predetermined distance d10. Preferably, the first brackets 140A1 and 140A2 and the second brackets 140B1 and 140B2 may be separated from each other in the corner of the back surface of the back substrate 111. In this instance, a process for attaching the first brackets 140A1 and 140A2 and the second brackets 140B1 and 140B2 to the back substrate 111 may be easily performed, and the manufacturing cost of the bracket 140 may be reduced. Hence, the manufacturing cost of the display device may be reduced.

Figure 36:
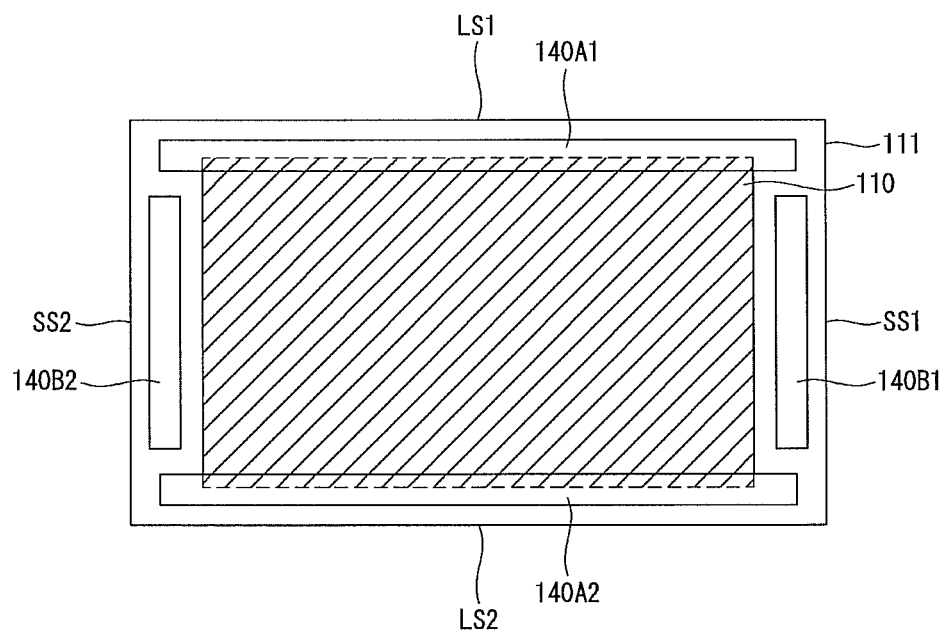

The optical layer 110 may be fixed to the first brackets 140A1 and 140A2, the second brackets 140B1 and 140B2, or both. For example, as shown in FIG. 36, the optical layer 110 may be fixed to the first brackets 140A1 and 140A2 and may not be fixed to the second brackets 140B1 and 140B2. In other words, the optical layer 110 may overlap or contact the first brackets 140A1 and 140A2. The optical layer 110 may not overlap the second brackets 140B1 and 140B2 and may be separated from the second brackets 140B1 and 140B2 by a predetermined distance.

Figure 37:
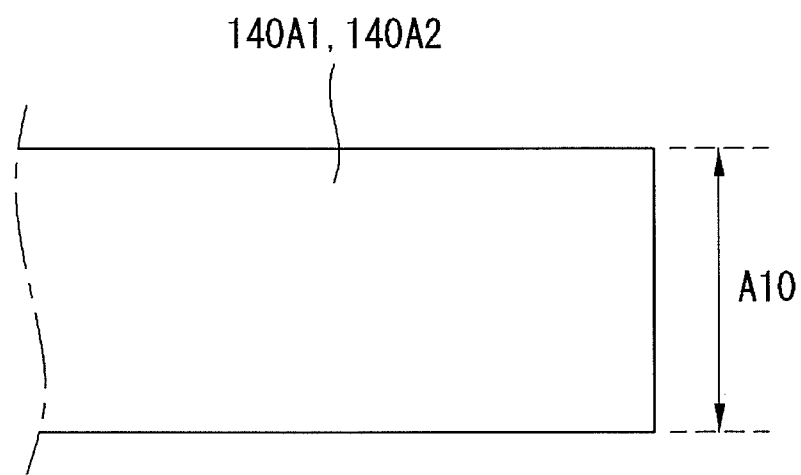
Figure 37:
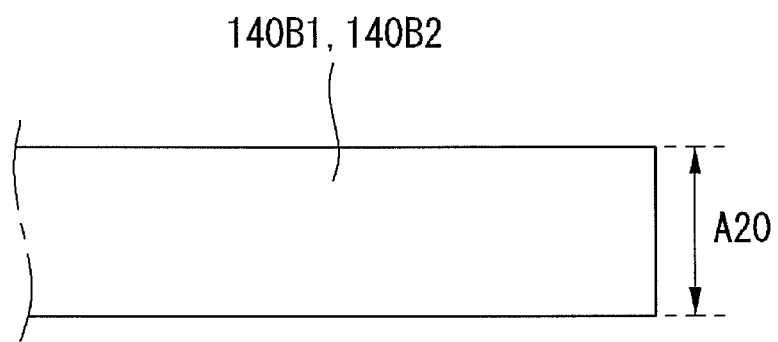

In this instance, widths A10 of the first brackets 140A1 and 140A2 may be different from widths A20 of the second brackets 140B1 and 140B2. Preferably, as shown in FIG. 37, the widths A10 of the first brackets 140A1 and 140A2 fixed to the optical layer 110 may be greater than the widths A20 of the second brackets 140B1 and 140B2. Because the optical layer 110 is not fixed to the second brackets 140B1 and 140B2, the widths A20 of the second brackets 140B1 and 140B2 may be less than the widths A10 of the first brackets 140A1 and 140A2.

Figure 38:
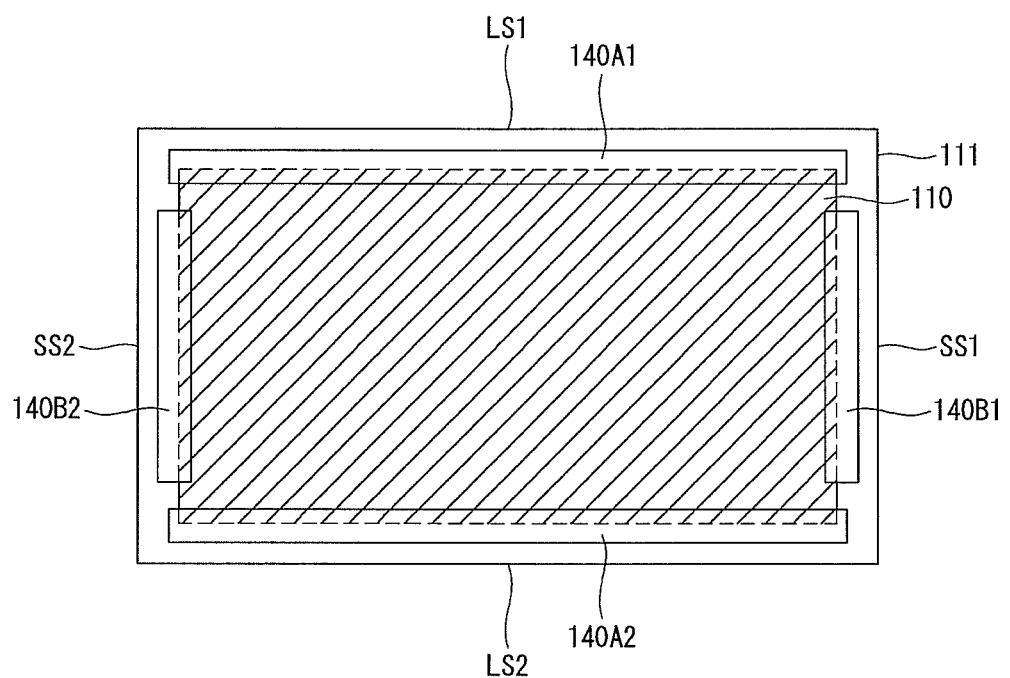

Alternatively, as shown in FIG. 38, the optical layer 110 may be fixed to the first brackets 140A1 and 140A2 and the second brackets 140B1 and 140B2. Even in this case, the widths A10 of the first brackets 140A1 and 140A2 may be greater than the widths A20 of the second brackets 140B1 and 140B2. Hence, the first brackets 140A1 and 140A2 longer than the second brackets 140B1 and 140B2 may mainly support the optical layer 110.

Figure 39:
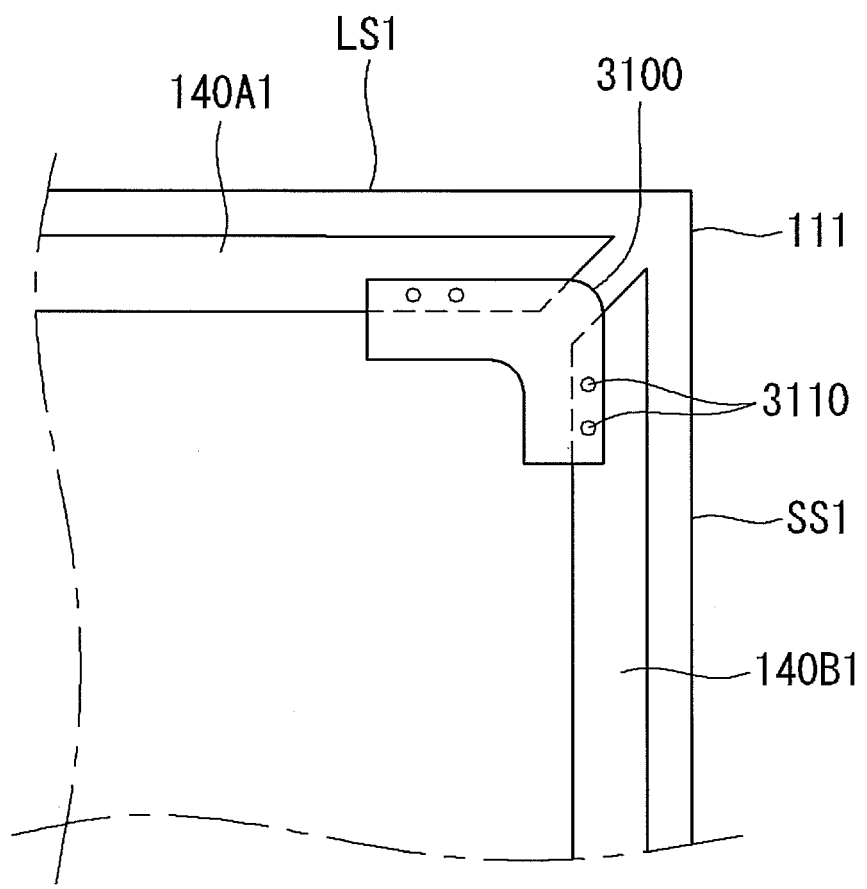

The first brackets 140A1 and 140A2 may be connected to the second brackets 140B1 and 140B2 using a predetermined connecting part. For example, as shown in FIG. 39, a connecting part 3100 may be positioned between the first brackets 140A1 and 140A2 and the second brackets 140B1 and 140B2 and may be connected to the first brackets 140A1 and 140A2 and the second brackets 140B1 and 140B2 using a predetermined coupling member 3110. Hence, the first brackets 140A1 and 140A2 may be connected to the second brackets 140B1 and 140B2.

Figure 40:
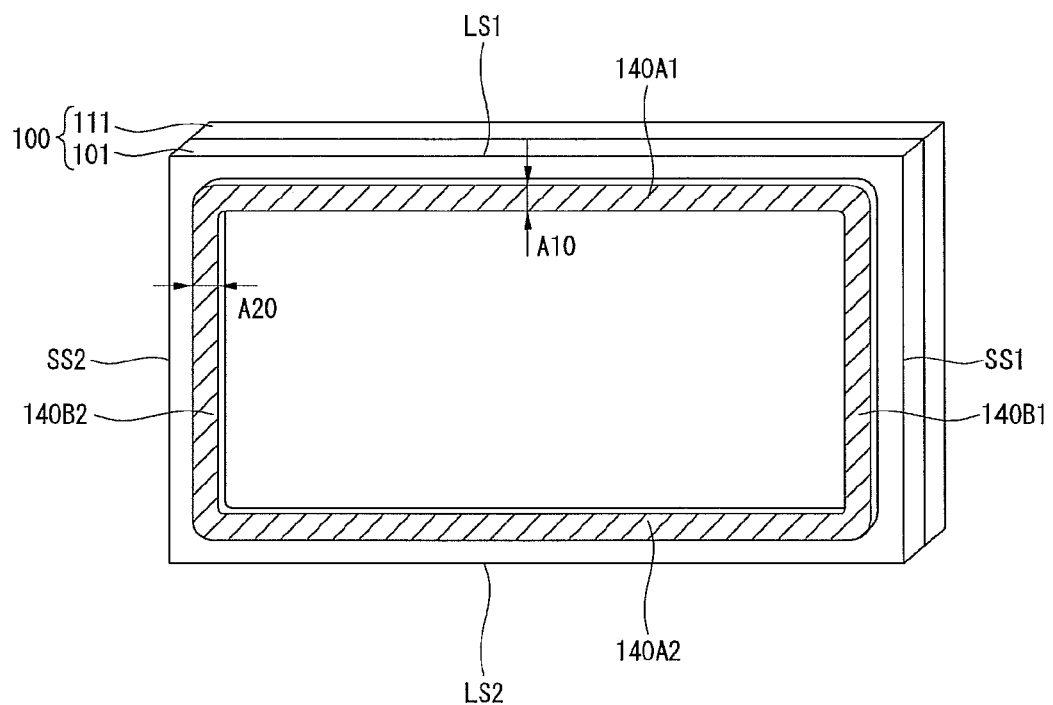

As shown in FIG. 40, the first brackets 140A1 and 140A2 and the second brackets 140B1 and 140B2 may fouls an integral body. In this instance, a portion of the bracket 140 positioned at the long sides LS1 and LS2 of the back substrate 111 may be referred to as a first bracket, and a portion of the bracket 140 positioned at the short sides SS1 and SS2 of the back substrate 111 may be referred to as a second bracket. Even in this case, the widths A10 of the first brackets 140A1 and 140A2 may be greater than the widths A20 of the second brackets 140B1 and 140B2.

Figure 41:
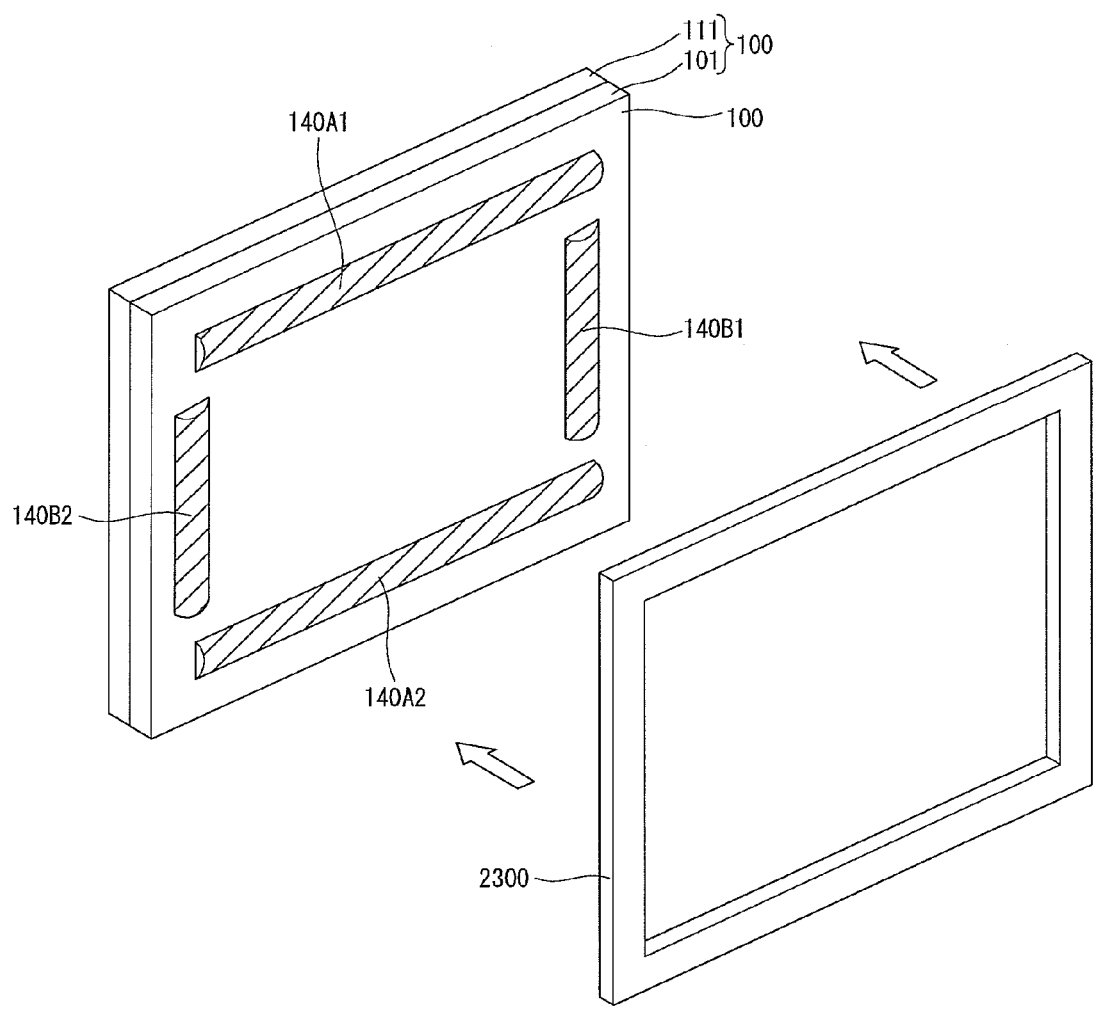

As shown in FIG. 41, the single auxiliary bracket 2300 may be connected to the first brackets 140A1 and 140A2 and the second brackets 140B1 and 140B2. In this instance, an empty space may be provided between the first brackets 140A1 and 140A2 and the second brackets 140B1 and 140B2 in a state where the single auxiliary bracket 2300 is connected to the first brackets 140A1 and 140A2 and the second brackets 140B1 and 140B2.

Figure 42:
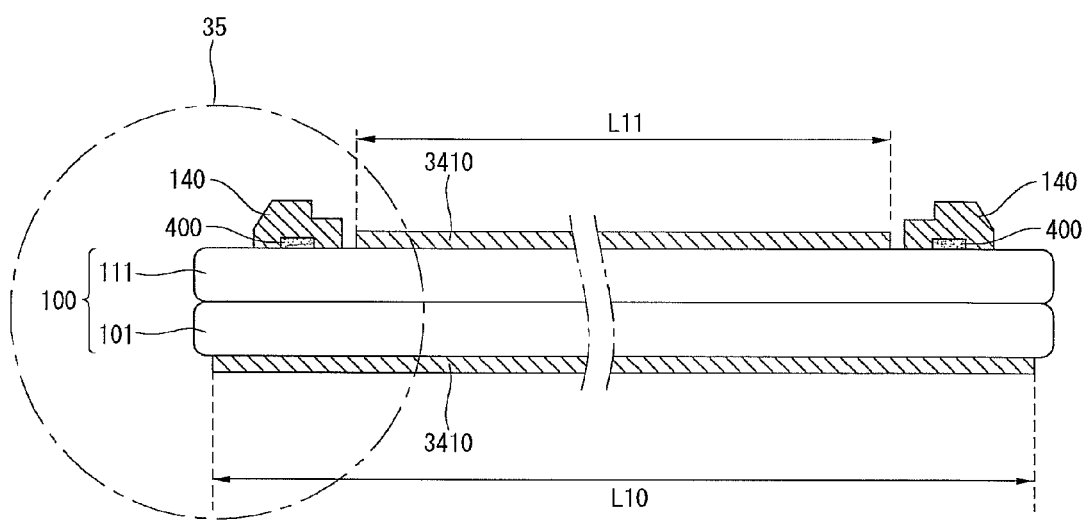

As shown in FIG. 42, a width L10 of the front polarizing film 3400 positioned on the front surface of the front substrate 101 may be different from a width L11 of the back polarizing film 3410 positioned on the back surface of the back substrate 111. The width L10 of the front polarizing film 3400 and the width L11 of the back polarizing film 3410 may be a width in the cross section of the display panel 100.

Preferably, the width L10 of the front polarizing film 3400 may be greater than the width L11 of the back polarizing film 3410. In other words, an end of at least one side of the front polarizing film 3400 may extend further than the back polarizing film 3410.

Figure 43:
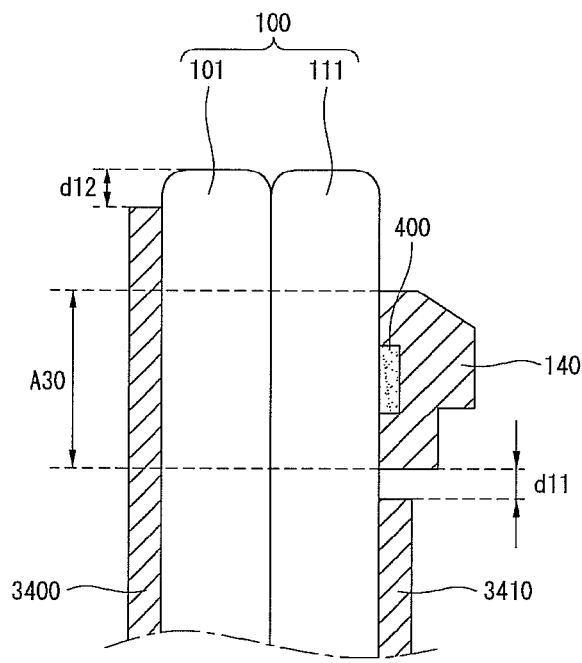

More specifically, as shown in FIG. 43, the front polarizing film 3400 may include a portion A30 overlapping the bracket 140. The bracket 140 may be separated from the back polarizing film 3410 by a predetermined distance d11 in a direction parallel to the longitudinal direction of the back substrate 111. In this instance, the bracket 140 may be directly attached to the back substrate 111. Hence, an adhesive strength between the bracket 140 and the back substrate 111 may be improved.

Further, the front polarizing film 3400 may be separated from an end of the front surface of the front substrate 101 by a predetermined distance d12. In this instance, a process for attaching the front polarizing film 3400 to the front substrate 101 may be easily performed, and the production yield may be improved.

Figure 44:
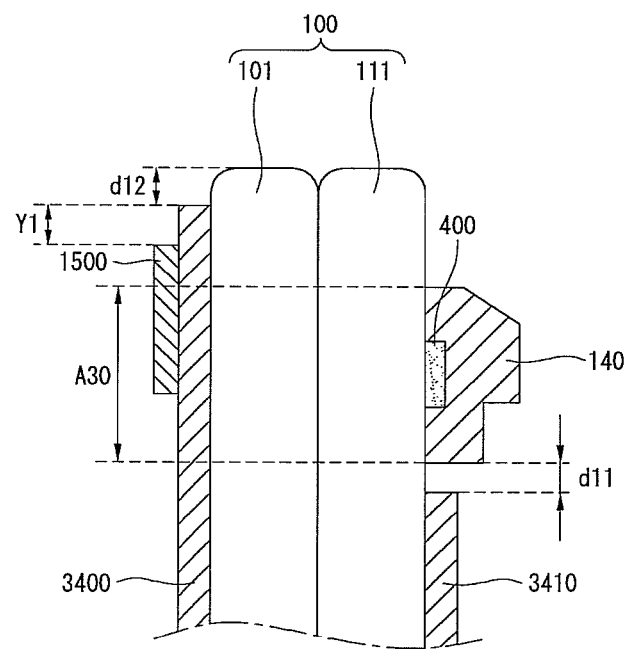

As shown in FIG. 44, the blocking member 1500 may overlap the front polarizing film 3400. For example, the blocking member 1500 may include a portion positioned on the front polarizing film 3400.

Further, the front polarizing film 3400 may include a portion Y1 extending further than the blocking member 1500 in an outside direction of the display panel 100. FIG. 44 shows that the blocking member 1500 is positioned on the front polarizing film 3400. However, the blocking member 1500 may be positioned between the front polarizing film 3400 and the front substrate 101. Even in this instance, the front polarizing film 3400 may include the portion Y1 extending further than the blocking member 1500 in the outside direction of the display panel 100.

Figure 45:
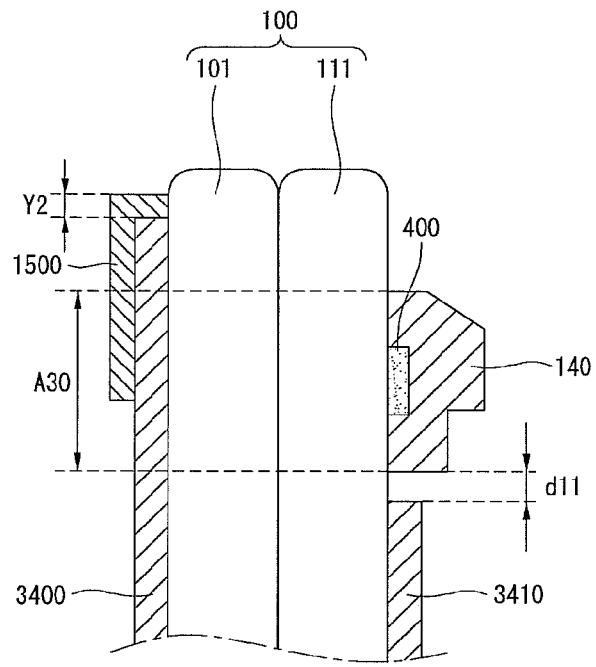

Alternatively, as shown in FIG. 45, the blocking member 1500 may include a portion Y2 extending further than the front polarizing film 3400 in the outside direction of the display panel 100. In this instance, the blocking member 1500 may contact both the front polarizing film 3400 and the front substrate 101.

FIG. 45 shows that the blocking member 1500 is positioned on the front polarizing film 3400. However, the blocking member 1500 may be positioned between the front polarizing film 3400 and the front substrate 101. Even in this case, the blocking member 1500 may include the portion Y2 extending further than the front polarizing film 3400 in the outside direction of the display panel 100.

Figure 46:
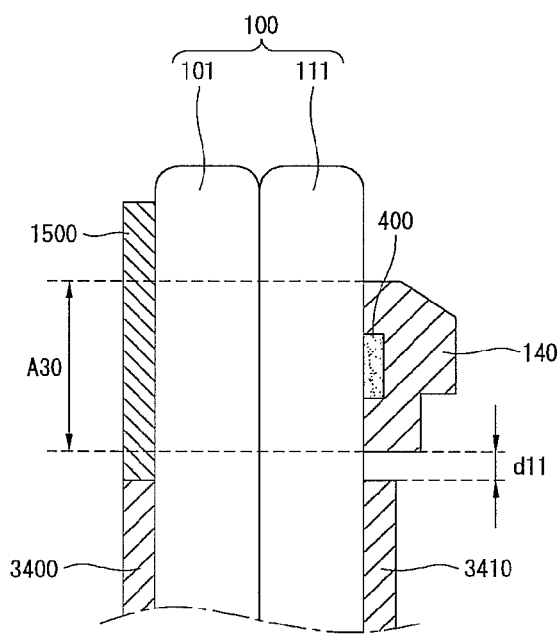

As shown in FIG. 46, the blocking member 1500 and the front polarizing film 3400 may be positioned on the same layer level. In this instance, the blocking member 1500 may be positioned outside the front polarizing film 3400.

Figure 47:
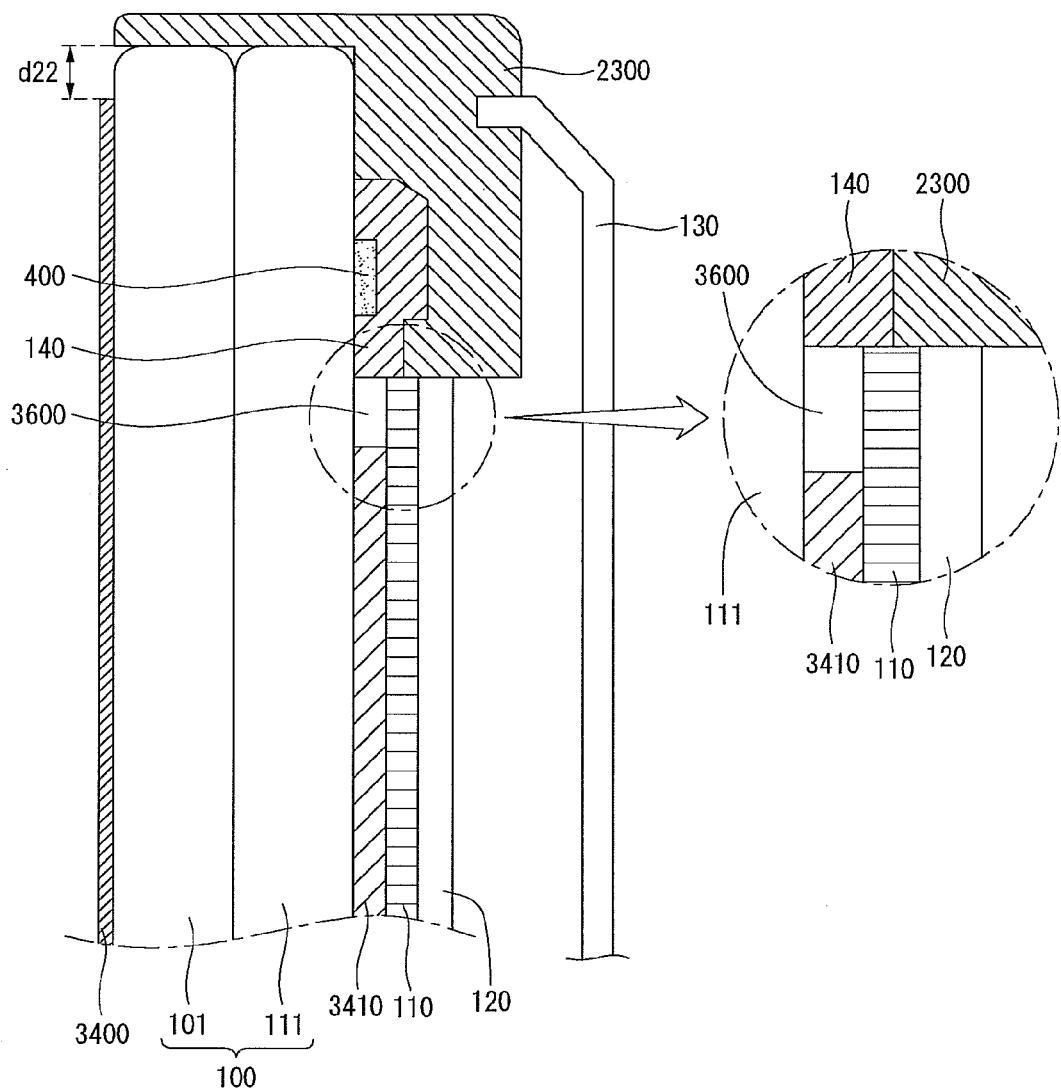

As shown in FIG. 47, when the bracket 140 is separated from the back polarizing film 3410 by the predetermined distance d11 in the direction parallel to the longitudinal direction of the back substrate 111, an air layer 3600 may be formed between the bracket 140 and the front polarizing film 3400 in a state where the optical layer 110 is positioned inside the bracket 140.

When the auxiliary bracket 2300 includes a portion positioned on the side of the display panel 100, the front polarizing film 3400 and the auxiliary bracket 2300 may be separated from each other by a predetermined distance d22 on the front surface of the front substrate 101. This may be equally applied to the structure in which the auxiliary bracket 2300 is not used and the bracket 140 includes a portion positioned on the side of the display panel 100.

Figure 48:
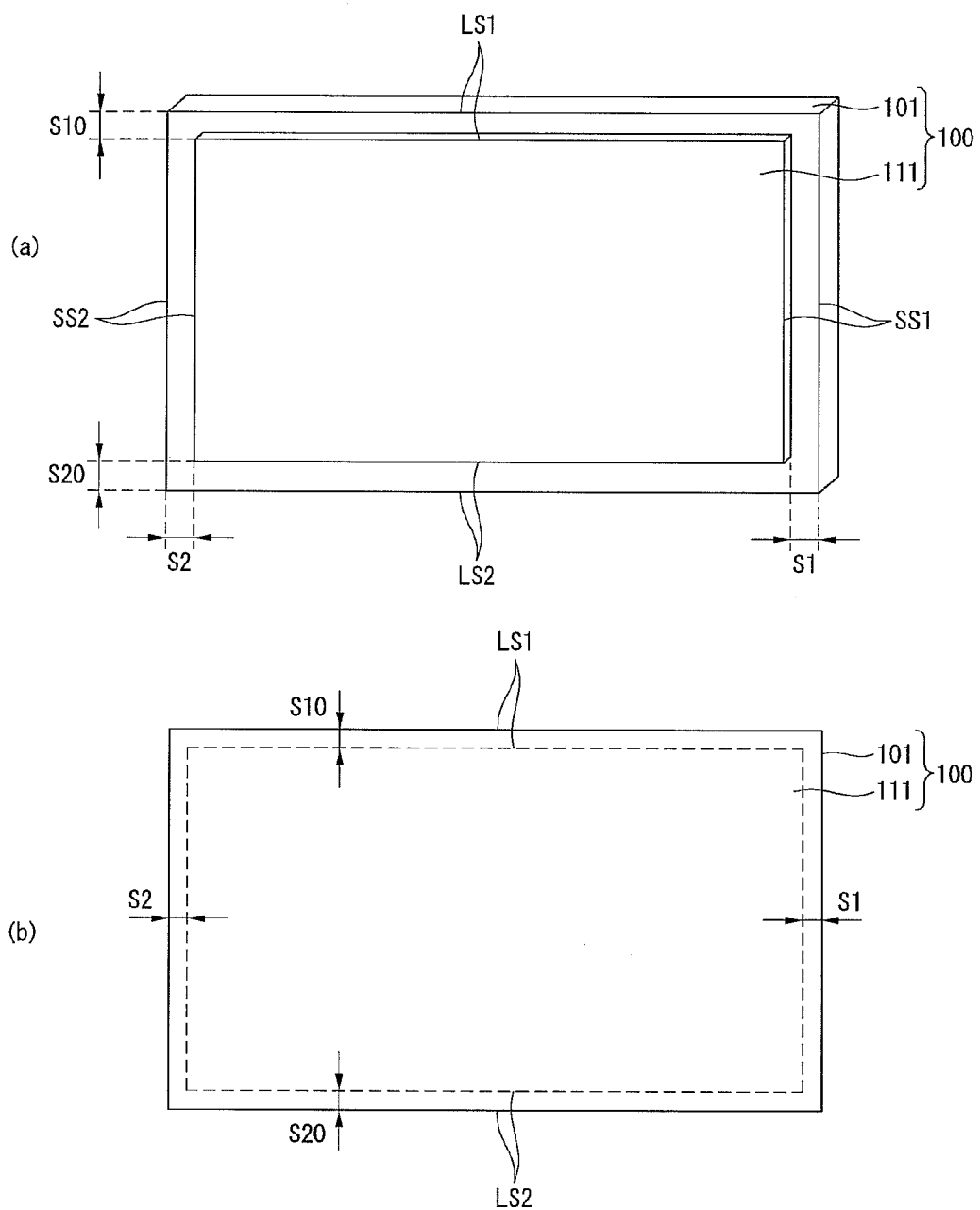

As shown in (a) and (b) of FIG. 48, the short sides SS1 and SS2 of the front substrate 101 may extend further than the short sides SS1 and SS2 of the back substrate 111, and the long sides LS1 and LS2 of the front substrate 101 may extend further than the long sides LS1 and LS2 of the back substrate 111.

For example, the first short side SS1 of the front substrate 101 may extend further than the first short side SS1 of the back substrate 111 corresponding to the first short side SS1 of the front substrate 101 by a first length S1. The second short side SS2 of the front substrate 101 may extend further than the second short side SS2 of the back substrate 111 corresponding to the second short side SS2 of the front substrate 101 by a second length S2.

The first length S1 may be substantially equal to the second length S2. Alternatively, the first length S1 may be different from the second length S2. In this instance, the structure of the first short side SS1 of the front substrate 101 may be different from the structure of the second short side SS2 of the front substrate 101.

For example, a sufficient space may be provided in the first short side SS1 of the back substrate 111, so as to mount a gate driver on the first short side SS1 of the back substrate 111 corresponding to the first short side SS1 of the front substrate 101. In this instance, the first length S1 may be less than the second length S2.

Further, the first long side LS1 of the front substrate 101 may extend further than the first long side LS1 of the back substrate 111 corresponding to the first long side LS1 of the front substrate 101 by a length S10. The second long side LS2 of the front substrate 101 may extend further than the second long side LS2 of the back substrate 111 corresponding to the second long side LS2 of the front substrate 101 by a length S20. The length S10 and the length S20 may be different from each other.

Figure 49:
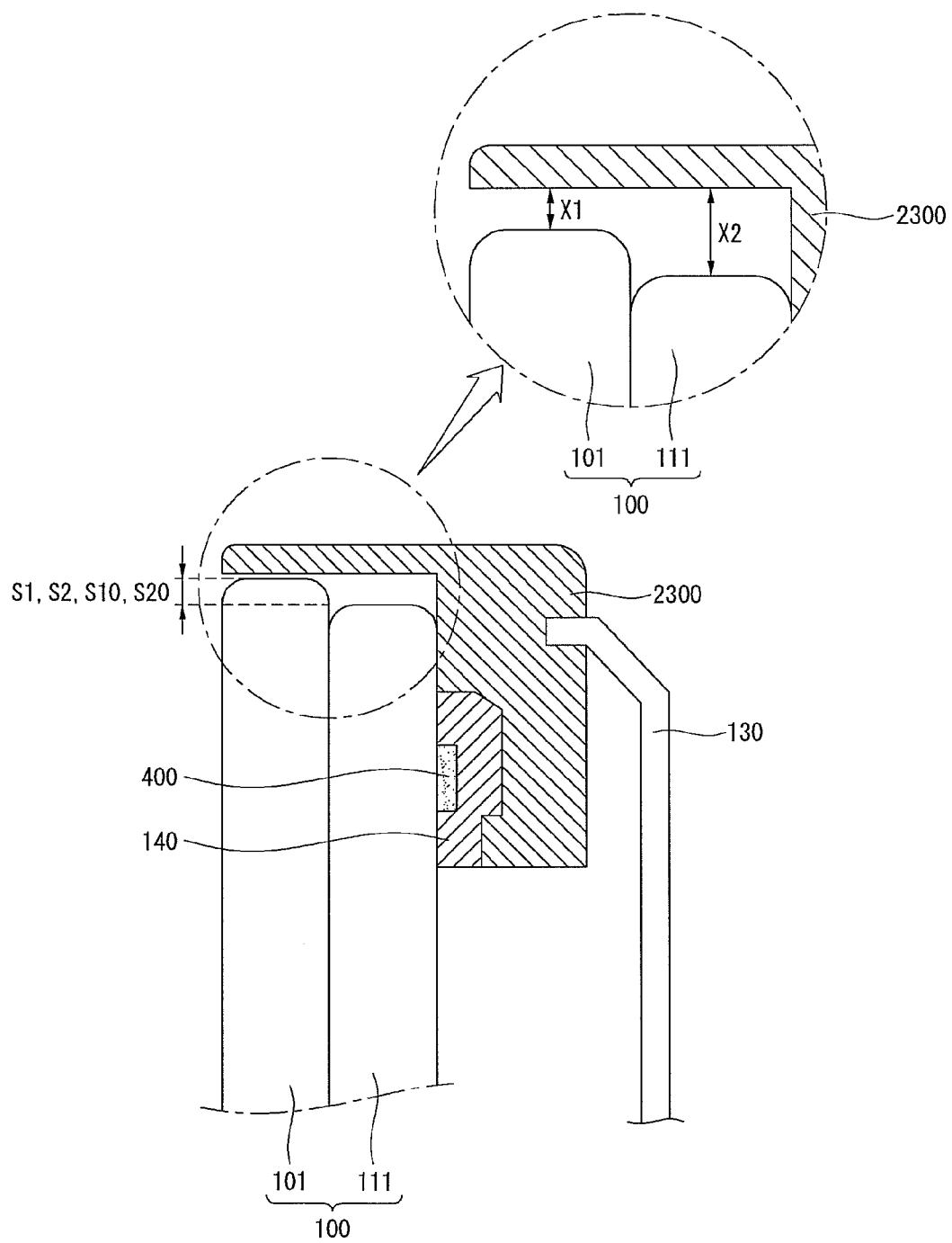

When the long sides LS1 and LS2 and the short sides SS1 and SS2 of the front substrate 101 extend further than the long sides LS1 and LS2 and the short sides SS1 and SS2 of the back substrate 111, respectively, a distance X1 between the front substrate 101 and the auxiliary bracket 2300 may be different from a distance X2 between the back substrate 111 and the auxiliary bracket 2300 as shown in FIG. 49. Preferably, the distance X1 may be less than the distance X2.

This may be equally applied to the structure in which the auxiliary bracket 2300 is not used and the bracket 140 includes the portion positioned on the side of the display panel 100.

At least one of a gate driver for supplying a driving signal to the gate lines and a data driver for supplying a driving signal to the data lines may be mounted outside the back substrate 111. The gate driver may include a plurality of gate driver integrated circuits (ICs), and the data driver may include a plurality of source driver ICs.

Figure 50:
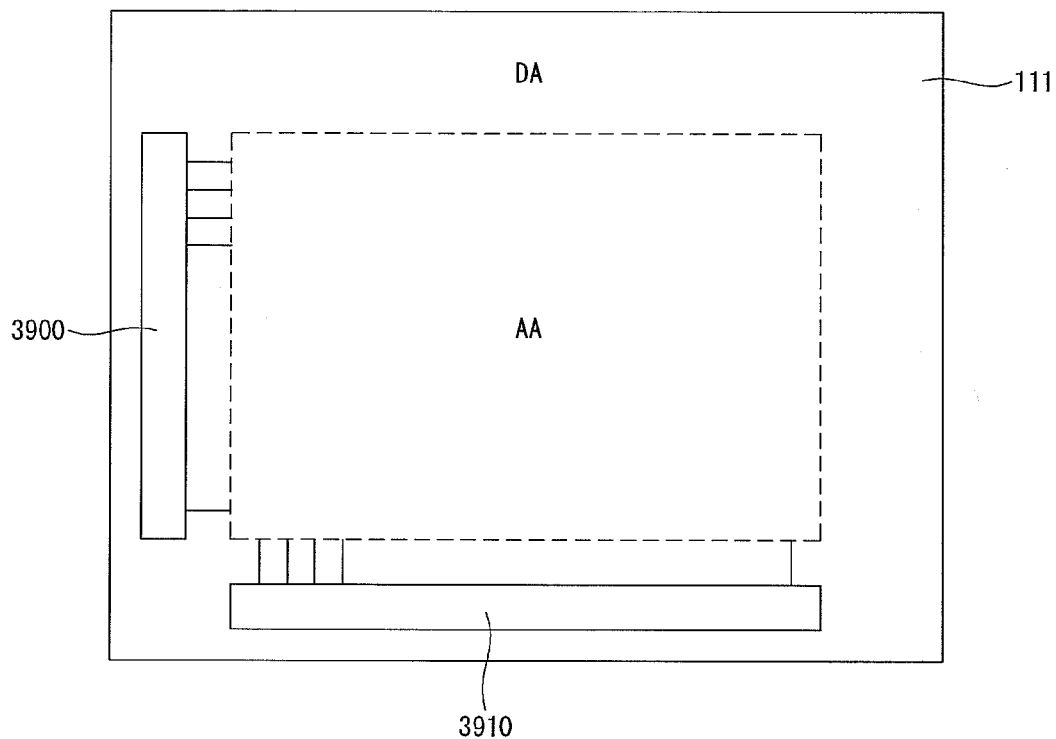

For example, as shown in FIG. 50, a gate driver 3900 and a data driver 3910 may be formed on the back substrate 111. The fact that the gate driver 3900 and the data driver 3910 are formed on the back substrate 111 may mean that circuit elements required to drive the gate driver 3900 and circuit elements required to drive the data driver 3910 are directly patterned on the back substrate 111 through semiconductor manufacturing processes.

It may be preferable that the gate driver 3900 and the data driver 3910 are formed on the back substrate 111 in a dummy area DA positioned outside an active area AA on which the image is displayed.

In this instance, because circuit elements required to display the image may be directly formed on the back substrate 111, the number or the size of circuit boards positioned outside may be reduced. Hence, the size or the thickness of the display device may be further reduced.

Figure 51:
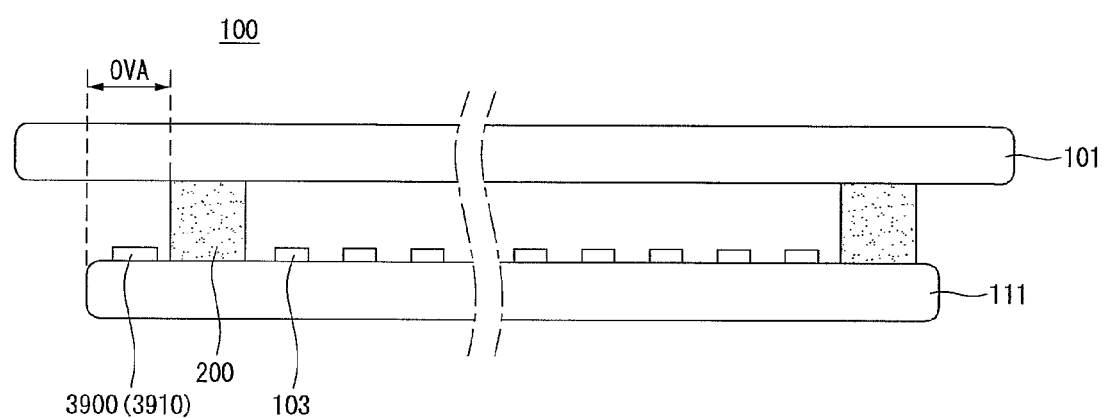

As shown in FIG. 51, when the long sides and the short sides of the front substrate 101 extend further than the long sides and the short sides of the back substrate 111, the gate driver 3900 and the data driver 3910 may be formed in an area OVA commonly overlapping the front substrate 101 and the back substrate 111.

The first transistor 103, for example, the first TFT 103 capable of turning on or off the liquid crystals in each pixel may be formed on the back substrate 111. The gate driver 3900 or the data driver 3910 may include a second transistor that is positioned in the area OVA commonly overlapping the front substrate 101 and the back substrate 111 outside the seal portion 200. Namely, the first transistor 103 may be positioned inside the seal portion 200, and the second transistor may be positioned in the area OVA commonly overlapping the front substrate 101 and the back substrate 111 outside the seal portion 200.

Figure 52:
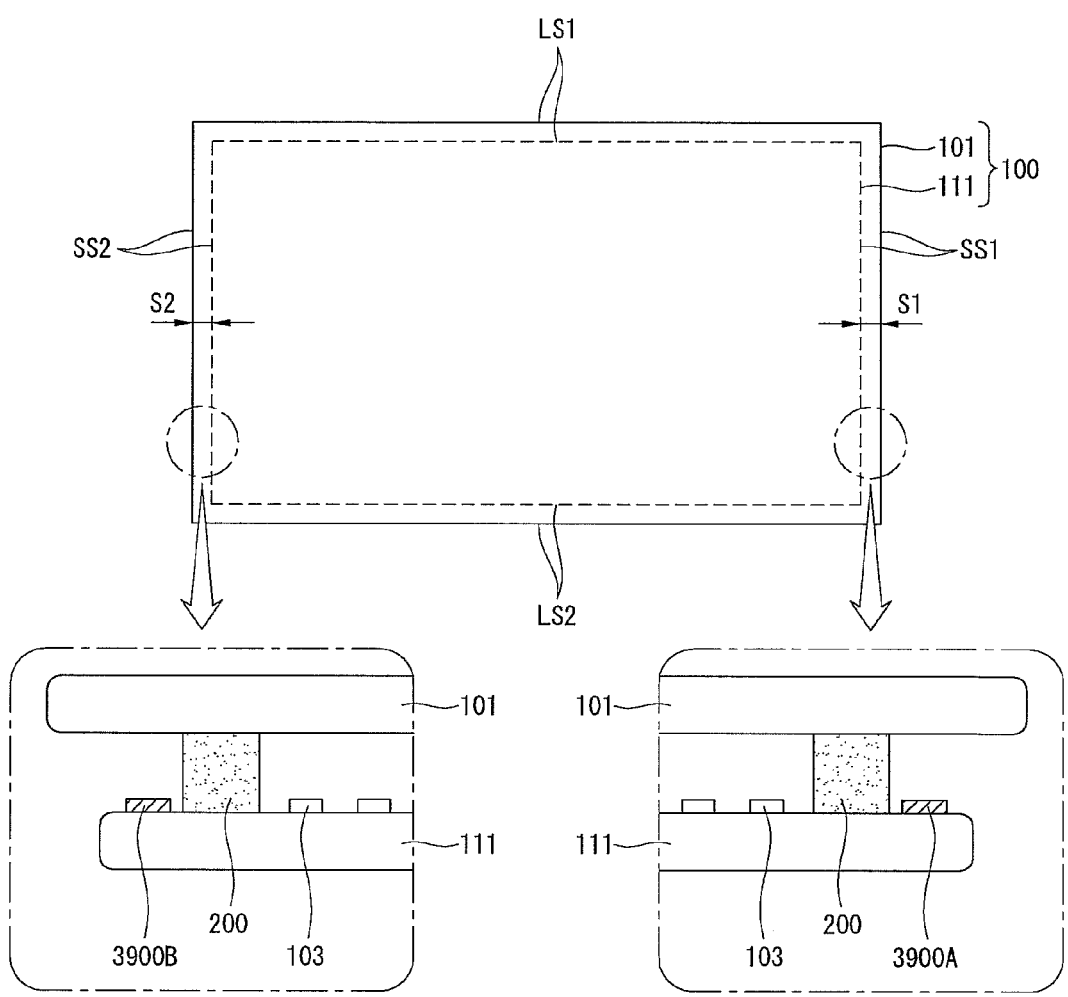

As shown in FIG. 52, a first gate driver 3900A may be positioned in an overlap area between the front substrate 101 and the back substrate 111 outside the seal portion 200 on the first short side SS1 of the back substrate 111. A second gate driver 3900B may be positioned in an overlap area between the front substrate 101 and the back substrate 111 outside the seal portion 200 on the second short side SS2 of the back substrate 111. In this instance, the first length S1 may be substantially equal to the second length S2.

Figure 53:
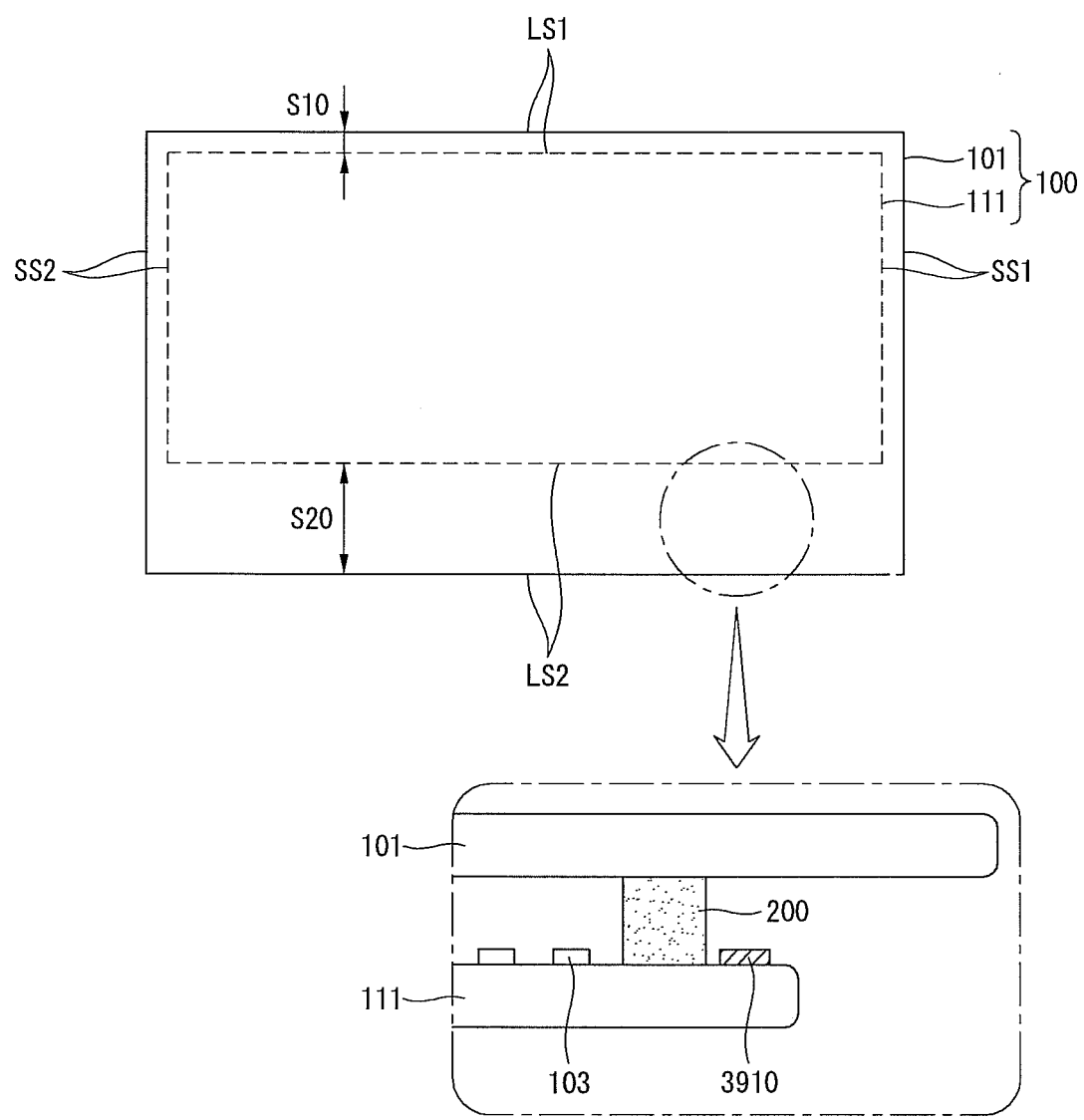

As shown in FIG. 53, the data driver 3910 may be positioned in an overlap area between the front substrate 101 and the back substrate 111 outside the seal portion 200 on the second long side LS2 of the back substrate 111. The data driver may not be positioned in an overlap area between the front substrate 101 and the back substrate 111 outside the seal portion 200 on the first long side LS1 of the back substrate 111. In this instance, the length S20 may be greater than the length S10.

Figure 54:
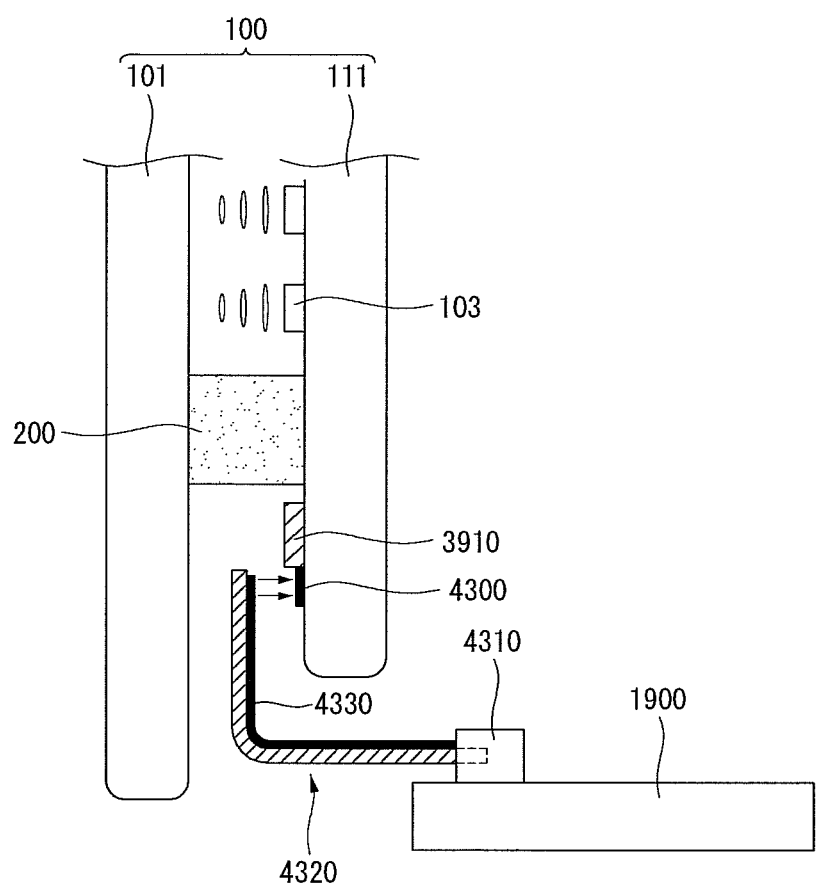

In this instance, as shown in FIG. 54, a pad electrode 4300 may be formed in an overlap area between the front substrate 101 and the back substrate 111 outside the seal portion 200 on the second long sides LS2 of the front substrate 101 and the back substrate 111. The pad electrode 4300 may be used in an electrical connection of the driving board 1900 for supplying the driving signal to a transistor.

For example, the driving board 1900 for supplying the driving signal to the display panel 100 may be positioned outside the display panel 100, for example, between the frame 1600 and the back cover 130.

In this instance, a connector 4310 may be positioned on the driving board 1900. One terminal of a connection substrate 4320 including an electrode 4330 may be connected to the connector 4310, and the other terminal may be connected to the pad electrode 4300. Hence, the driving board 1900 and the pad electrode 4300, more specifically, the driving board 1900 and the data driver 3910 may be electrically connected to each other. The connection substrate 4320 may be a flexible substrate such as a tape carrier package (TCP) and a flexible printed circuit (FPC).

As above, the connection substrate 4320 may be connected to the pad electrode 4300 in a formation portion of the pad electrode 4300. The length of the front substrate 101 may be greater than the length of the back substrate 111, so that the connection substrate 4320 is not seen in the front of the display panel 100. In other words, when the pad electrode 4300 is formed on the second long side LS2 of the back substrate 111, the length S20 may be greater than the length S10.

Figure 55:
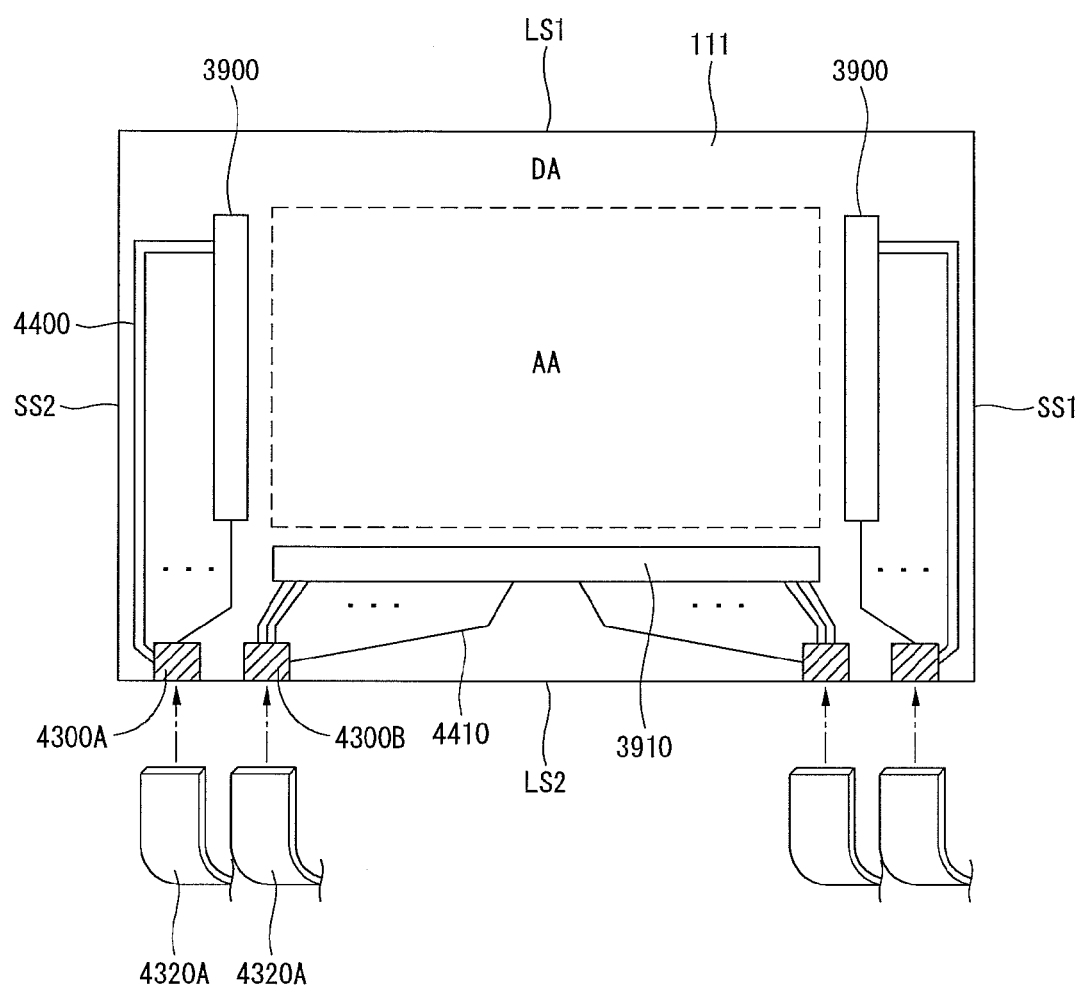

As shown in FIG. 55, a first pad electrode 4300A and a second pad electrode 4300b may be formed outside the seal portion 200 on the second long side LS2 of the back substrate 111. A first connection substrate 4320A may be electrically connected to the first pad electrode 4300A, and a second connection substrate 4320B may be electrically connected to the second pad electrode 4300B.

A first transfer line 4400 may be formed between the first pad electrode 4300A and the gate driver 3900 to transfer a driving signal, that is received from a driving board (not shown) through the first connection substrate 4320A, to the gate driver 3900. A second transfer line 4410 may be formed between the second pad electrode 4300B and the data driver 3910 to transfer a driving signal, that is received from a driving board (not shown) through the second connection substrate 4320B, to the data driver 3910.

Figure 56:
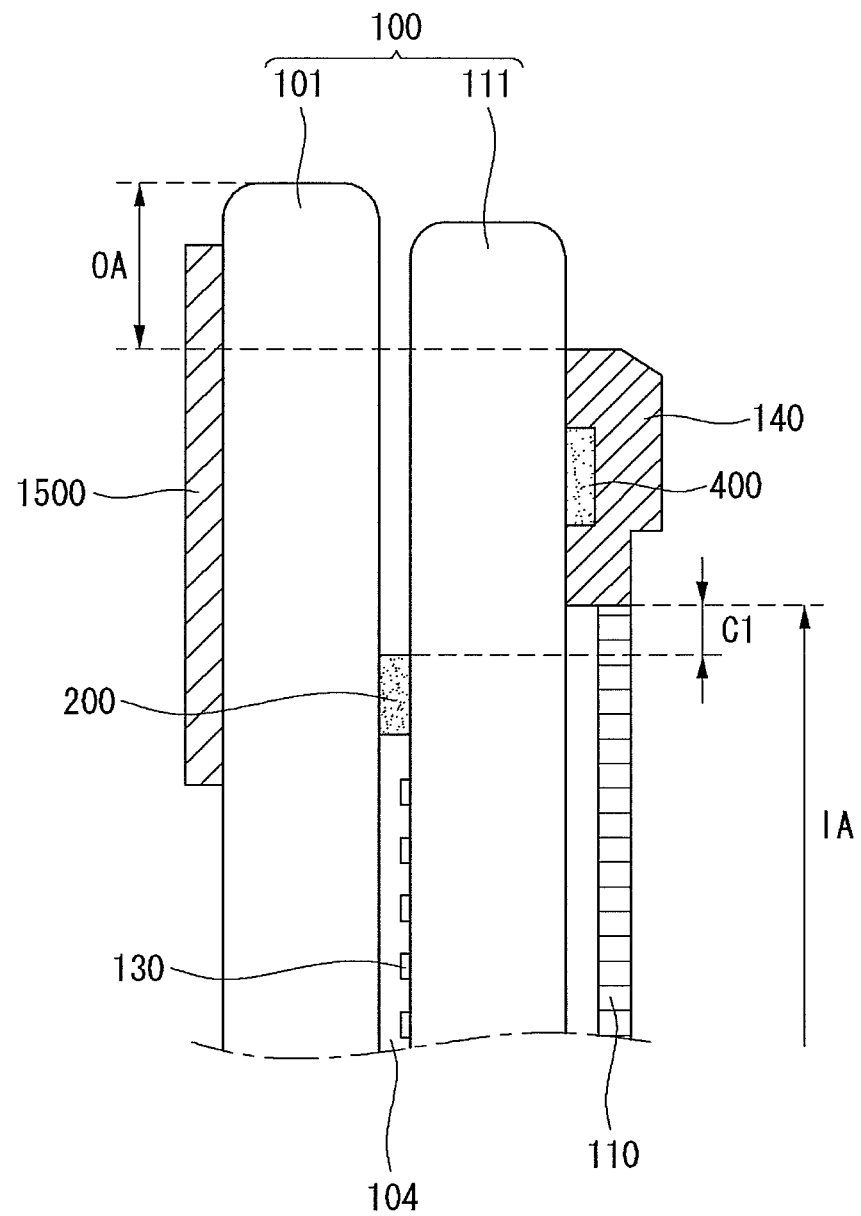

As shown in FIG. 56, the seal portion 200 positioned between the front substrate 101 and the back substrate 111 may be formed in the dummy area positioned outside the active area AA of the display panel 100 on which the image is displayed. Hence, the seal portion 200 may overlap the blocking member 1500.

The active area AA may be formed in an area overlapping the optical layer 110 positioned in the inner area IA of the bracket 140. Hence, it may be preferable that the seal portion 200 for sealing the liquid crystal layer 104 is positioned in the inner area IA of the bracket 140. More specifically, the seal part 200 may be separated from the bracket 140 by a predetermined distance C1 in the longitudinal direction of the back substrate 111.

Figure 57:
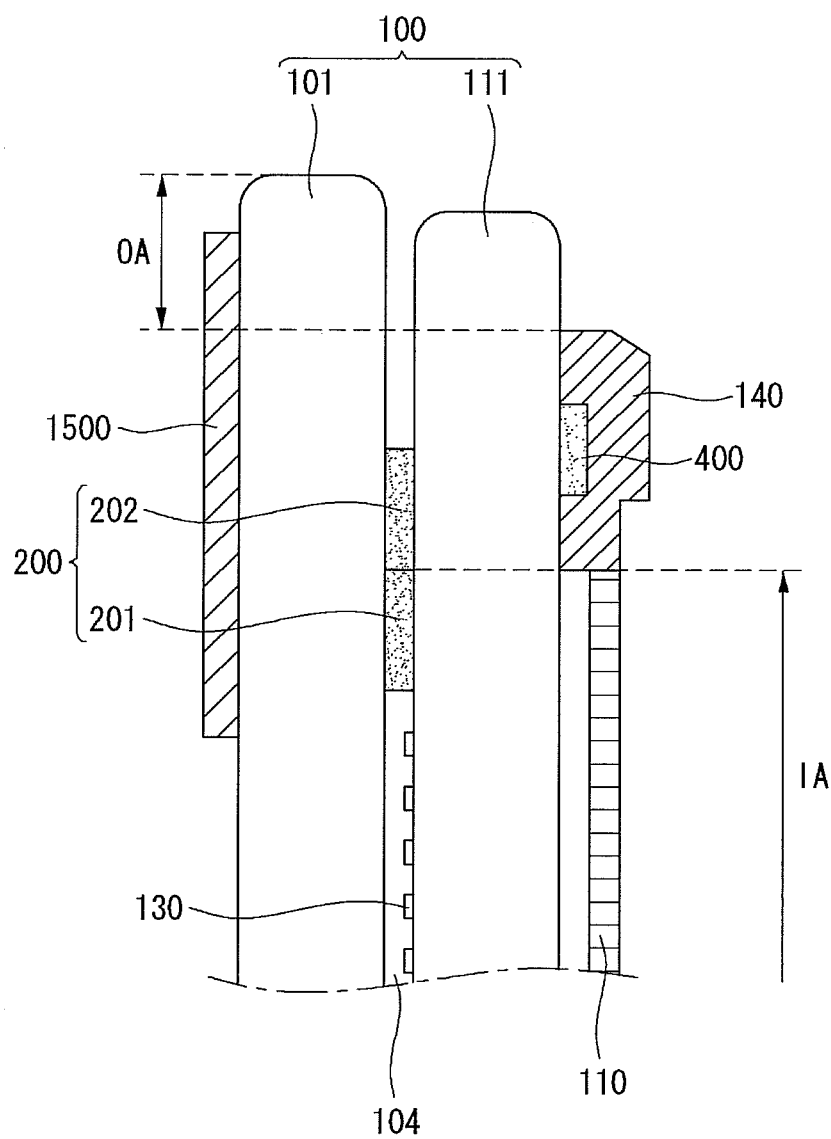

Alternatively, as shown in FIG. 57, the seal part 200 may include a portion 201 positioned in the inner area IA of the bracket 140 and a portion 202 overlapping the bracket 140. In this instance, the liquid crystal layer 104 may be securely sealed by sufficiently increasing the width of the seal portion 200. Hence, the structure stability of the liquid crystal layer 104 may be improved.

Figure 58:
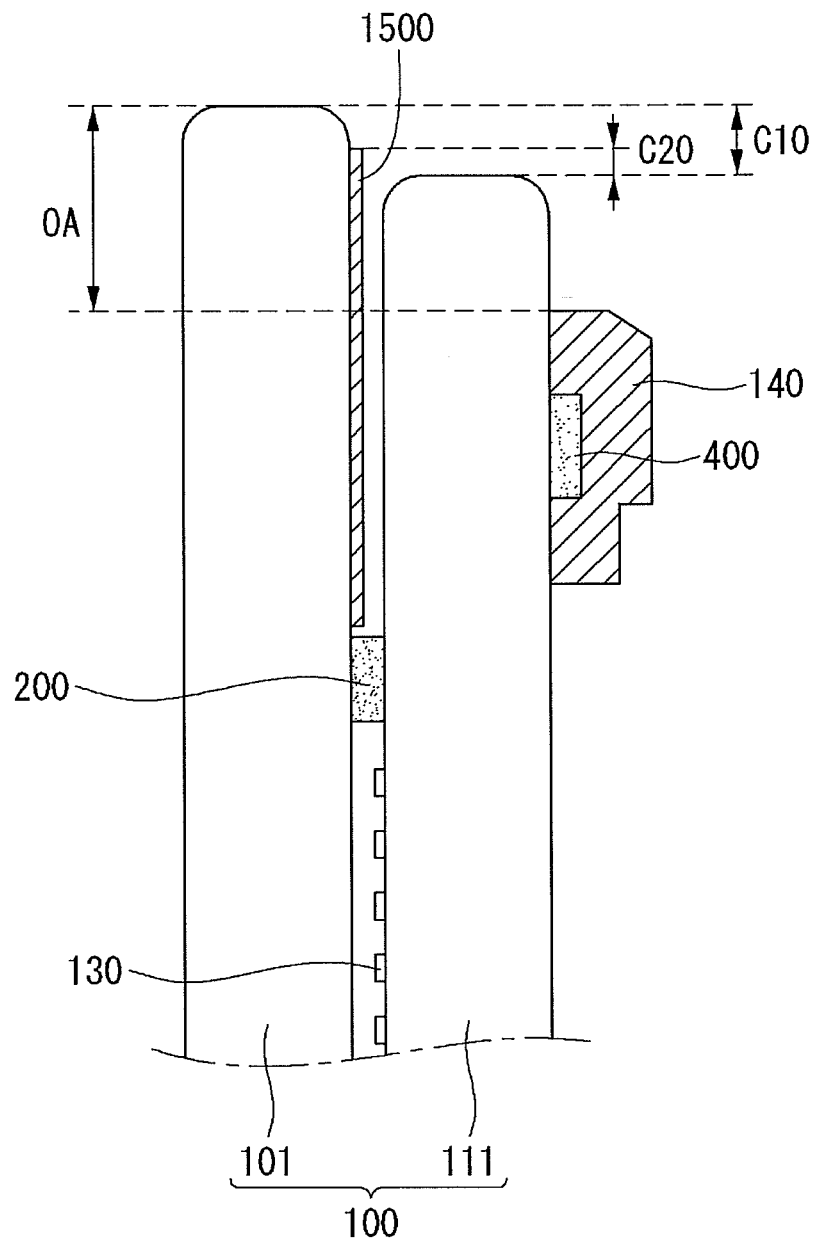

As shown in FIG. 58, the blocking member 1500 may be positioned on the back surface of the front substrate 101.

When the length of the front substrate 101 is greater than the length of the back substrate 111 by a predetermined length C10, the blocking member 1500 may be positioned on the back surface of the front substrate 101. In this instance, the blocking member 1500 positioned on the back surface of the front substrate 101 may be prevented from being exposed to the front surface of the front substrate 101 while hiding the back substrate 111 positioned outside the seal portion 200. Hence, a good appearance of the display device may be provided.

The end of the front substrate 101 may extend further than the blocking member 1500 in the outside direction of the display panel 100 by a predetermined distance, so as to easily perform an attaching process of the blocking member 1500 and increase the production yield and the blocking efficiency.

The blocking member 1500 may extend further than the end of the back substrate 111 by a predetermined distance C20.

The back cover 130 and the auxiliary bracket 2300 are coupled with each other using a coupling member.

Figure 59:
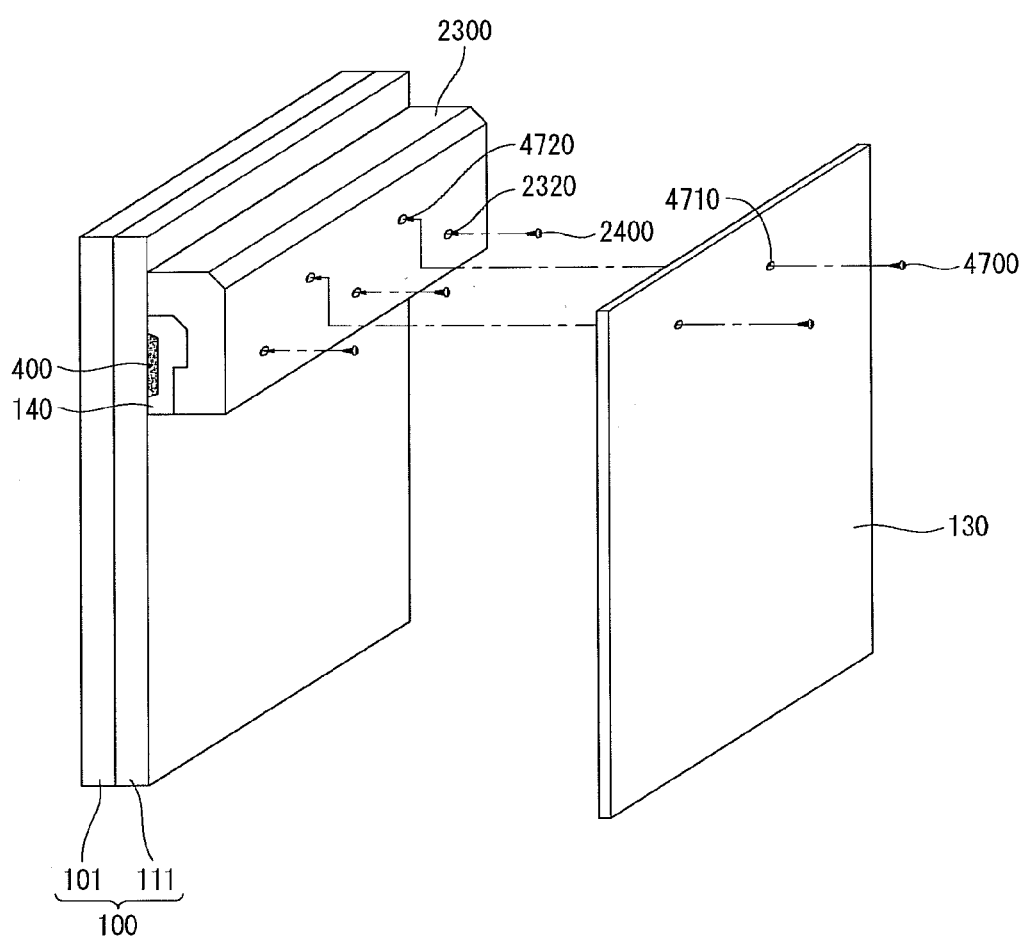

For example, as shown in FIG. 59, the bracket 140 and the auxiliary bracket 2300 may be coupled with each other using the first coupling member 2400, and the back cover 130 and the auxiliary bracket 2300 may be coupled with each other using a second coupling member 4700. The structure of the first coupling member 2400 and the coupling method using the first coupling member 2400 were described above.

A hole 4710 may be formed in the back cover 130, and a hole 4720 corresponding to the hole 4710 of the back cover 130 may be formed in the auxiliary bracket 2300. In this instance, the second coupling member 4700 may pass through the hole 4710 of the back cover 130 and then may be fixed to the hole 4720 of the auxiliary bracket 2300. Hence, the back cover 130 may be fixed to the auxiliary bracket 2300.

As shown in FIG. 60, the first coupling member 2400 may couple the bracket 140 with the auxiliary bracket 2300, and the second coupling member 4700 may couple the back cover 130 with the auxiliary bracket 2300.

FIGS. 61 to 72 illustrate another configuration of a display device according to an example embodiment of the invention. Structures and components identical or equivalent to those illustrated in FIGS. 1 to 60 are designated with the same reference numerals, and a further description may be briefly made or may be entirely omitted.

Figure 61:
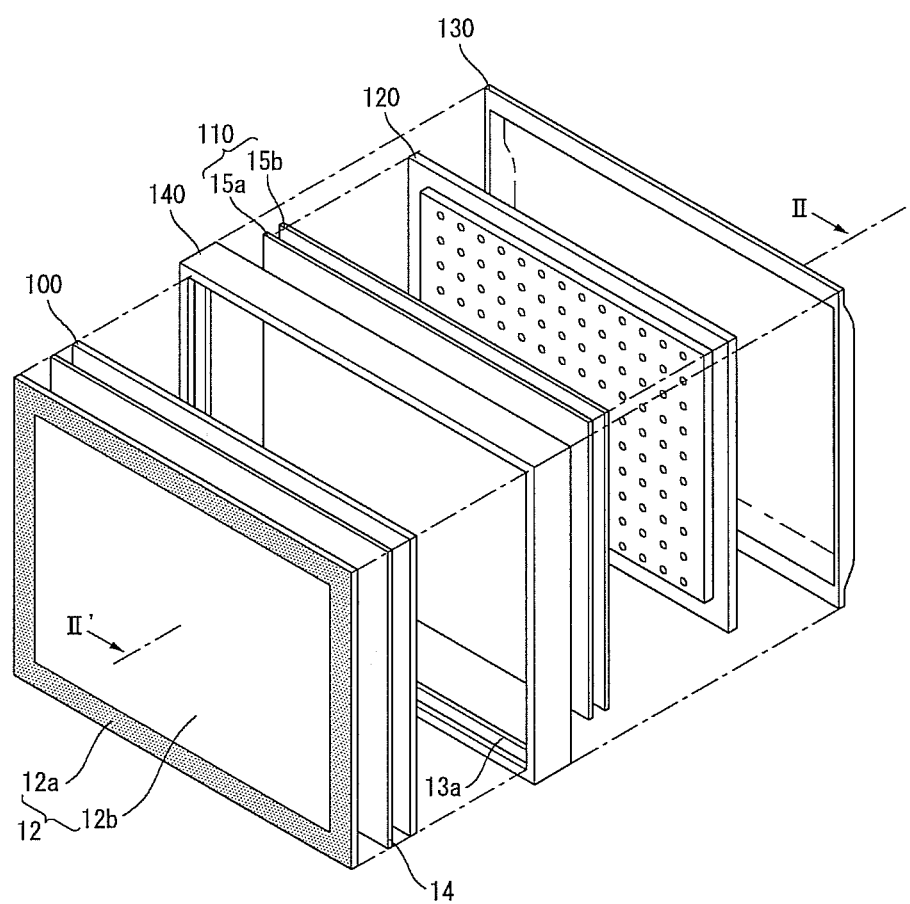
FIGS. 61 to 72 illustrate another configuration of a display device according to an example embodiment of the invention.

As shown in FIG. 61, a display device according to another example embodiment of the invention may include a display panel 100, a backlight unit including an optical layer 110 and a light source 120, a back cover 130, and a bracket 140.

An active retarder 14 may be positioned in the front of the display panel 100, thereby causing a 3D image to be displayed on the display panel 100. The active retarder 14 may be attached to a front surface of the display panel 100 using a transparent adhesive or may be coupled with the front surface of the display panel 100 using a structure.

The active retarder 14 controls a tilting angle of liquid crystals, first-circularly polarizes light coming from the display panel 100, and transmits the first circularly polarized light. Alternatively, the active retarder 14 controls a tilting angle of liquid crystals, second-circularly polarizes light coming from the display panel 100, and transmits the second circularly polarized light. The first circularly polarized light and the second circularly polarized light are perpendicular to each other. A left eye image and a right eye image are alternately displayed on the display panel 100 every one frame. The active retarder 14 first-circularly polarizes the left eye image and second-circularly polarizes the right eye image in synchronization the display timing.

A left eye glass of glasses a viewer uses includes a first circular polarizing filter, and a right eye glass of the glasses includes a second circular polarizing filter. Hence, the viewer views only the first circularly polarized left eye image through his or her left eye and views only the second circularly polarized right eye image through his or her right eye. As a result, the display device according to the embodiment of the invention implements a binocular disparity in a time division driving manner, thereby displaying the 3D image.

A filter 12 may be positioned in the front of the display panel 100. Preferably, the filter 12 may be laminated on the front surface of the display panel 100. The filter 12 may be exposed to the outside and may protect the display panel 100 forming an external appearance from a mechanical damage such as a scratch. The filter 12 may include an opaque layer 12a positioned at an edge of the filter 12 and a transparent layer 12b positioned inside the filter 12. The opaque layer 12a is positioned at a location substantially corresponding to a non-display area (i.e., a dummy area) of the display panel 100, and the transparent layer 12b is positioned at a location substantially corresponding to an active area of the display panel 100. The transparent layer 12b may be omitted in the filter 12.

The opaque layer 12a prevents the bracket 140 from being seen outside the display panel 100. Further, because the opaque layer 12a has as the same color as the bracket 140, when the display panel 100 is turned off, the display panel 100 and the bracket 140 looks like one part. In other words, because the user perceives the display panel 100 and the bracket 140 as one part, the opaque layer 12a may make the display panel 100 look larger than its actual size. The opaque layer 12a may be the blocking member.

The bracket 140 supports the display panel 100 and receives the backlight unit inside the bracket 140. The bracket 140 has a rectangular plane shape suitable for the shape of the display panel 100 and has a groove 13a formed in an inner wall thereof. A portion (i.e., one end) of the edge of the display panel 100 is received into the groove 13a of the bracket 140 and is fixed to the bracket 140. The optical layer 110 and the light source 120 are closely stacked in the rear of the bracket 140 with the bracket 140 interposed between the display panel 100 and the optical layer 110 and the light source 120.

The optical layer 110 may include a prism sheet 15a and a diffusion plate 15b. The optical layer 110 transfers light from the light source 120 to the display panel 100, thereby causing the image to be displayed on the display panel 100.

The back cover 130 may be formed of iron material, so as to improve the structural stability. The back cover 130 is coupled with the bracket 140 with the optical layer 110 and the light source 120 interposed between the back cover 130 and the bracket 140.

Figure 62:
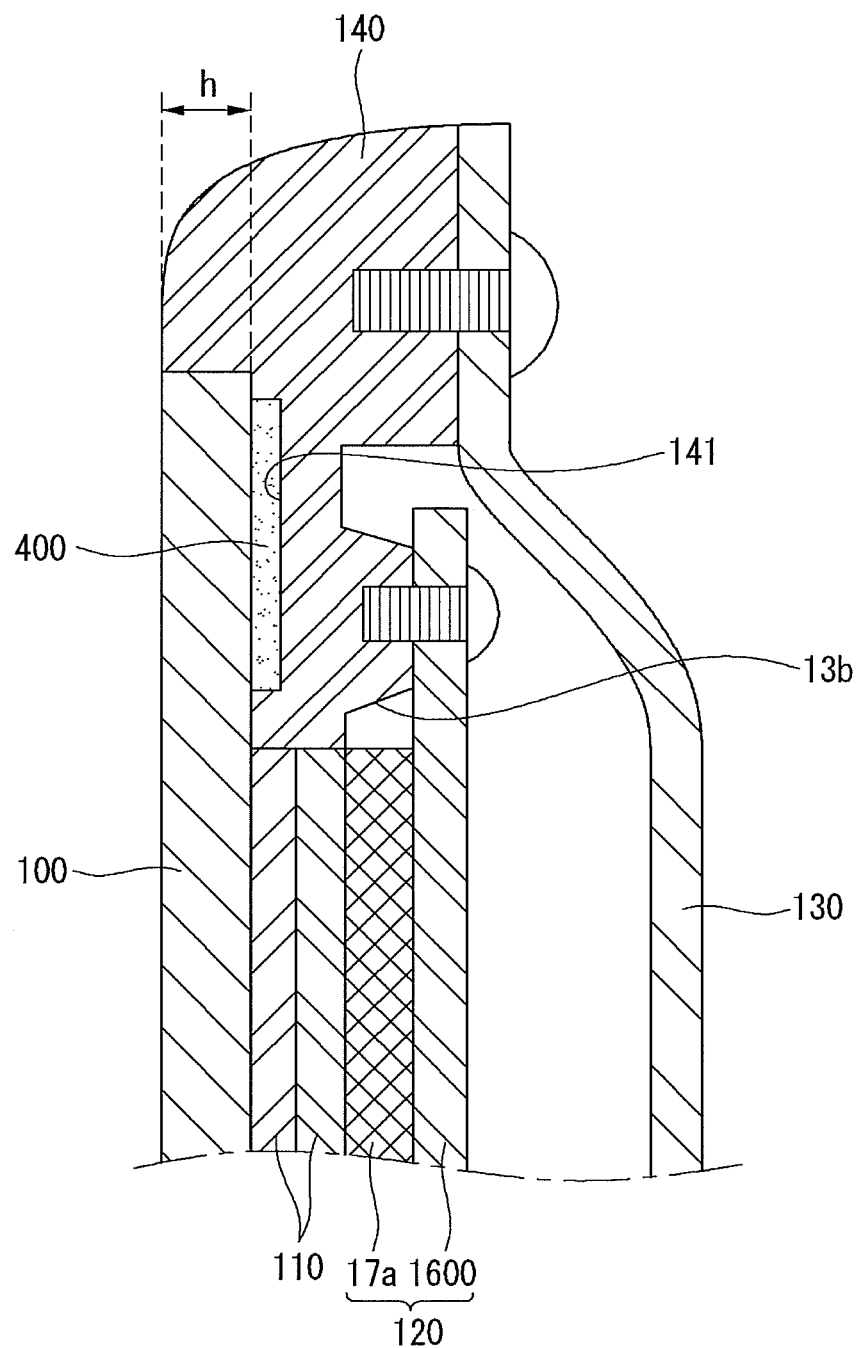

FIG. 62 is a cross-sectional view taken along line II-IP of FIG. 61. More specifically, FIG. 62 illustrates a coupling configuration of the display device.

As shown in FIG. 62, one end of the display panel 100 is received in the groove of the bracket 140, and the display panel 100 is fixed to the bracket 140 using an adhesive member 16. The bracket 140 may include a groove 141 in which an adhesive member 400 is positioned. The display panel 100 may be coupled with the bracket 140 with the same height 'h'.

The light source 120 may include a light emitting unit 17a and a support plate 1600. The light emitting unit 17a may have a direct type structure in which light sources, for example, light emitting diodes are mounted on a substrate. The support plate 1600 is a structure for structurally supporting the light emitting unit 17a and may be formed of aluminum with the good rigidity or iron material such as a steel sheet. The light emitting unit 17a is fixed to the support plate 1600 using an adhesive or a structure such as a bolt coupling. The support plate 1600 may be a frame.

One end of the support plate 1600 is fixed to the bracket 140 through a screw coupling between the support plate 1600 and a boss 13b of the bracket 140. The optical layer 110 is closely positioned and fixed between the light source 120 and the display panel 100. One end of the optical layer 110 may be fixed to the bracket 140 using an adhesive or a protrusion provided in the bracket 140, so as to prevent a movement of the optical layer 110. Furthermore, a fixer (not shown) for fixing the bracket 140 and the optical layer 110 is positioned between the bracket 140 and the optical layer 110. The fixer may remove a space between the bracket 140 and the optical layer 110, thereby fixing the optical layer 110.

Figure 63:
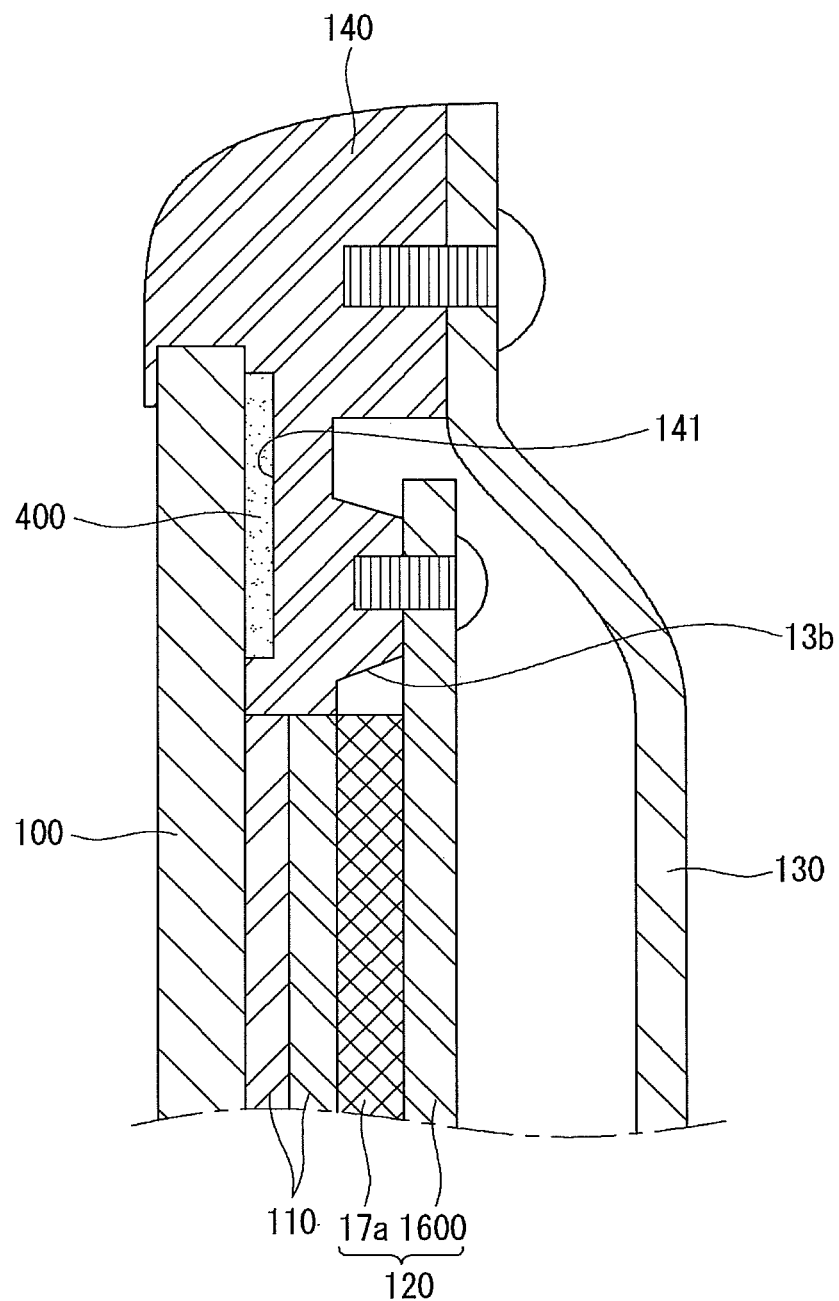

FIG. 63 illustrates another configuration of the bracket 140 in which the bracket 140 surrounds the edge of the display panel 100. As shown in FIG. 63, the bracket 140 surrounds the edge of the display panel 100 and extends to the inside of the display panel 100. In this instance, it is preferable that the bracket 140 hides only the non-display area (i.e., the dummy area) of the display panel 100.

Figure 64:
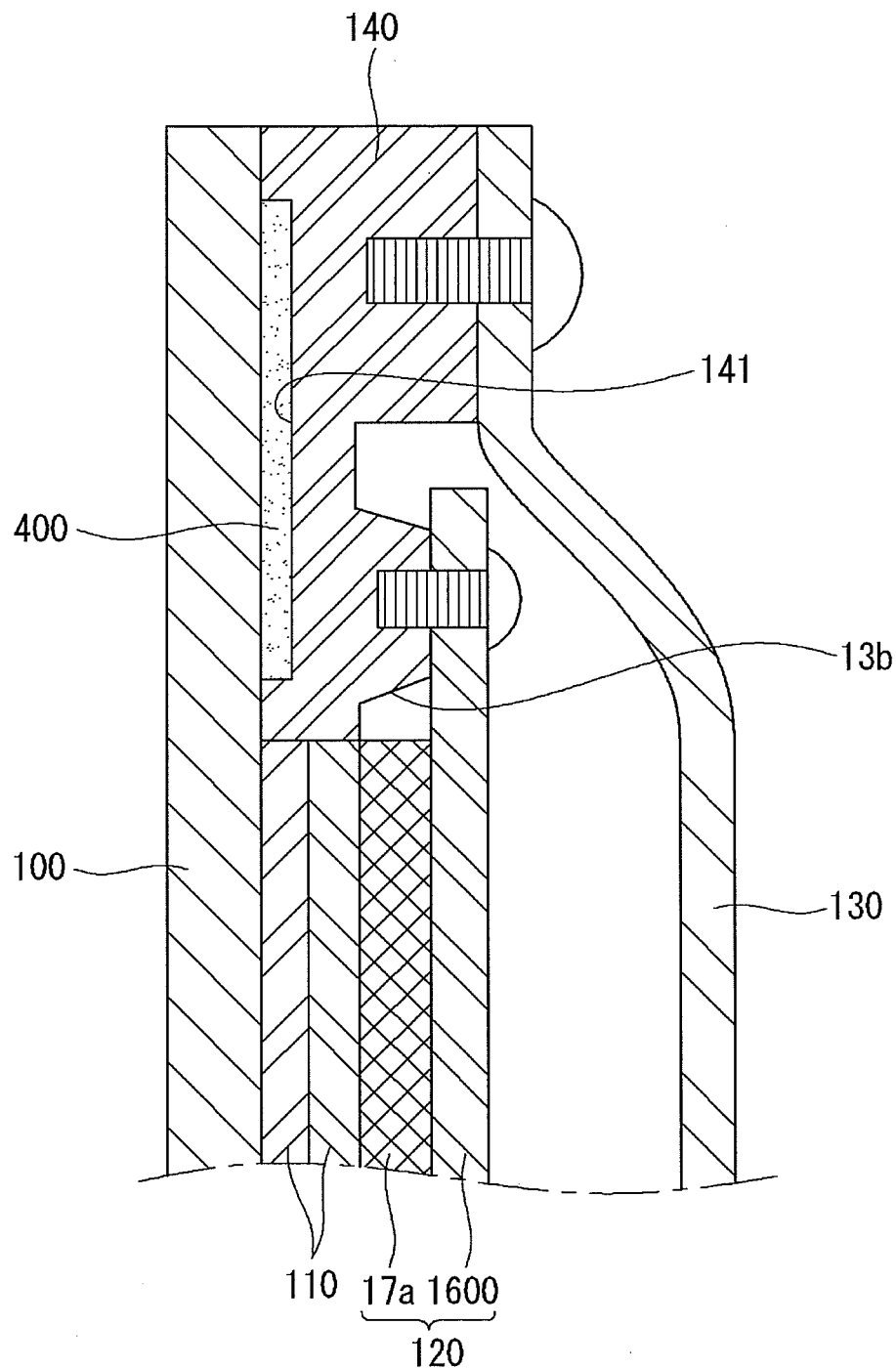

FIG. 64 illustrates that the bracket 140 and one end of the display panel 100 are disposed on the same line. As shown in FIG. 64, the bracket 140 and one end of the display panel 100 are disposed on the same line, and the bracket 140 and the display panel 100 are coupled with each other using an adhesive or a screw coupling.

Figure 65:
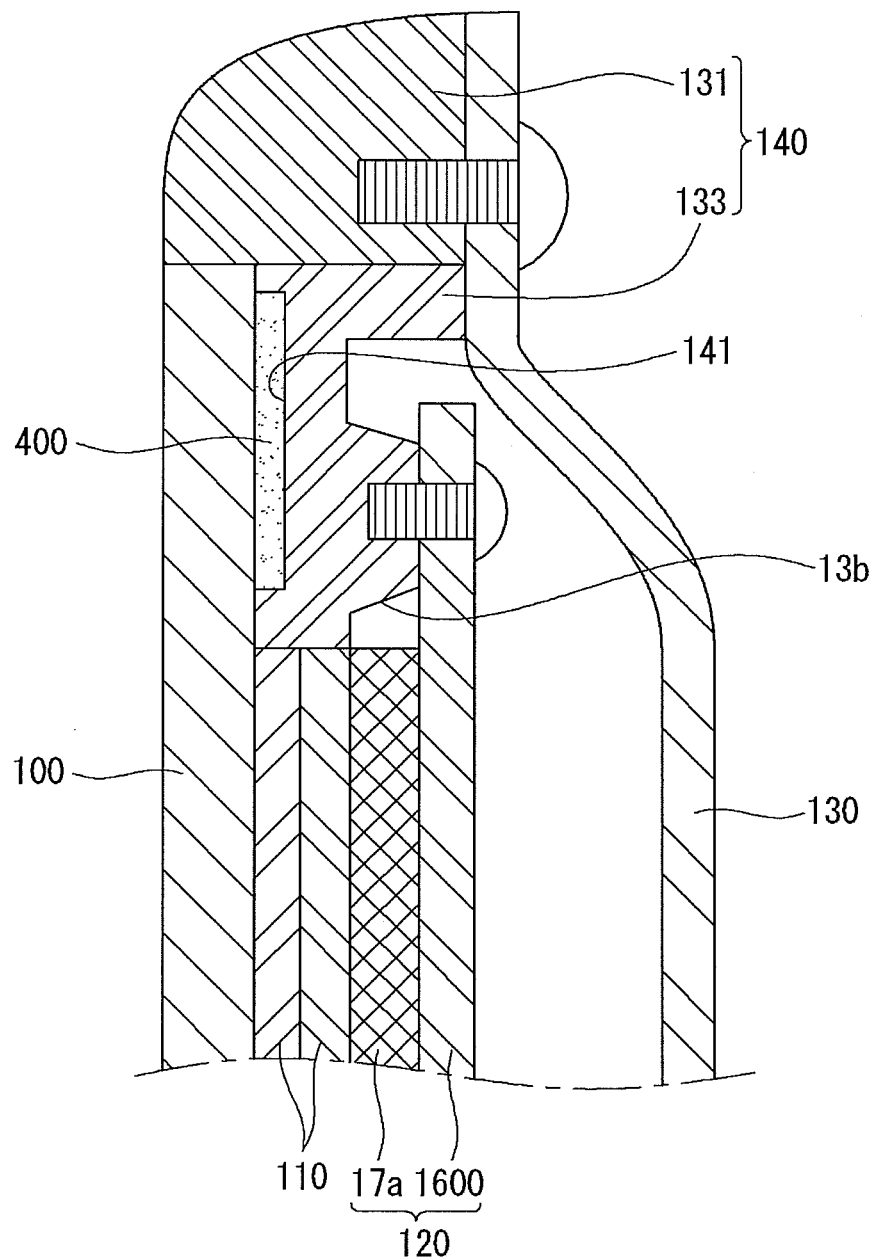

FIG. 65 illustrates that the bracket 140 is divided into a first portion 131 and a second portion 133. As shown in FIG. 65, the bracket 140 may include the first portion 131 surrounding the edge of the display panel 100 and the second portion 133 for fixing the display panel 100. The second portion 133 reduces a space between the light source 120 and the optical layer 110, that are positioned inside the second portion 133, and supports the light source 120 and the optical layer 110 so that the light source 120 and the optical layer 110 do not move.

Figure 66:
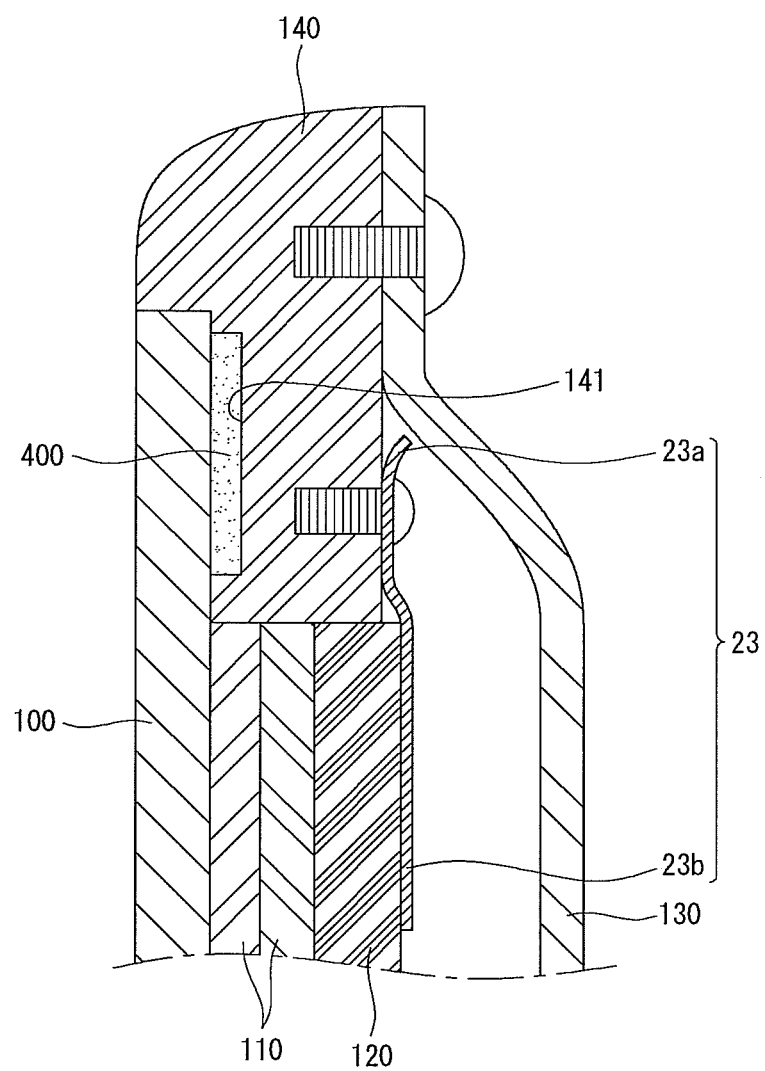

FIG. 66 illustrates that the light source 120 is fixed using a support pin 23. One end 23a of the support pin 23 is fixed to the bracket 140 through a screw coupling, and the other end 23b of the support pin 23 surrounds the light source 120 and extends to the bottom of the light source 120. Hence, the light source 120 is fixed by the elastic force of the support pin 23.

As above, when the support pin 23 is used, the support plate 1600 used to support the light source 120 may be omitted. Therefore, a thickness of the backlight unit may be reduced.

Figure 67:
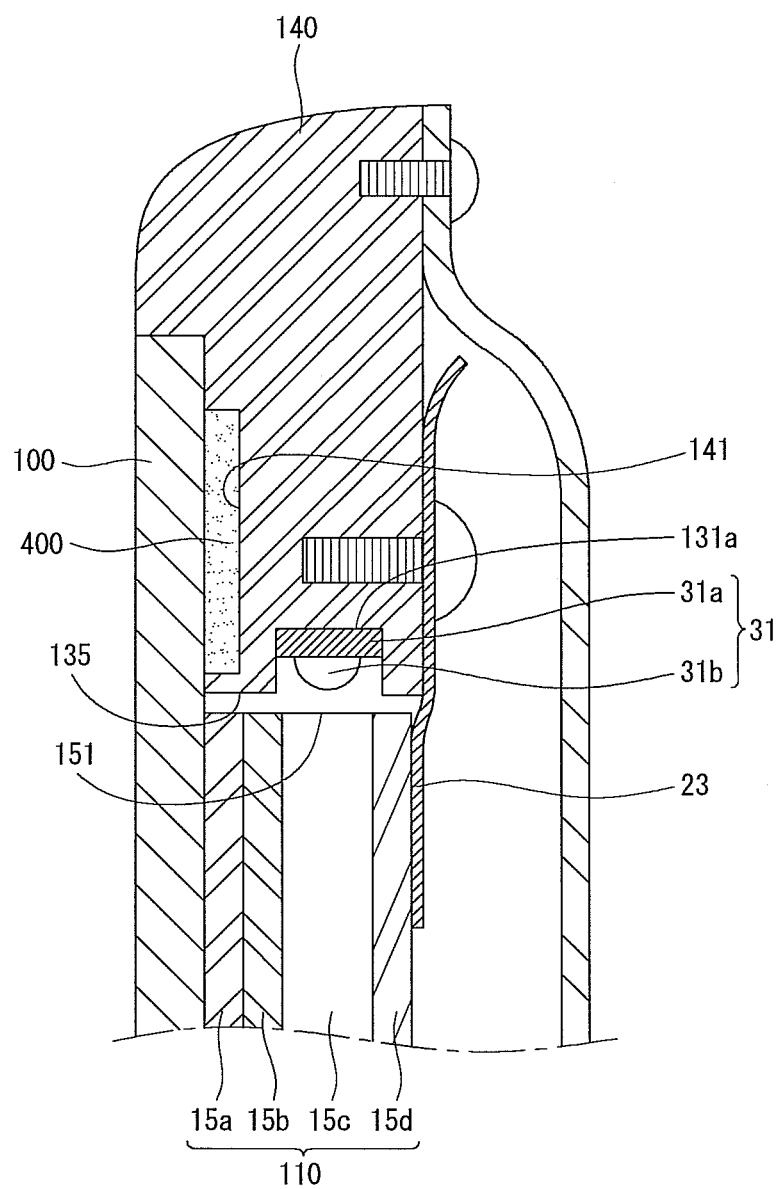

FIG. 67 illustrates an edge type backlight unit having a structure different from the above-described direct type backlight unit. Namely, the edge type backlight unit may include an edge type light source.

As shown in FIG. 67, the optical layer 110 may further include a light guide plate 15c and a reflection plate 15d.

The light guide plate 110c guides light coming from the side of the light sources, thereby causing the light to be uniformly incident on the entire surface of the display panel 100. The reflection plate 110d reflects light travelling toward a bottom surface of the reflection plate 110d on a front surface of the reflection plate 110d on which the display panel 100 is formed.

The light guide plate 110c and the reflection plate 110d are sequentially stacked and are fixed using the support pin 23. One end of the support pin 23 is screw-coupled with the bracket 140, and the other end extends to the bottom of the reflection plate 110d. Hence, the optical layer 110 may be supported and fixed by the elastic force of the support pin 23.

Figure 68:
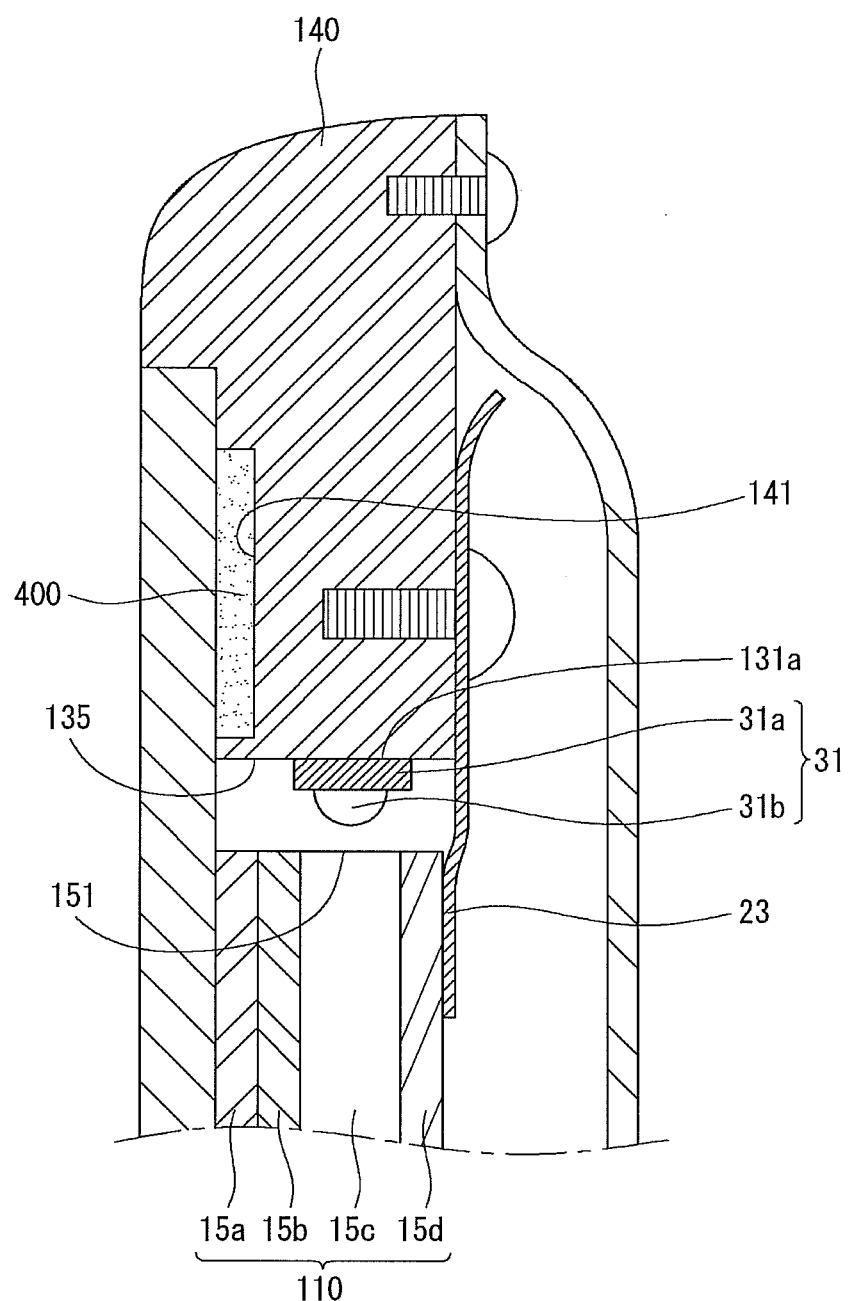

A backlight unit 31 includes a light emitting diode 31b serving as a light source and a substrate 31a on which the light emitting diode 31b is mounted. The size of the substrate 31a and the number of light emitting diodes 31b may vary. The backlight unit 31 may be fixed to a receiving groove 131a using an adhesive. The receiving groove 131a may prevent a leakage of light. The receiving groove 131a may be omitted as shown in FIG. 68.

The thickness of the module having the edge-type backlight unit may be less than the thickness of the module having the direct type backlight unit.

Figure 69:
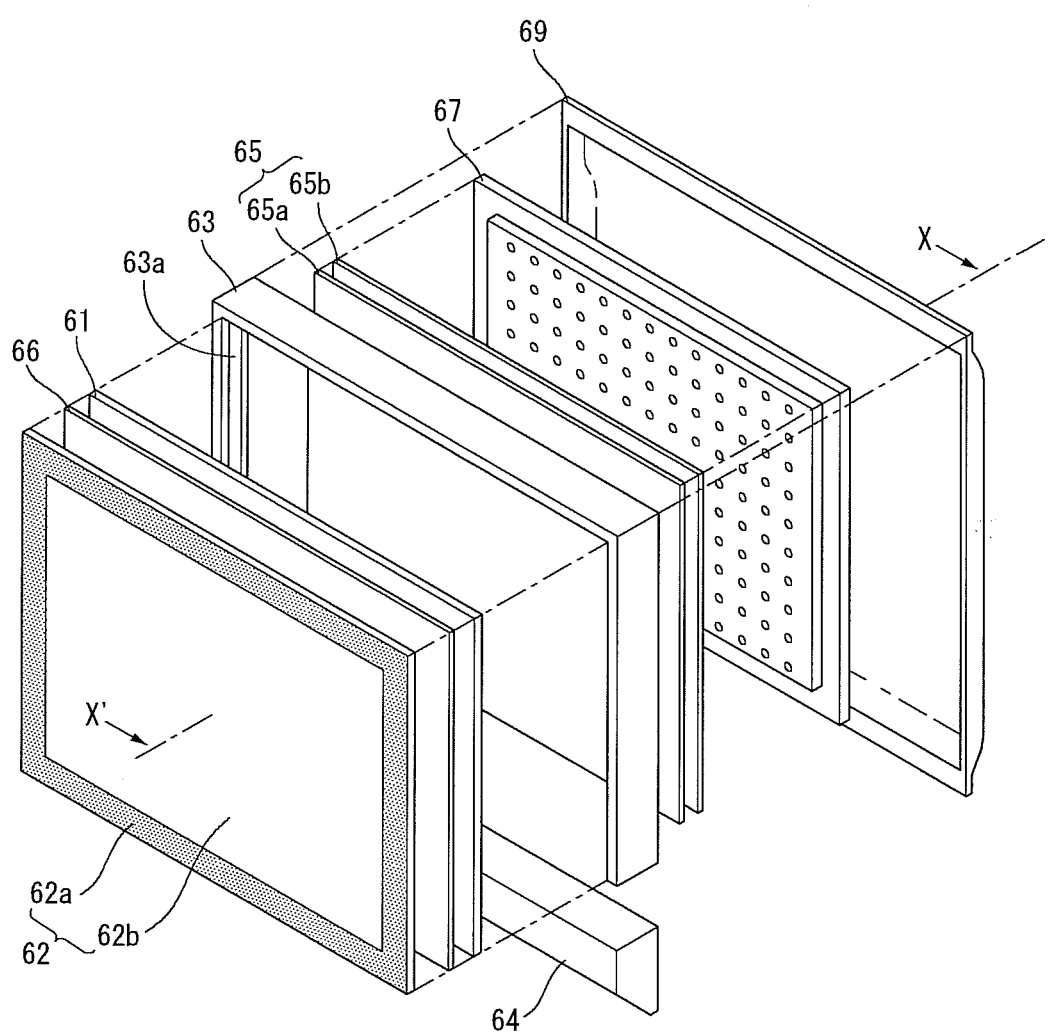

As shown in FIG. 69, a display device according to another example embodiment of the invention includes a display panel 61, a first bracket 63, a second bracket 64, an optical layer 65, a backlight unit 67, and a back cover 69.

The display panel 61 displaying an image is exposed to a front surface of the display device to form an external appearance of the display device. A filter 62 including a transparent 62a and an opaque layer 62b and an active retarder 66 making a 3D image may be selectively positioned in the front of the display panel 61.

The first bracket 63 supports the display panel 61 and receives the optical layer 65 and the backlight unit 67 therein. The first bracket 63 has a ⊏-shape in which a lower portion of the first bracket 63 is open, so that the first bracket 63 can support three portions of the display panel 61. A recess is formed in an inside wall of the first bracket 63 and supports the display panel 61.

The optical layer 65 and the backlight unit 67 are sequentially stacked and closely positioned in the rear of the display panel 61 with the first bracket 63 interposed between the display panel 61 and the optical layer 65 and the backlight unit 67.

The second bracket 64 is positioned under a module.

Figure 70:
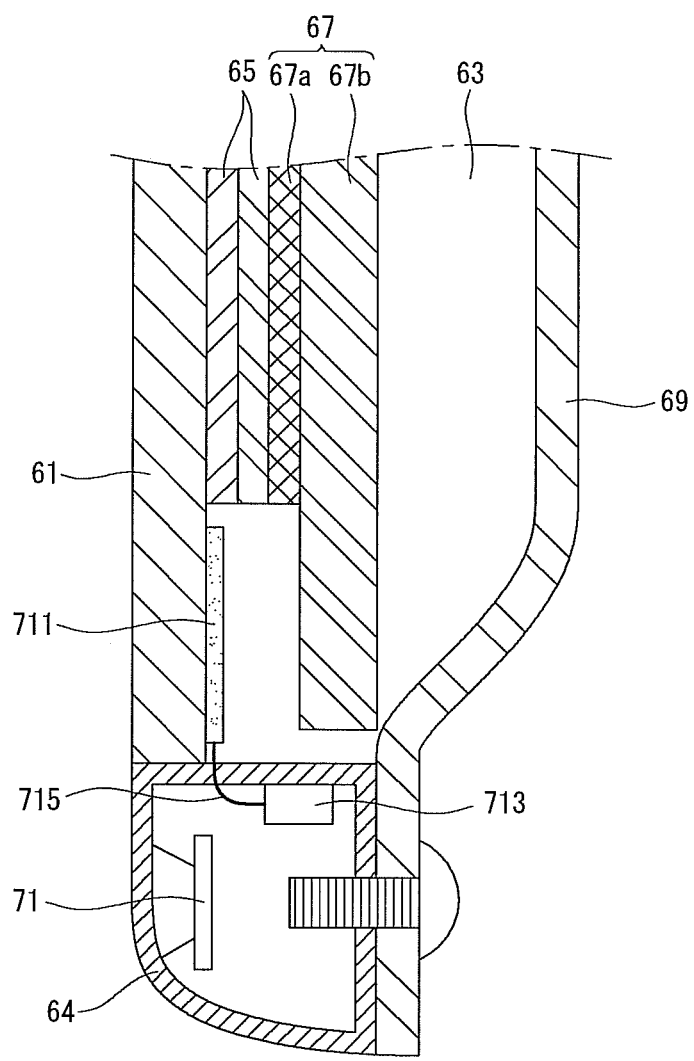

FIG. 70 is a cross-sectional view taken along line X-X' of FIG. 69. More specifically, FIG. 70 illustrates a lower coupling configuration of the display device including the second bracket 64.

As shown in FIG. 70, the second bracket 64 is positioned under the module to form an external appearance of the display device. It is preferable that the second bracket 64 under the module is positioned close to the display panel 61, and the second bracket 64 and the surface of the display panel 61 are positioned on the same line. When the second bracket 64 and the surface of the display panel 61 are positioned on the same line, a boundary between the second bracket 64 and the display panel 61 does not disappear. Hence, the display panel 100 may look larger than its actual size, and the design of the display device may be improved.

An electrode 711 for sensing changes in a capacitance may be formed on an inside surface of one end of the display panel 61. The electrode 711 may be formed of a transparent conductive material and may have a diamond cell structure of a lattice shape. When the user indirectly touches the electrode 711 with the display panel 61 interposed between the user and the electrode 711, a capacitance at a touch position varies. The capacitance at the touch position is then transferred to a controller 713. A row coordinate and a column coordinate of the touched electrode lattice are read, and the touch position is understood. The controller 713 generates a control signal corresponding to the touch position and thus may control an operation of the display device. The controller 713 turns up or down the volume of the display device based on the touch position and thus may control an operation of the display device.

It is preferable that only one of the upper substrate and the lower substrate exists and an electrode is formed on a back surface of the remaining substrate, so as to increase the touch sensitivity of the electrode 711.

The controller 713 connected through above-described electrode 711 serving as a touch sensor and a signal line 715, a speaker 71, a remote control receiving module (not shown), etc. may be positioned inside the second bracket 64. The display device having the slim structure may be manufactured by disposing the functional modules inside the second bracket 64. Hence, the space of the display device may be efficiency used.

The second bracket 64 may be screw-coupled with the back cover 69 and may be fixed to the back cover 69. As shown in FIG. 60, the second bracket 64 may be fixed to the side of the first bracket 63 using an adhesive in a state where the first bracket 63 extends to the side 641 of the second bracket 64. The second bracket 64 may be coupled with the first bracket 63 and the back cover 69.

Figure 71:
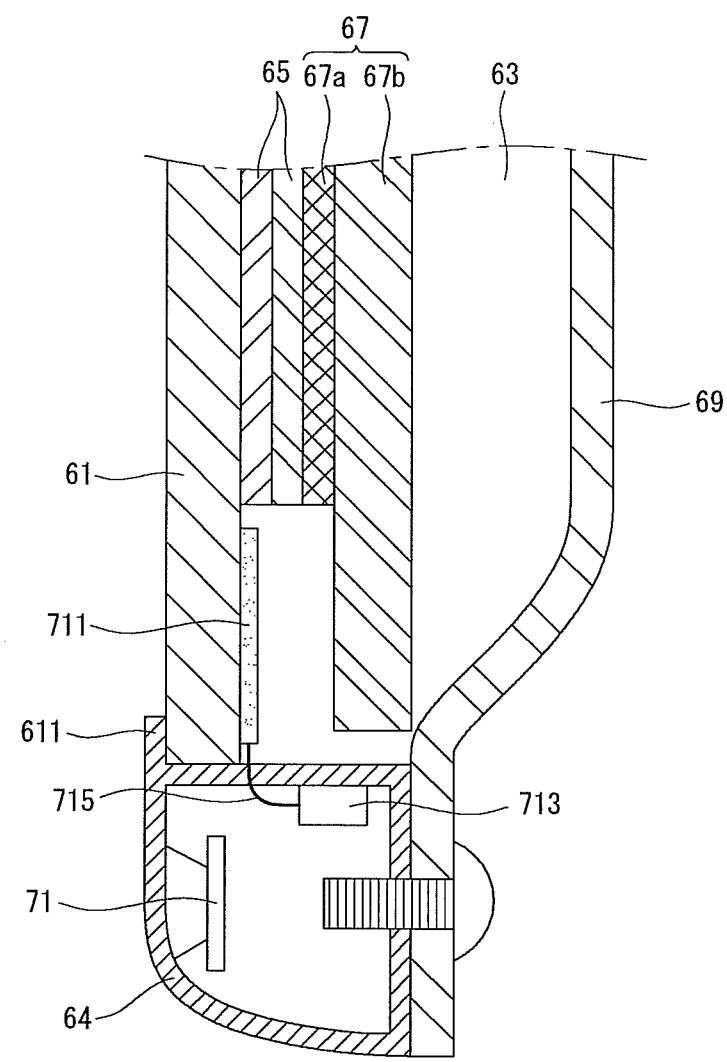
Figure 72:
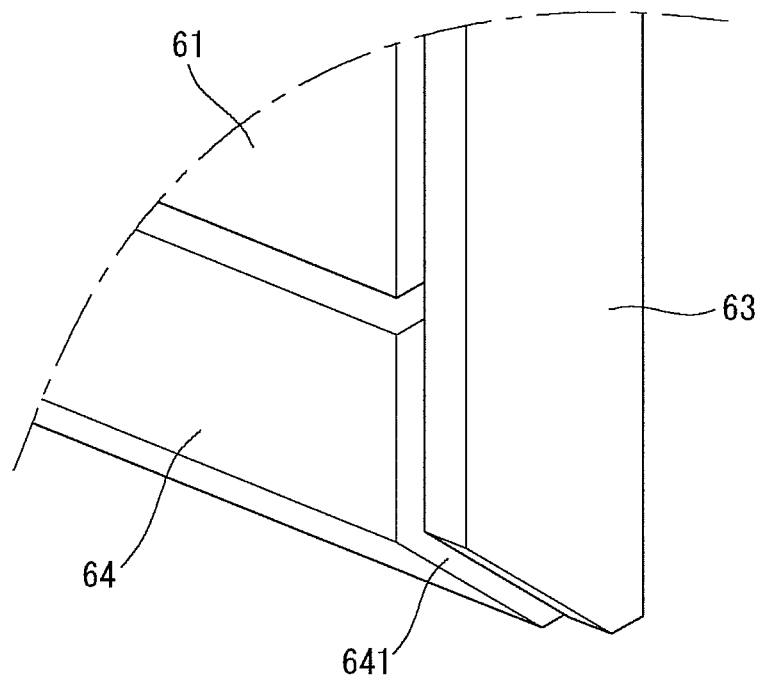

FIG. 72 illustrate that the second bracket 64 includes the protrusion 641 extending to the inner of the display panel 61. As shown in FIGS. 71 and 72, the protrusion 641 extends along a longitudinal direction of the second bracket 64, surrounds a lower part of the display panel 61, and is positioned on the display panel 61. It is preferable that the protrusion 641 is positioned so as to hide only the non-display area of the display panel 61. As above, because the protrusion 641 surrounds an end portion of the display panel 61 corresponding to a structural weak portion, the protrusion 641 protects the display panel 61 and prevents a pollution material such as dust from penetrating into the display panel 61. As above, the second bracket 64 under the display panel 61 may cover a portion of the front surface of the display panel 61. Thus, the second bracket 64 may be referred to as a bottom cover.

Figure 73:
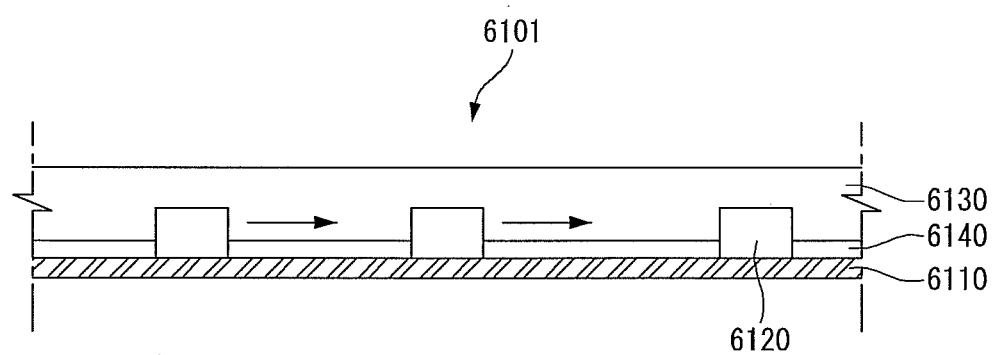
FIGS. 73 to 75 illustrate an exemplary configuration of a backlight unit.
Figure 74:
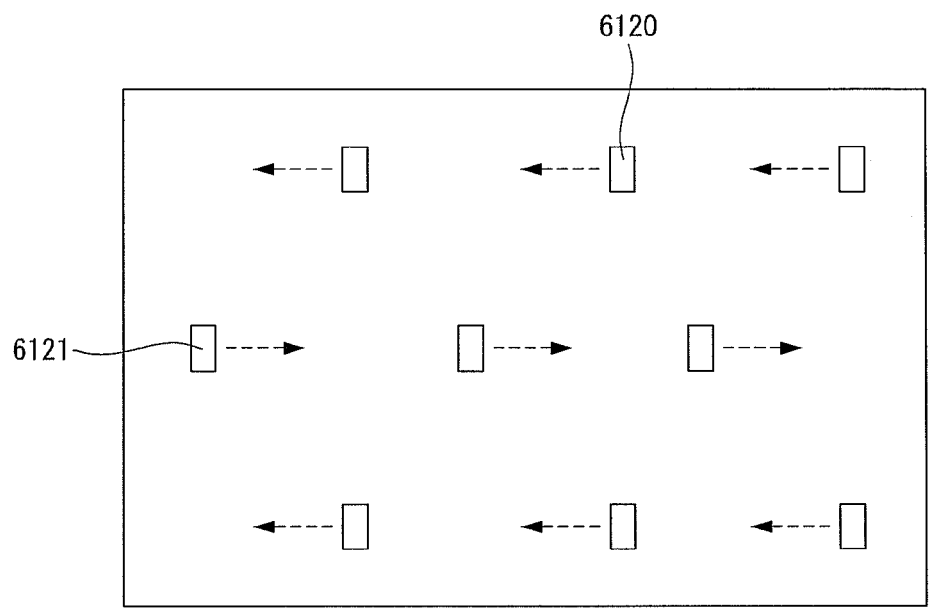
Figure 75:
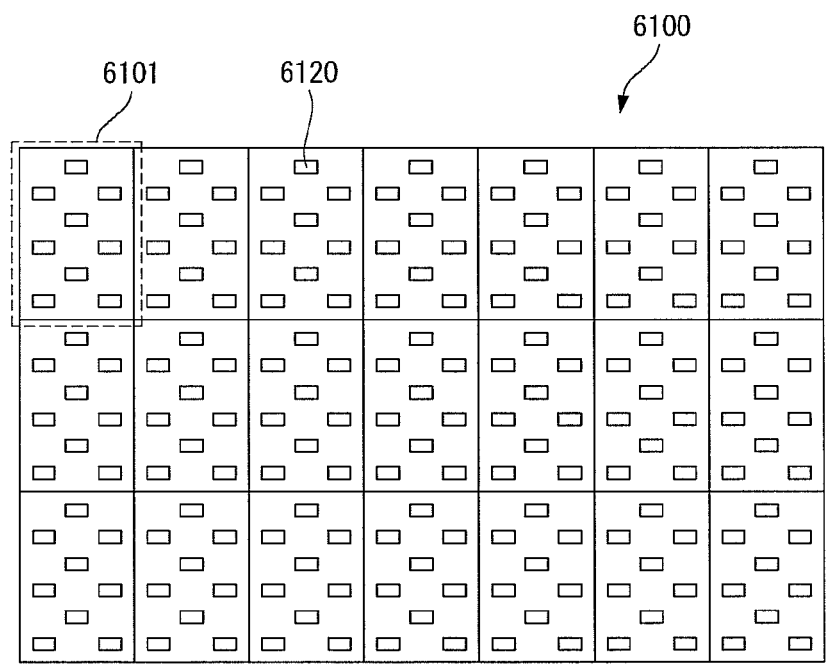

FIGS. 73 to 75 illustrate an exemplary configuration of a light source module of the backlight unit. In the following description, the descriptions of the configuration and the structure described above are omitted.

As shown in FIG. 73, an optical assembly 6101 of a backlight unit includes a first layer 6110, a plurality of light sources 6120, and a second layer 6130.

The plurality of light sources 6120 are formed on the first layer 6110, and the second layer 6130 is formed on the first layer 6110 to cover the plurality of light sources 6120.

The first layer 6110 may be a substrate on which the light sources 6120 are mounted. An electrode pattern (not shown) for connecting the light sources 6120 is formed on the first layer 6110. The first layer 6110 may be a metal printed circuit board (PCB) obtained by forming an insulating layer using a metal such as aluminum in which electric current does not flow.

The light sources 6120 may be one of a light emitting diode (LED) chip and a LED package having at least one LED chip. It is preferabelt that the light sources 6120 are a side view type LED package in which a light emitting surface is formed to face the side surface. The light sources 6120 emit red, green, and blue light, or may emit white light.

The second layer 6130 is formed on the first layer 6110 to cover the light sources 6120. The second layer 6130 transmits and diffuses light emitted from the light sources 6120, thereby causing the light sources 220 to uniformly provide the light to the display panel.

A reflection layer 6140 for reflecting the light from the light sources 6120 may be formed between the first layer 6110 and the second layer 6130, more particularly, on the first layer 6110. The reflection layer 6140 again reflects light totally reflected from a boundary between the second layer 6130 and the reflection layer 6140, thereby more widely diffusing the light emitted from the light sources 6120.

The reflection layer 6140 may use a sheet in which a white pigment, for example, titanium oxide is dispersed, a sheet in which a metal deposition layer is stacked on the surface of the sheet, a sheet in which bubbles are dispersed so as to scatter light, etc. among various types of sheets formed of synthetic resin material. The surface of the reflection layer 6140 may be coated with silver (Ag) so as to increase a reflectance. The reflection layer 6140 may be coated on the first layer 6110. The second layer 6130 may be formed of a light transmissive material, i.e., silicon or an acrylic resin. Other materials may be used for the second layer 6130.

The second layer 6130 may be formed of a resin, that is capable of diffusing the light from the light sources 6120 and has a refractive index of approximately 1.4 to 1.6, so that the optical assembly 6101 has the uniform luminance.

The second layer 6130 may be formed by applying and curing a liquid or gel-type resin on the first layer 6110 and the plurality of light sources 6120. Alternatively, the second layer 6130 may be separately fabricated and then may be attached on the first layer 6110.

As a thickness of the second layer 6130 increases, the second layer 6130 more widely diffuses the light emitted from the light sources 6100. Hence, the light sources 6100 may provide the light having the uniform luminance to the display panel. On the other hand, as the thickness of the second layer 6130 increases, an amount of light absorbed in the second layer 6130 increases. Hence, the luminance of light which the optical assembly 6101 provides to the display panel may entirely decrease. Accordingly, the thickness of the second layer 6130 may be approximately 0.1 mm to 4.5 mm, so that the backlight unit 6100 can provide light having the uniform luminance to the display panel without a reduction in the luminance.

As shown in FIG. 74, the side view type LEDs 6120 are positioned. The LEDs 6120 emit light in a side direction. Thus, the LEDs 6120 are arranged in two or more lines, so that the optical assembly 6101 provides the light having the uniform luminance. The LEDs 6120 arranged on the same line emit light in the same direction.

For example, the adjacent light sources 6120 positioned on the left and right sides of the first light source 6120 emit light in the same direction (in an arrow direction in FIG. 74) as the first light source 6120. The adjacent light sources 6121 positioned on the left and right sides of the second light source 6121 emit light in the opposite direction of the first light source 6120.

As above, because the LEDs 6120 and 6121 emit light in the opposite directions along the line, the luminance of light may be prevented from being concentrated or reduced in a predetermined region of the optical assembly 6101.

The optical assemblies 6101 thus formed may form a light source module 6100. The light source module 6100 may be driven in a global dimming method, a local dimming method, an impulsive driving method, or other driving methods.

For example, the light source module 6100 may be divided into a plurality of driving regions and may operate. The display quality, for example, the contrast ratio and the clarity of the image may be improved by driving the light source module 6100 so that luminances of the driving regions of the light source module 6100 are equal to a luminance of an image signal. Accordingly, the light source module 6100 may be manufactured by assembling a plurality of components. For example, as shown in FIG. 75, the light source module 6100 may be manufactured using the plurality of optical assemblies 6101. In this instance, only some of the optical assemblies 6101 may be independently driven to provide light. For this, light sources 6120 included in each of the optical assemblies 6101 may be independently controlled.

A region of the display panel corresponding to one optical assembly 6101 may be divided into two or more blocks, and the display panel and the light source module 6100 may be separately driven by the unit of a block. As above, when the light source module 6100 is configured using the plurality of optical assemblies 6101, a manufacturing process of the light source module 6100 may be simplifed and a loss generated in the manufacturing process may be minimized. Further, the light source module 6100 has an advantage applicable to backlight units having various sizes through mass production by standardizing the optical assemblies 6101.

Furthermore, when some of the LEDs included in the light source module 6100 have a failure, only the optical assembly having the failure has only to be replaced without replacing the light source module 6100. Therefore, a replacing work may be easily performed and the part replacement cost may be saved.

FIGS. 76 to 91 illustrate another configuration of a display device according to an example embodiment of the invention. In the following description, the descriptions of the configuration and the structure described above are omitted.

Figure 76:
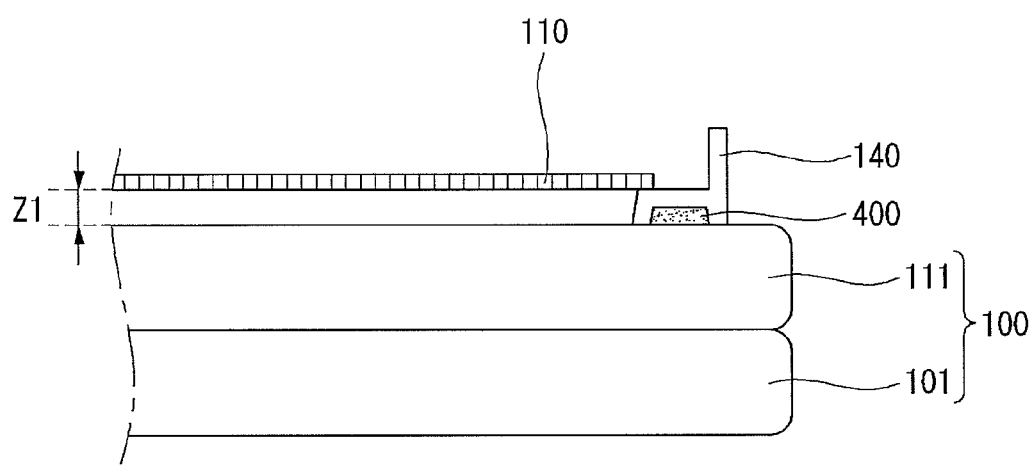
FIGS. 76 to 91 illustrate another method for disposing an optical layer.

As shown in FIG. 76, the optical layer 110 may not be fixed to the bracket 140 and may be placed on one surface of the bracket 140. In this instance, the optical layer 110 may move on the bracket 140.

The shape of the bracket 140 shown in FIG. 76 is different from the shape of the bracket 140 described above. However, the bracket 140 shown in FIG. 4 may be applied to the structure illustrated in FIG. 76. In other words, the embodiment of the invention does not limit the shape of the bracket 140.

Because the structure illustrated in FIG. 76 may be implemented through the simple process for disposing the optical layer 110 on the bracket 140, the manufacturing process may be simplified.

Figure 77:
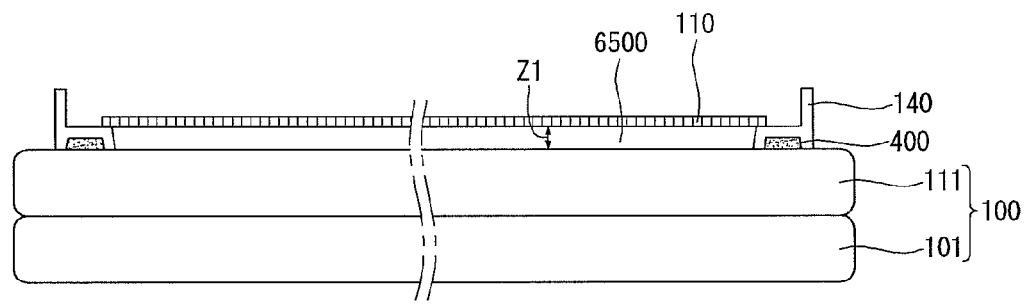

As above, when the optical layer 110 is placed on the bracket 140, the optical layer 110 may be separated from the back substrate 111 of the display panel 100 by a predetermined distance Z1. Hence, as shown in FIG. 77, an air gap 6500 may be formed between the back substrate 111 and the optical layer 110.

As above, when the air gap 6500 is formed between the back substrate 111 and the optical layer 110, the optical characteristics of the display device may be improved by the air gap 6500.

Figure 78:
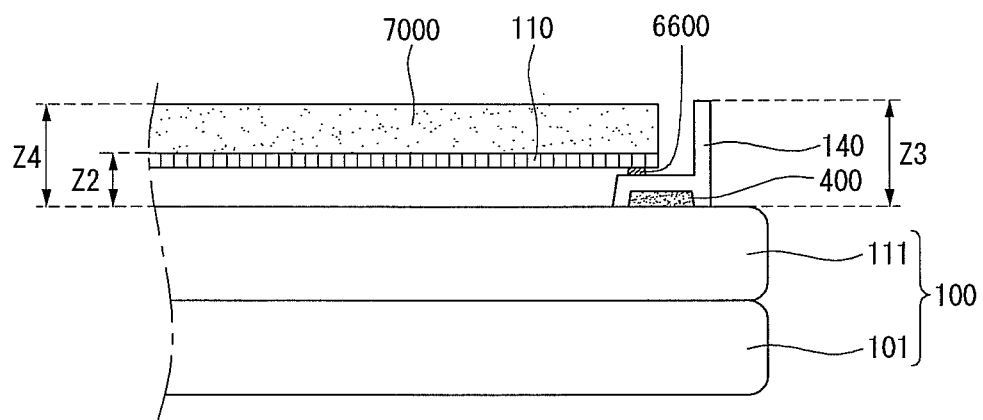

As shown in FIG. 78, a fixing part 6600 may be disposed on one surface of the bracket 140, and the optical layer 110 may be disposed on the fixing part 6600. The fixing part 6600 may have a shape protruding in the direction away from the display panel 100.

As above, when the optical layer 110 is disposed on the fixing part 6600, the size of a contact surface between the optical layer 110 and the fixing part 6600 may be relatively small. Therefore, a damage of the optical layer 110 may be prevented.

The fixing part 6600 contacting the optical layer 110 may be tender than the bracket 140, so as to suppress the movement of the optical layer 110 and to sufficiently prevent the damage of the optical layer 110. For example, the fixing part 6600 may contain polyurethane.

A light guide plate 7000 may be disposed in the rear of the optical layer 110. In this instance, the backlight unit may include an edge type light source, the optical layer 110, the light guide plate 7000, and a frame. When the backlight unit includes the light guide plate 7000, the edge type light source may be disposed on the side of the light guide plate 7000.

A maximum height Z2 of the optical layer 110 may be less than a height Z3 of the bracket 140 as measured from the back surface of the back substrate 111, so as to prevent the movement of the optical layer 110.

When the light guide plate 7000 is disposed in the rear of the optical layer 110, a maximum height Z4 of the light guide plate 7000 may be less than the height Z3 of the bracket 140 as measured from the back surface of the back substrate 111, so as to prevent the movement of the light guide plate 7000.

Figure 79:
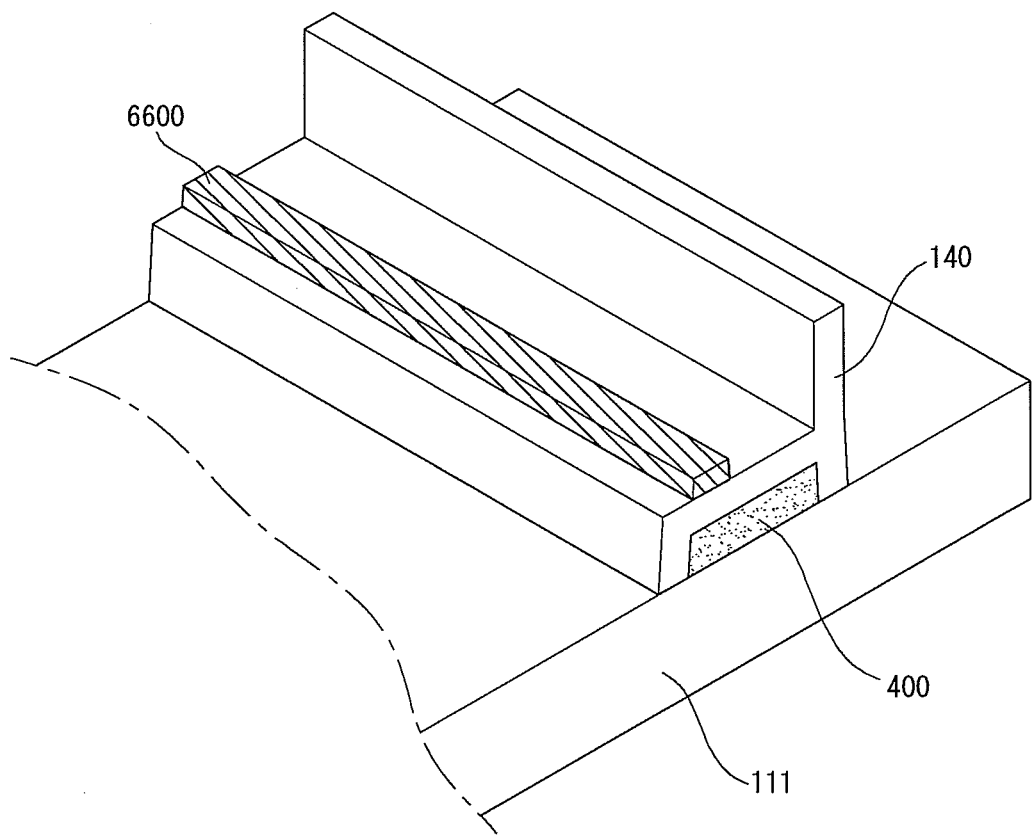

As shown in FIG. 79, the fixing part 6600 may have a stripe shape. In this instance, one fixing part 6600 may be disposed on one bracket 140.

Figure 80:
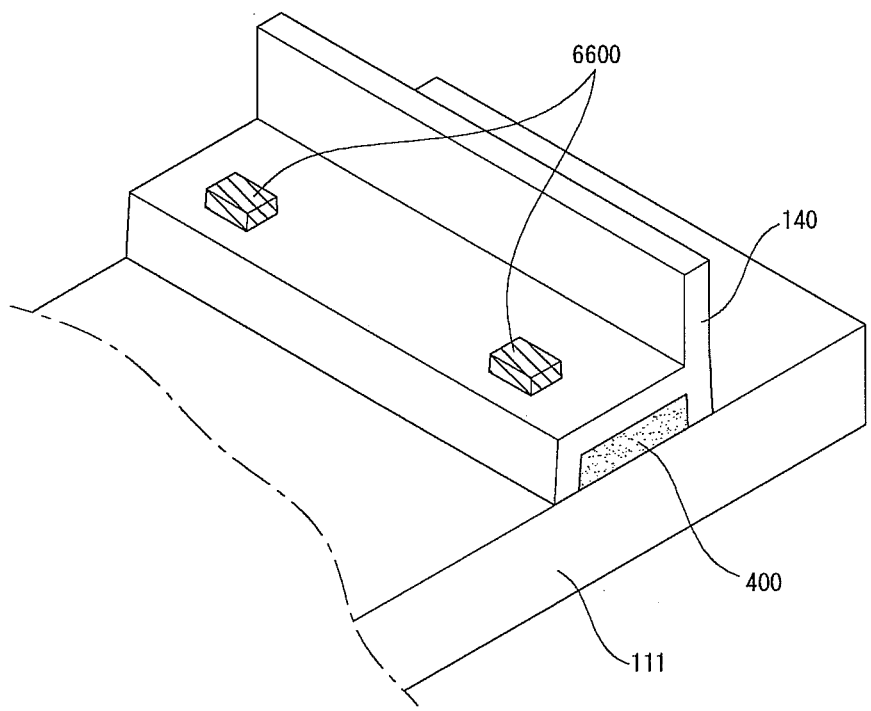

Alternatively, as shown in FIG. 80, the plurality of fixing parts 6600 may be formed. Namely, the plurality of fixing parts 6600 may be disposed on one bracket 140. In this instance, the size of a contact surface between the optical layer 110 and the fixing part 6600 may be further reduced.

Figure 81:
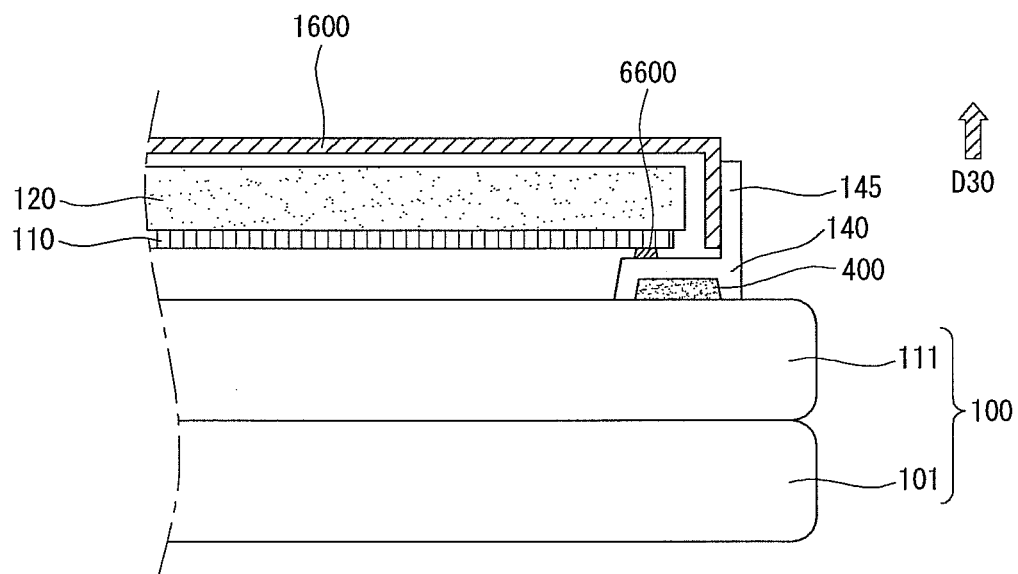

As shown in FIG. 81, the frame 1600 may be disposed in the rear of the optical layer 110. The frame 1600 may be fixed to the bracket 140. For example, the bracket 140 may include a protrusion 145 protruding in a direction D30 away from the display panel 100, and the frame 1600 may be connected to the protrusion 145. In this instance, although not shown, the frame 1600 may be connected to the protrusion 145 of the bracket 140 using a fastening member such as a screw.

In other word, the bracket 140 has a recess (A groove) on a first surface where the adhesive for adhesive layer 400 is applied. And the bracket has a first protrusion 145 extending from a second surface. In this instance, the first and second surfaces 1000FS, 1000SS being opposite surface.

In the structure illustrated in FIG. 81, when the direct type light source is installed, the light source 120 may be disposed between the frame 1600 and the optical layer 110.

Figure 82:
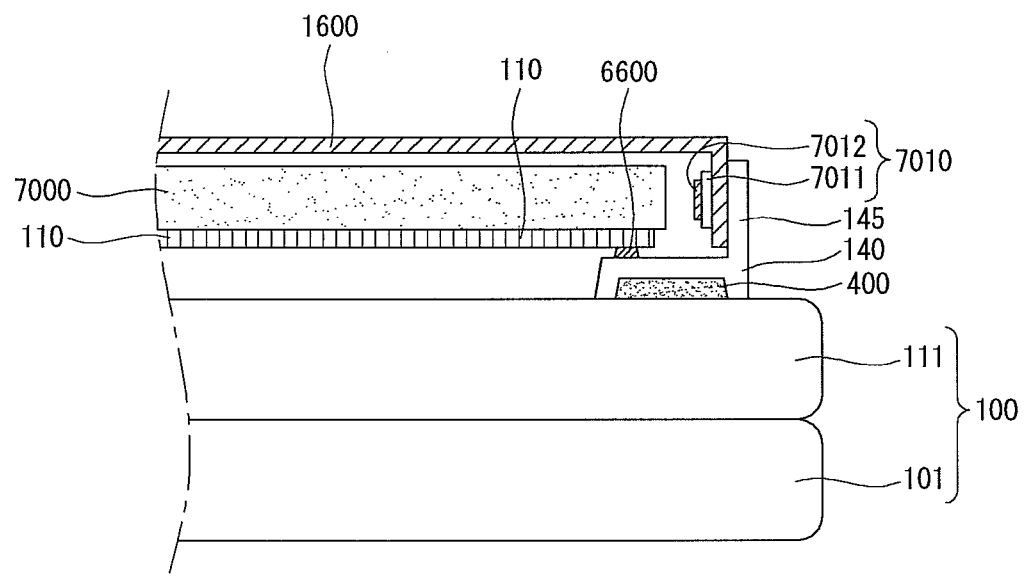

As shown in FIG. 82, when the edge type light source is installed, the light guide plate 7000 may be disposed between the frame 1600 and the optical layer 110 and an edge type backlight unit 7010 may be disposed on the side of the light guide plate 7000. The edge type backlight unit 7010 may include a substrate 7011 and a light source 7012 such as an LED disposed on the substrate 7011.

The display device according to the embodiment of the invention may include the edge type backlight unit 7010 or the direct type backlight unit. In other words, when there are no comments, both the edge type backlight unit and the direct type backlight unit may be applied to the display device according to the embodiment of the invention.

Figure 83:
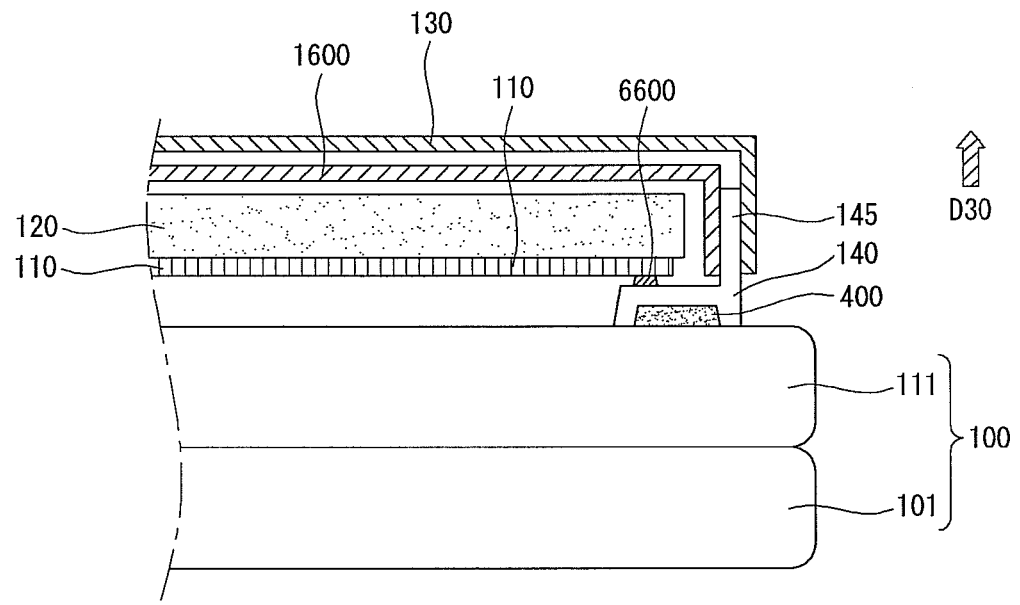

As shown in FIG. 83, the back cover 130 may be disposed in the rear of the frame 1600. The back cover 130 may be fixed to the bracket 140. For example, the back cover 130 may be fixed to the protrusion 145 of the bracket 140 using a predetermined fastening member (not shown). Preferably, the frame 1600 may be connected to one side of the protrusion 145 of the bracket 140, and the back cover 130 may be connected to the other side of the protrusion 145. In this instance, a portion of the frame 1600 and a portion of the back cover 130 may be positioned opposite each other with the bracket 140 interposed therebetween.

Figure 84:
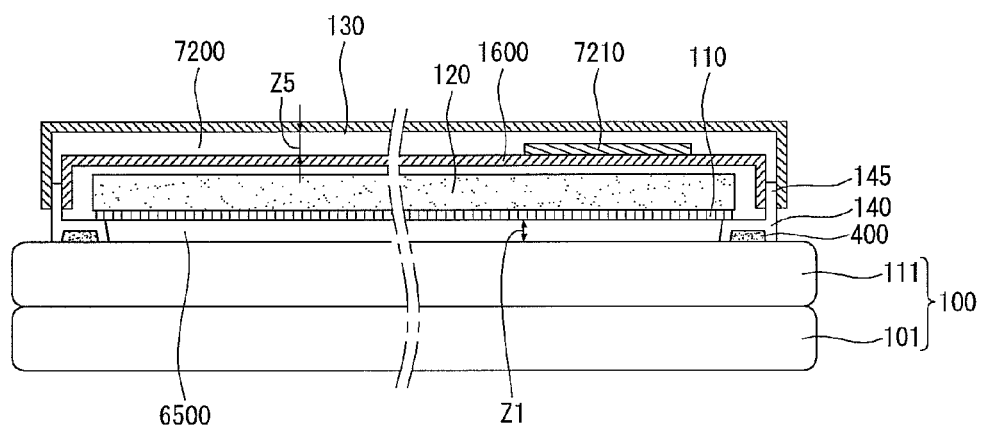

As shown in FIG. 84, a driving board 7210 for supplying a driving signal to the display panel 100 may be disposed between the frame 1600 and the back cover 130.

Further, an air gap 7200 may be formed between the frame 1600 and the back cover 130. The air gap 7200 may provide a space for disposing the driving board 7210 between the frame 1600 and the back cover 130.

In the embodiment disclosed herein, the air gap 6500 formed between the back substrate 111 and the optical layer 110 is referred to as a first air gap, and the air gap 7200 formed between the frame 1600 and the back cover 130 is referred to as a second air gap. A thickness Z5 of the second air gap 7200 may be greater than a thickness Z1 of the first air gap 6500.

Figure 85:
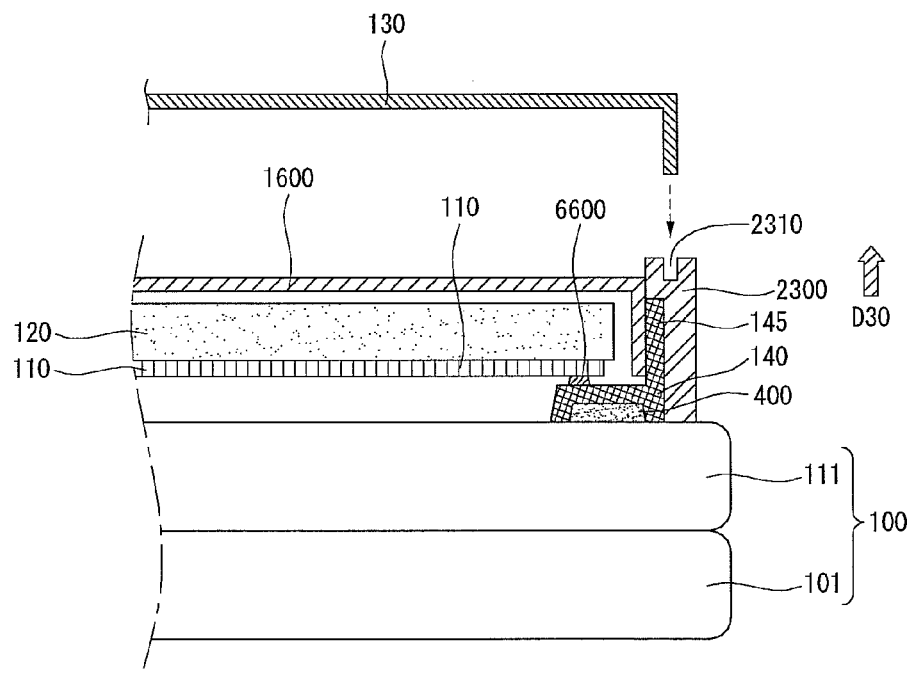

As shown in FIG. 85, the auxiliary bracket 2300 may be connected to the bracket 140, and the back cover 130 may be fixed to the auxiliary bracket 2300. Preferably, a groove 2310 may be formed in the auxiliary bracket 2300, and an end of the back cover 130 may be inserted into the groove 2310 of the auxiliary bracket 2300.

Figure 86:
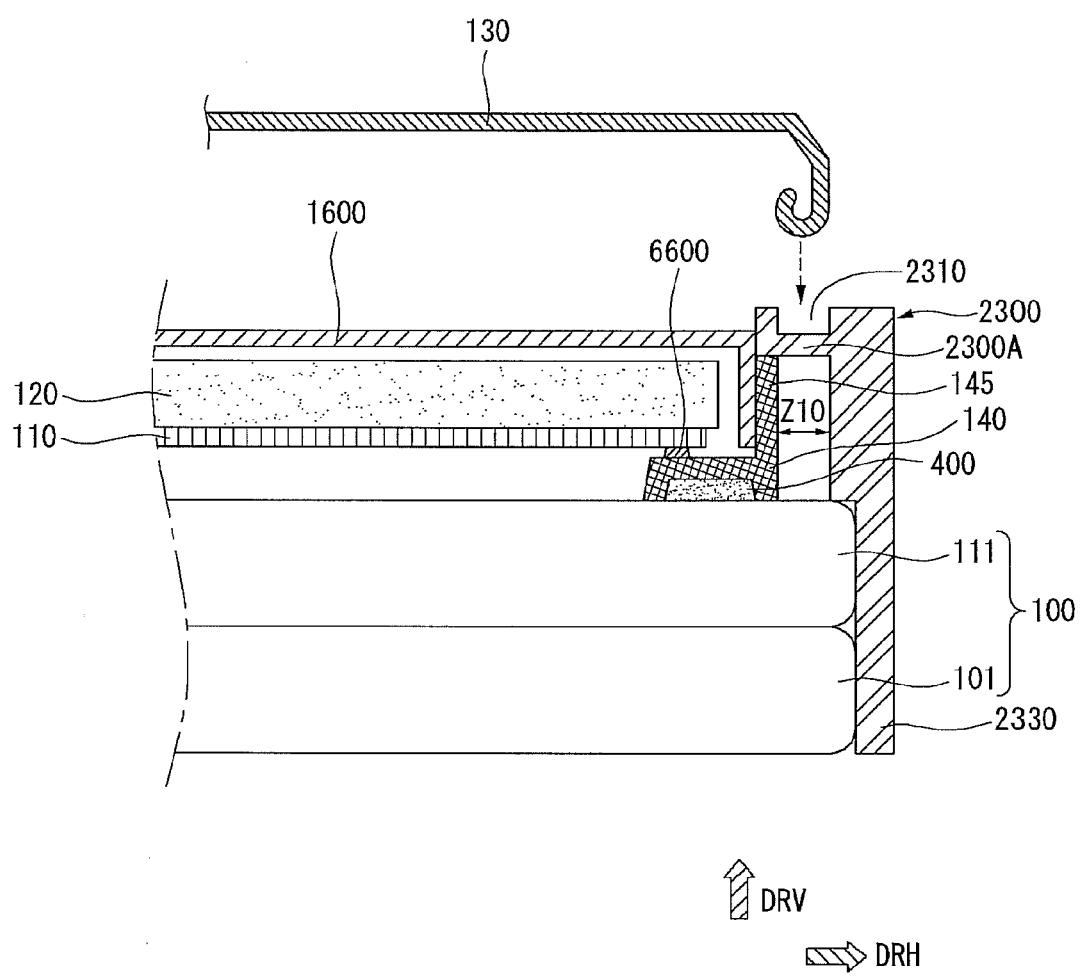

Preferably, as shown in FIG. 86, the end of the back cover 130 may be inserted into the groove 2310 of the auxiliary bracket 2300 in a state where the end of the back cover 130 rolls. In this instance, the coupling strength between the auxiliary bracket 2300 and the back cover 130 may be improved. The auxiliary bracket 2300 may be firmly connected to the back cover 130 without using a fastening member such as a screw.

The edge of the back cover 130 may roll in the direction toward the middle of the display panel 100, so as to prevent a foreign material from being penetrated into the display device, increase the productivity, and provide the attractive appearance of the display device.

The shape of the auxiliary bracket 2300 shown in FIG. 86 may be different from the shape of the auxiliary bracket 2300 shown in FIGS. 30 and 31. However, the auxiliary bracket 2300 shown in FIGS. 30 and 31 may be applied to the structure illustrated in FIG. 86. In other words, the shape of the auxiliary bracket 2300 is not limited in the embodiment of the invention.

Figure 87:
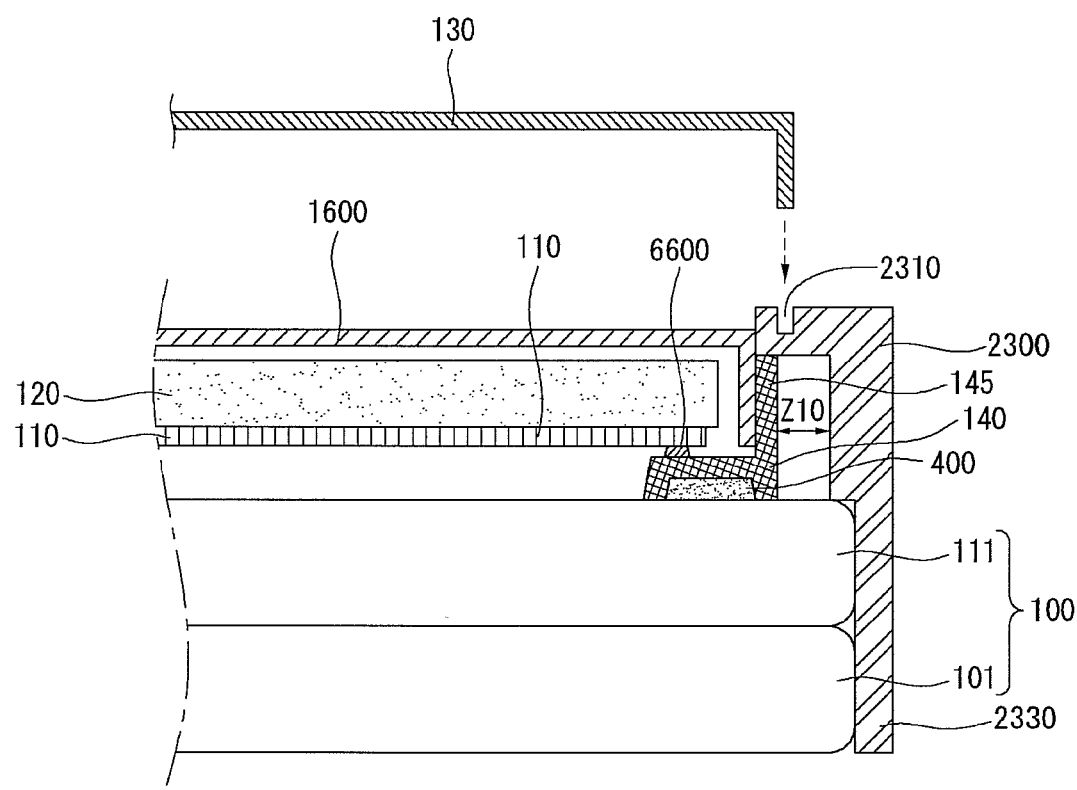

As shown in FIGS. 86 and 87, the auxiliary bracket 2300 may include a portion 2330 positioned on the side of the display panel 100. Thus, the auxiliary bracket 2300 may be referred to as a side cover. Considering this, the side cover 2300 may include a first portion 2330 parallel to the width direction (i.e., a vertical direction DRV) of the display panel 100 and a second portion 2300A which is connected to the first portion 2330 and is positioned parallel to the longitudinal direction (i.e., a horizontal direction DRH) of the display panel 100. Further, an end of the back cover 130 may be positioned in the second portion 2300A of the side cover 2300. A height of a groove 2310 of the side cover 2300 may be lower than the peripheral height. In other words, the second portion 2300A may include a low altitude part 2310 (i.e., the groove 2310), whose a height measured from the back surface of the back substrate 111 is lower than a maximum height of the first portion 2330.

The bracket 140 may be separated from the auxiliary bracket 2300 by a predetermined distance Z10 in a longitudinal direction D31 of the display panel 100. Namely, an air gap may be formed between the bracket 140 and the auxiliary bracket 2300 in the longitudinal direction D31 of the display panel 100. In other words, the bracket 140 may be separated from the side cover 2300 in the longitudinal direction D31 of the display panel 100. Hence, the attractive appearance of the display device may be provided, and the entire weight of the display device may be reduced. Further, because the auxiliary bracket 2300 is prevented from contacting the display panel 100, the damage of the display panel 100 may be prevented.

In other word, the auxiliary bracket 2300 includes a sidewall 2330 and an overhang portion 2300A extending in the horizontal direction DRH a first end portion of the sidewall 2330 covers the sides of the front and back substrates 101, 111. And, the overhang portion 2300A being provided at the second end portion of the side wall 2330 which opposite from the first end portion of the side wall 2330.

Figure 88:
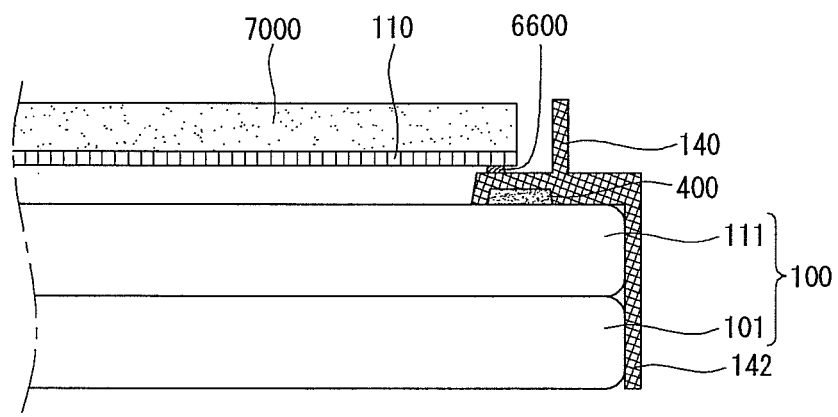

As shown in FIG. 88, when the optical layer 110 is positioned on the bracket 140, the bracket 140 may include a portion 142 positioned on the side of the display panel 100.

Figure 89:
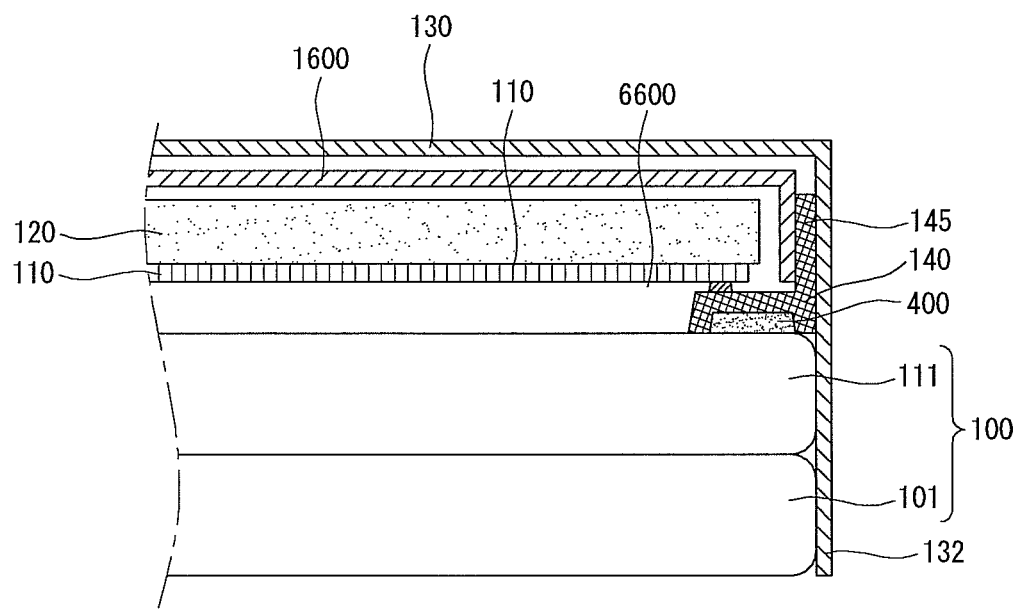

Alternatively, as shown in FIG. 89, the back cover 130 may extend to the side of the display panel 100. Namely, the back cover 130 may include a portion 132 positioned on the side of the display panel 100.

Figure 90:
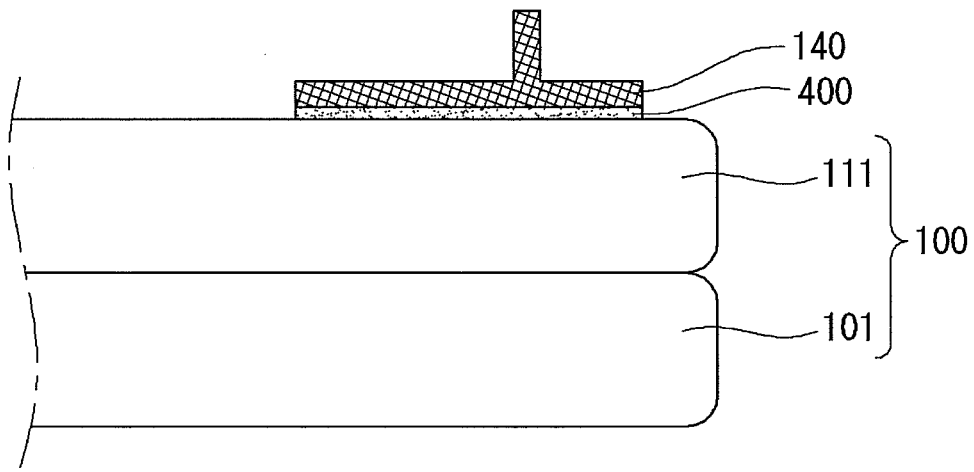

As shown in FIG. 90, the side of the adhesive layer 400 disposed between the back substrate 111 and the bracket 140 may be exposed. In this instance, the width of the adhesive layer 400 may increase, and thus the adhesive strength of the adhesive layer 400 may increase.

The adhesive layer 400 may be formed by coating an adhesive material between the back substrate 111 and the bracket 140. Alternatively, the adhesive layer 400 may be formed by attaching an adhesive sheet between the back substrate 111 and the bracket 140. For example, the adhesive layer 400 may be formed using a double sided adhesive tape as the adhesive sheet.

Figure 91:
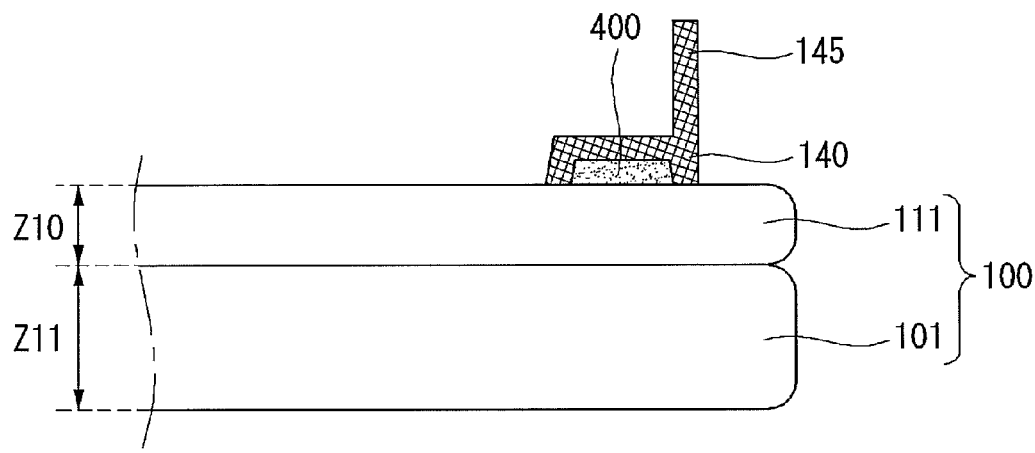

As shown in FIG. 91, a thickness Z11 of the front substrate 101 may be different from a thickness Z10 of the back substrate 111.

Because the edge of the front surface of the front substrate 101 may be exposed in the display device according to the embodiment of the invention, the thickness Z11 of the front substrate 101 may increase so as to prevent the damage of the front substrate 101. In this instance, the thickness Z11 of the front substrate 101 may be greater than the thickness Z10 of the back substrate 111.

FIGS. 92 to 104 illustrate another configuration of a display device according to an example embodiment of the invention. In the following description, the descriptions of the configuration and the structure described above are omitted.

Figure 92:
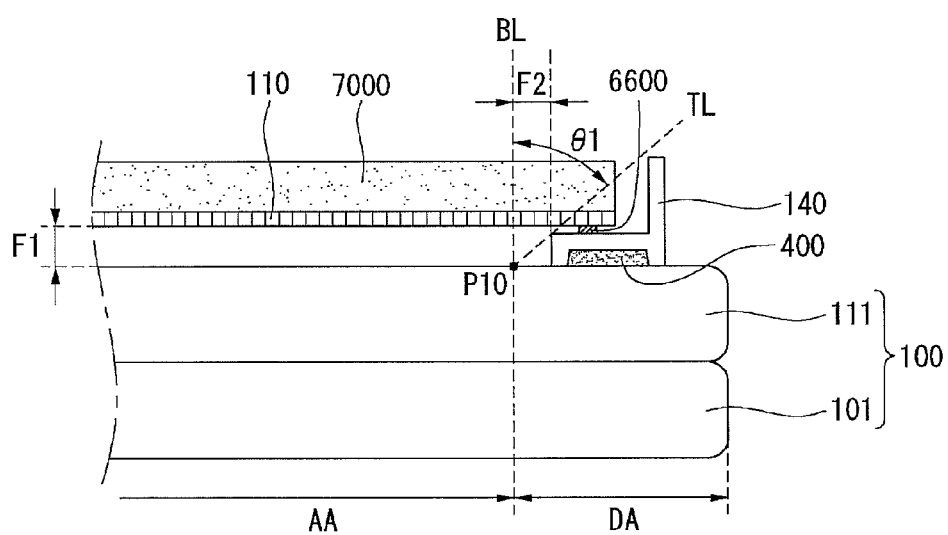
FIGS. 92 to 104 illustrate another configuration of a display device according to an example embodiment of the invention.

As shown in FIG. 92, the bracket 140 may be positioned in the dummy area DA outside the active area AA of the display panel 100. Hence, the bracket 140 may not overlap the display panel 100 in the width direction of the display panel 100. Namely, the bracket 140 is separated from an end P10 of the active area AA of the display panel 100 by a predetermined distance F2. As above, the screen distortion may be prevented by disposing the bracket 140 at a position separated from the active area AA of the display panel 100 by the predetermined distance F2.

If the user views the image displayed on the display panel in the direction oblique to the screen of the display panel, the image in a boundary between the active area AA and the dummy area DA may be distorted. However, when the bracket 140 is disposed at a position separated from the active area AA of the display panel 100 by the predetermined distance F2 as in the embodiment of the invention, the screen distortion may be prevented.

A distance F1 between the back substrate 111 and the optical layer 110 may vary depending on the distance F2 between the end P10 of the active area AA of the display panel 100 and the bracket 140.

As shown in FIG. 92, the distance F2 between a position P10 where a boundary line BL between the active area AA and the dummy area DA meets the back substrate 111 of the display panel 100 (i.e., the end P10 of the active area AA of the display panel 100) and the bracket 140 may be equal to or less than the distance F1 between the back substrate 111 and the optical layer 110. In this instance, the size of the dummy area DA, on which the image is not displayed, may be prevented from excessively increasing.

Further, when a normal line TL, which starts at the end P10 of the active area AA of the display panel 100 and meets the bracket 140, is drawn in FIG. 92, an angle θ1 between the normal line TL and the boundary line BL may be set to about 15° to 30°, so as to more efficiently prevent the screen distortion in the boundary between the active area AA and the dummy area DA and to prevent an excessive increase in the size of the dummy area DA.

There are various methods for dividing the display panel 100 into the active area AA and the dummy area DA.

Figure 93:
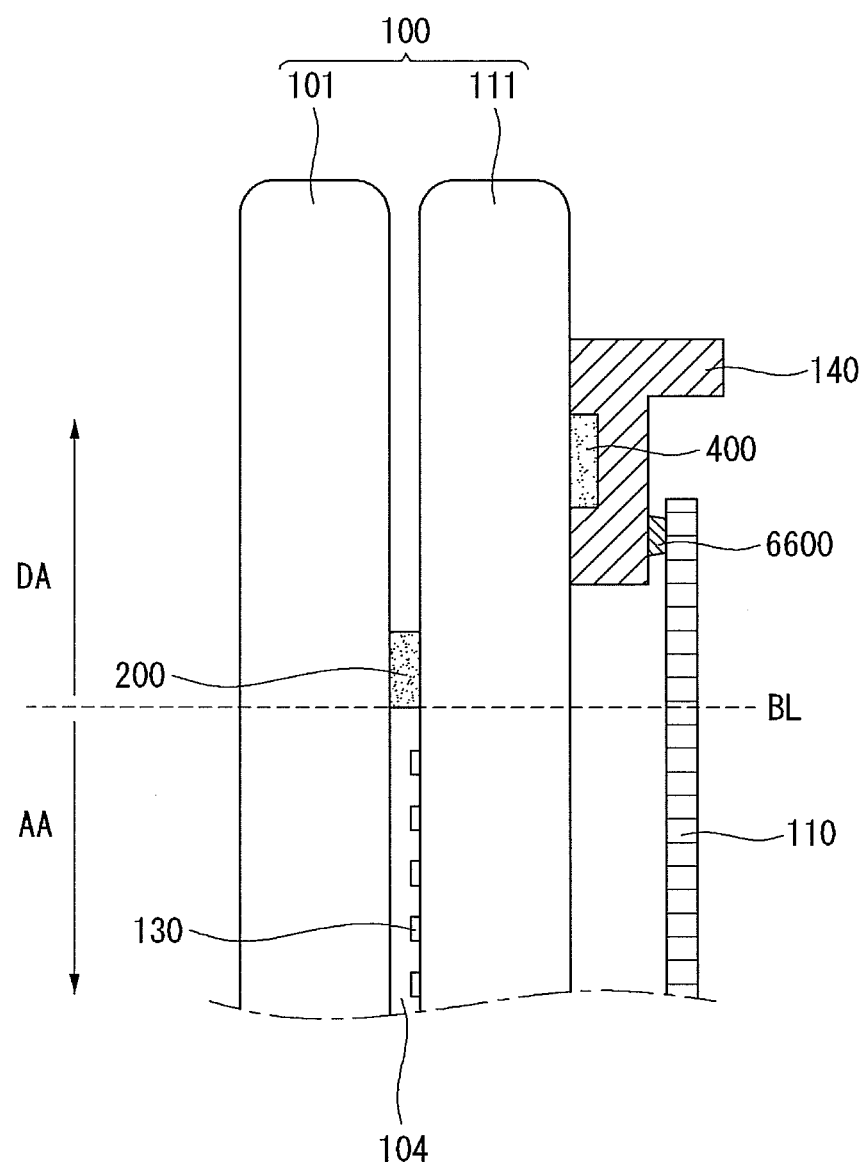

For example, as shown in FIG. 93, the display panel 100 may be divided into the active area AA and the dummy area DA by the seal part 200 between the front substrate 101 and the back substrate 111. More specifically, the area outside the seal part 200 may be assigned as the dummy area DA, and the area inside the seal part 200 may be assigned as the active area AA. In other words, the display panel 100 may be divided into the active area AA and the dummy area DA based on the inner surface of the cross section of the seal part 200, i.e., the surface contacting the liquid crystal layer 104.

Other methods may be used to divide the display panel 100 into the active area AA and the dummy area DA.

Figure 94:
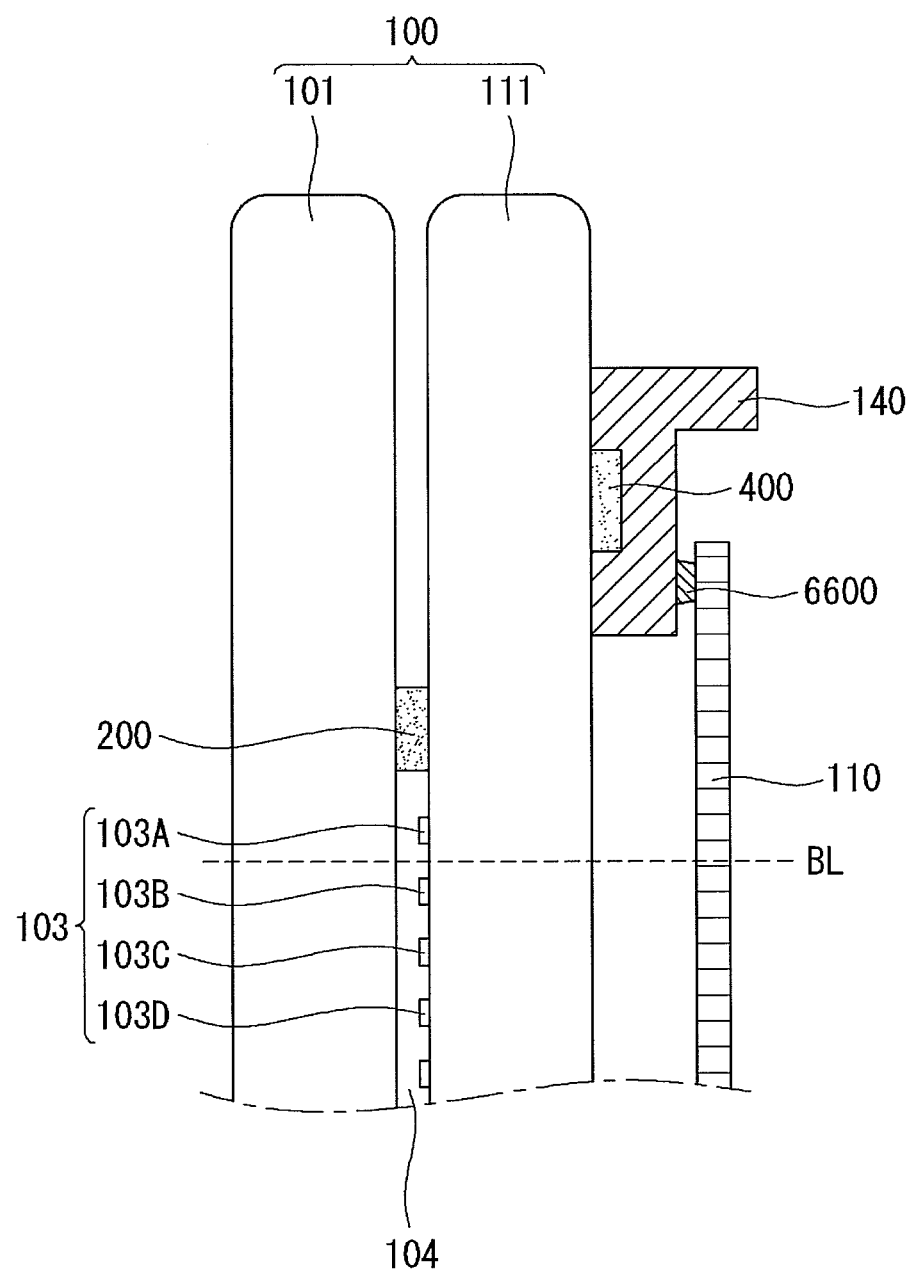

For example, as shown in FIG. 94, the active area AA may be positioned inside the seal part 200.

More specifically, a plurality of transistors 103 may be positioned inside the seal part 200. A first transistor 103A, which is the closest to the seal part 200 in the plurality of transistors 103, may be always maintained in an off-state irrespective of image data. Second, third, and fourth transistors 103B, 103C, and 103D, which are closer to the middle of the display panel 100 than the first transistor 103A, may perform turn-on and turn-off operations depending on the image data.

In this instance, a boundary line BL may be positioned between the first transistor 103A and the second transistor 103B. Namely, the display panel 100 may be divided into the dummy area DA and the active area AA by the first transistor 103A and the second transistor 103B.

Figure 95:
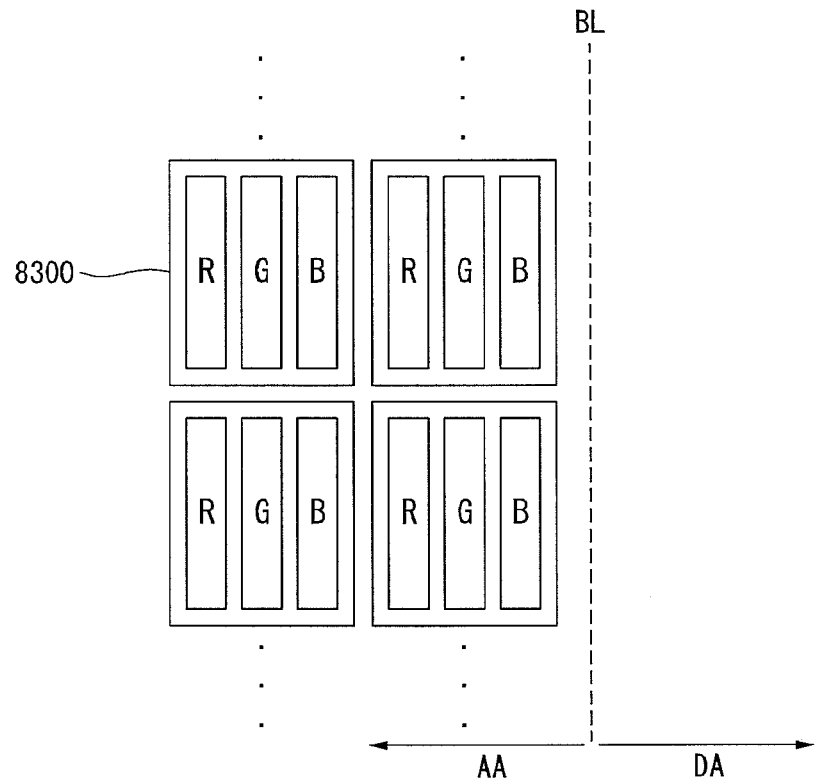

Alternatively, as shown in FIG. 95, the display panel 100 may be divided into the dummy area DA and the active area AA using an outermost pixel among a plurality of pixels 8300, which receives the data and displays the image, as a boundary.

Figure 96:
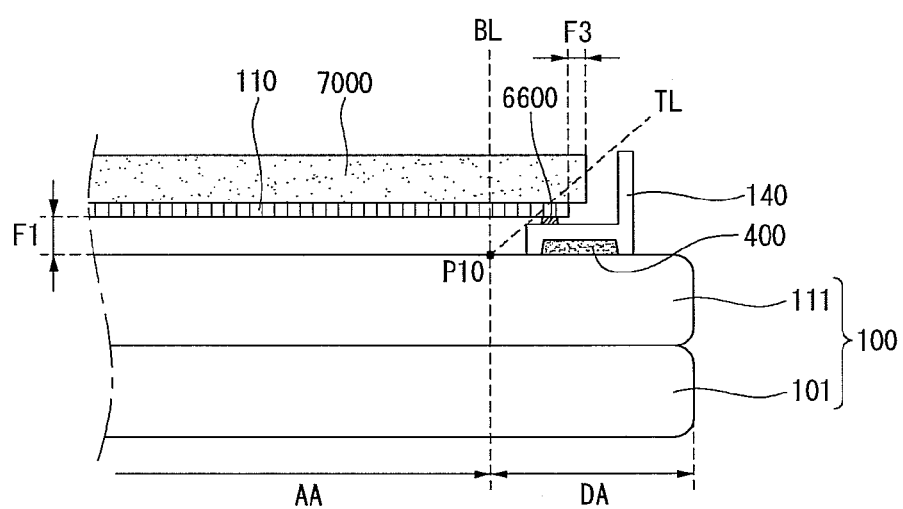

As shown in FIG. 96, the light guide plate 7000 on the optical layer 110 may protrude further than the optical layer 110 by a predetermined distance F3 in the outer direction of the display panel 100.

Figure 97:
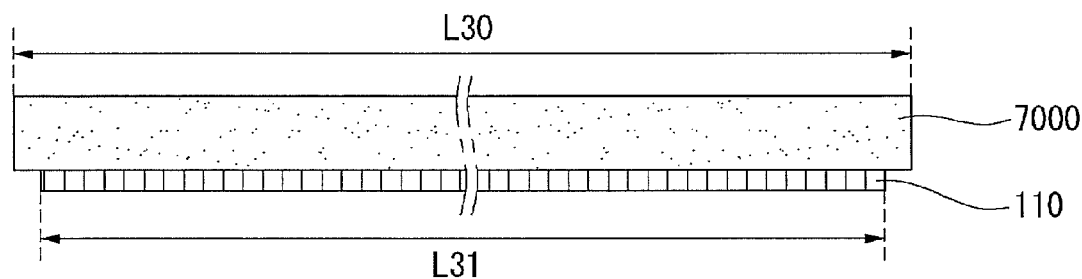

In this instance, as shown in FIG. 97, a total length L30 of the light guide plate 7000 may be longer than a total length L31 of the optical layer 110.

As above, when the total length L30 of the light guide plate 7000 is longer than the total length L31 of the optical layer 110, the length of the optical layer 110 may be reduced while preventing the screen distortion in the boundary between the active area AA and the dummy area DA. Hence, the manufacturing cost may be reduced.

As shown in FIG. 96, because the optical layer 110 is disposed under the light guide plate 7000, the normal line TL, which passes through the end P10 of the active area AA of the display panel 100 and meets the bracket 140, may pass through both the optical layer 110 and the light guide plate 7000 even if the length of the optical layer 110 is short.

Figure 98:
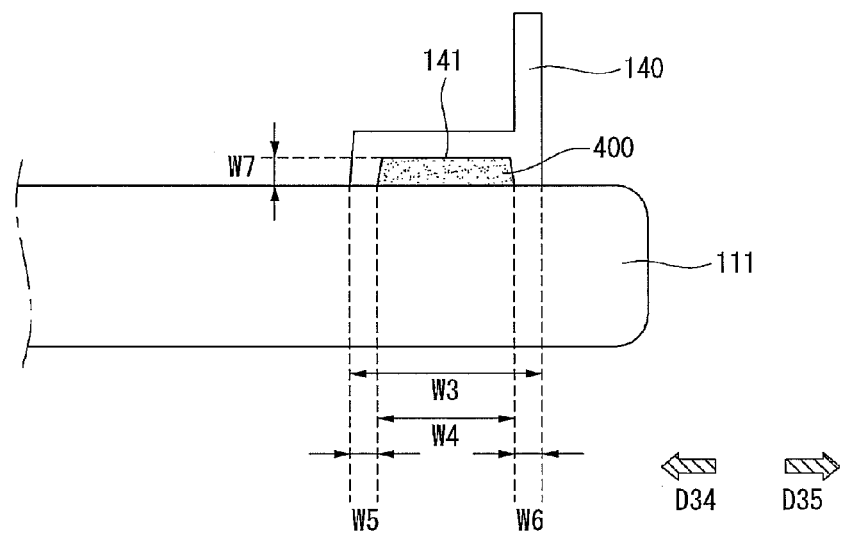

As shown in FIG. 98, a width W3 of the bracket 140 may be greater than a width W4 of the adhesive layer 400. In this instance, the bracket 140 may include a groove 141, and the adhesive layer 400 may be formed in the groove 141 of the bracket 140.

A distance W5 (hereinafter, referred to as a first distance W5) between one end of the groove 141 and one end of the bracket 140 in the direction D34 toward the middle of the display panel 100 may be less than a width W4 of the groove 141 based on the groove 141 of the cross section of the bracket 140.

Further, a distance W6 (hereinafter, referred to as a second distance W6) between another end of the groove 141 and another end of the bracket 140 in the direction D35 away from the middle of the display panel 100 may be less than the width W4 of the groove 141 based on the groove 141 of the cross section of the bracket 140.

In this instance, because the size of the groove 141 of the bracket 140 may increase, the adhesive strength between the bracket 140 and the back substrate 111 may be improved.

Further, a sum (W5+W6) of the first distance W5 and the second distance W6 may be less than the width W4 of the groove 141. In this instance, because the size of the groove 141 of the bracket 140 may further increase, the adhesive strength between the bracket 140 and the back substrate 111 may be further improved.

The first distance W5 may be equal to or less than the second distance W6. In this instance, the distance between the end P10 of the active area AA of the display panel 100 and the bracket 140 may increase while maintaining the strength of the bracket 140. Hence, the screen distortion may be further prevented.

A width W4 of the adhesive layer 400 may be greater than a thickness W7 of the adhesive layer 400. In this instance, the adhesive strength between the bracket 140 and the back substrate 111 may be improved.

The adhesive layer 400 may be formed using an UV adhesive or an adhesive of polyurethane material.

An example of forming the adhesive layer 400 using the UV adhesive is described below.

Figure 99:
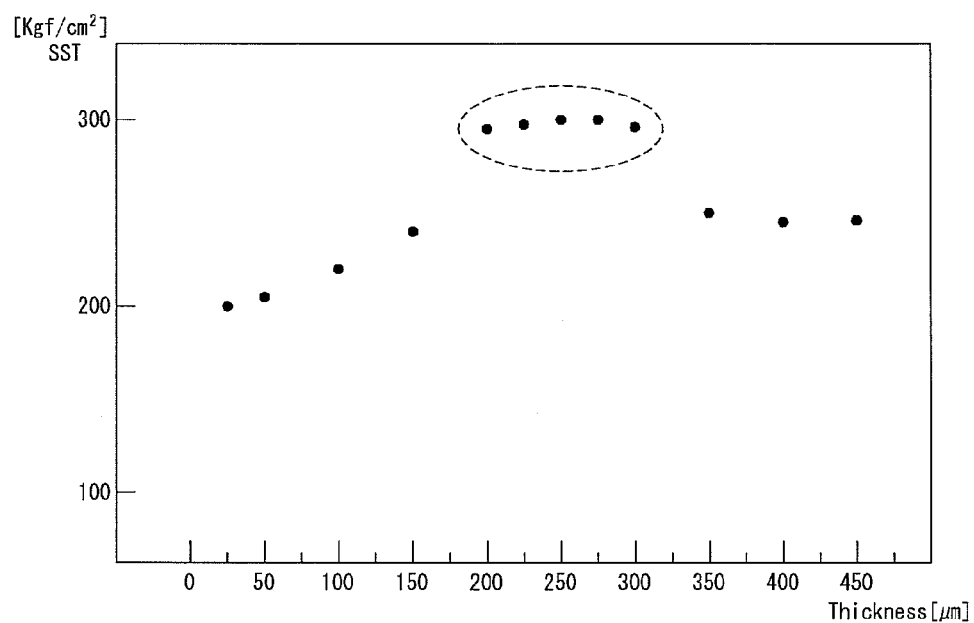

FIG. 99 is a graph indicating a shear strength (SST) measured when the thickness of the adhesive layer 400 formed of the UV adhesive is about 25 μm to 450 μm. In FIG. 99, the adhesive layer 400 was formed by irradiating UV light having an intensity of 4500±1500 mJ/cm² onto the UV adhesive.

As shown in FIG. 99, when the thickness of the adhesive layer 400 formed of the UV adhesive is about 200 μm to 300 μm, the shear strength had a maximum value.

Thus, it may be preferable that when the adhesive layer 400 is formed of the UV adhesive, the thickness of the adhesive layer 400 is about 200 μm to 300 μm.

An example of forming the adhesive layer 400 using the adhesive of polyurethane material is described below.

Figure 100:
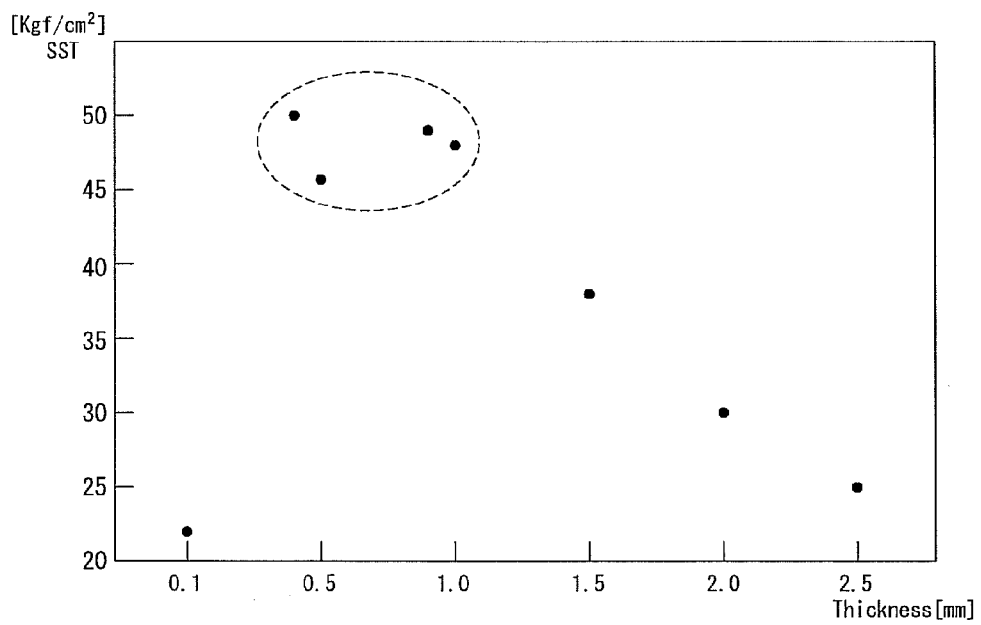

FIG. 100 is a graph indicating a shear strength (SST) measured when the thickness of the adhesive layer 400 formed of the adhesive of polyurethane material is about 0.1 mm to 2.5 mm. In FIG. 100, curing time of the adhesive layer 400 was about 15 hours, and the pressure was about 1 kg/cm².

As shown in FIG. 100, when the thickness of the adhesive layer 400 formed of the adhesive of polyurethane material is about 0.4 mm to 1.0 mm, the shear strength had a maximum value.

Thus, it may be preferable that when the adhesive layer 400 is formed of the adhesive of polyurethane material, the thickness of the adhesive layer 400 is about 0.4 mm to 1.0 mm.

Figure 101:
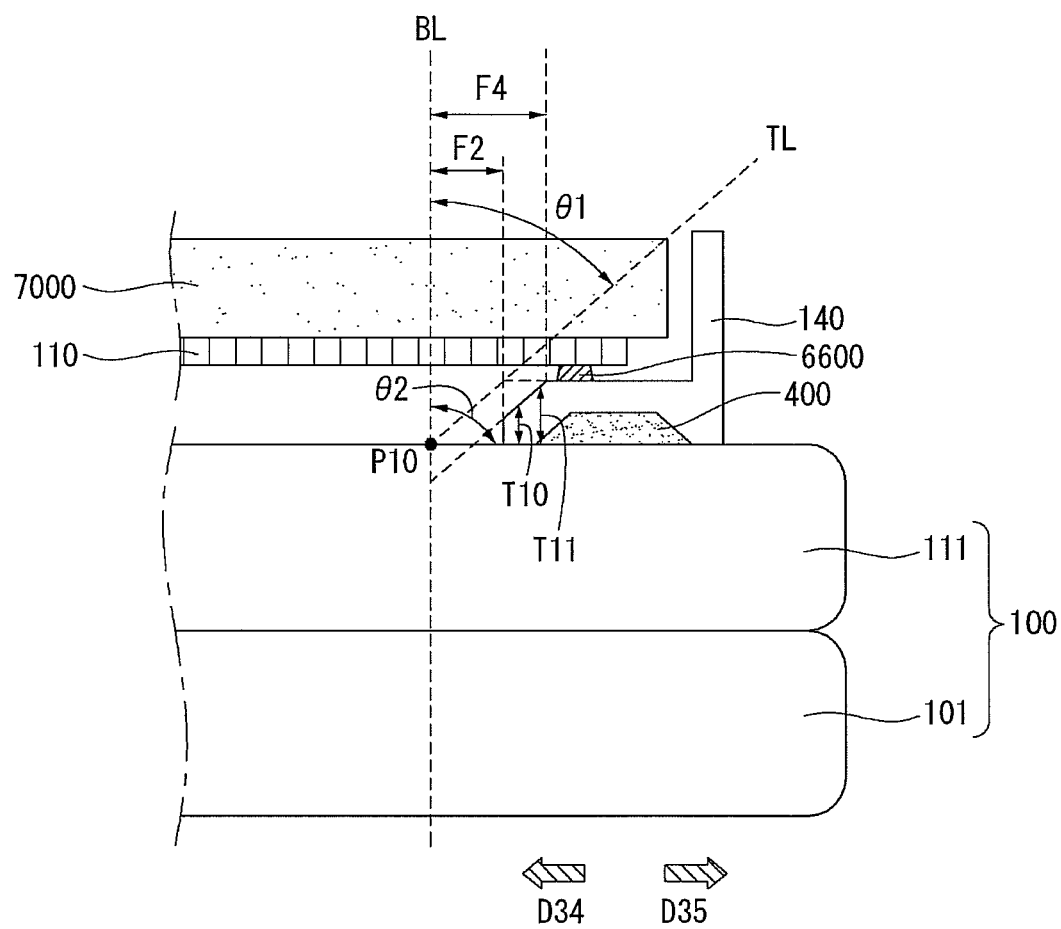

As shown in FIG. 101, one surface of the bracket 140 may have the shape of an oblique line. For example, the side surface of the cross section of the bracket 140 in the direction D34 toward the middle of the display panel 100 may have the shape of the oblique line when viewed from the back substrate 111.

In this instance, the distance F2 between the end P10 of the active area AA of the display panel 100 and the bracket 140 in an area where the bracket 140 is adjacent to the back substrate 111 may be less than the distance F2 in an area where the bracket 140 is adjacent to the optical layer 110. Namely, the distance F2 may decrease as it goes from the back substrate 111 to the optical layer 110. Thus, because the block of light resulting from the bracket 140 may be reduced, the screen distortion may be reduced.

Further, while the normal line TL shown in FIG. 92 contacts the bracket 140, the normal line TL shown in FIG. 101 does not contact the bracket 140. In this instance, as shown in FIG. 101, a height of the cross section of the bracket 140 may gradually decrease as the bracket 140 goes to the middle direction D34 of the display panel 100. More specifically, the height of the cross section of the bracket 140 may gradually decrease from T11 to T10 as the bracket 140 goes to the middle direction D34 of the display panel 100.

Figure 102:
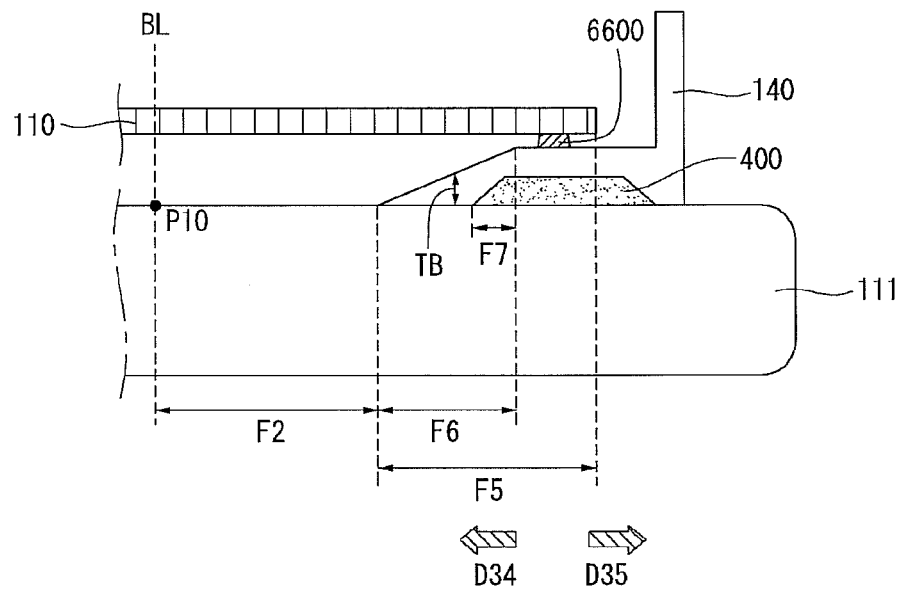

As shown in FIG. 102, the adhesive layer 400 may overlap the optical layer 110 in the width direction of the display panel 100. A reason why the adhesive layer 400 may overlap the optical layer 110 is because one side of the bracket 140 may have the shape of the oblique line and the bracket 140 may move close to the middle of the display panel 100.

As shown in FIG. 102, a first portion F5 of the bracket 140 overlapping the optical layer 110 in the width direction of the display panel 100 may include a second portion F6, whose a height TB gradually decreases as it goes in the middle direction D34 of the display panel 100. The second portion F6 may overlap a portion F7 of the adhesive layer 400 in the width direction of the display panel 100.

A width of the second portion F6 may be less than the shortest distance F2 between the end P10 of the active area of the display panel 100 and the bracket 140, so as to reduce the screen distortion and to prevent an excessive increase in the size of the dummy area DA.

Figure 103:
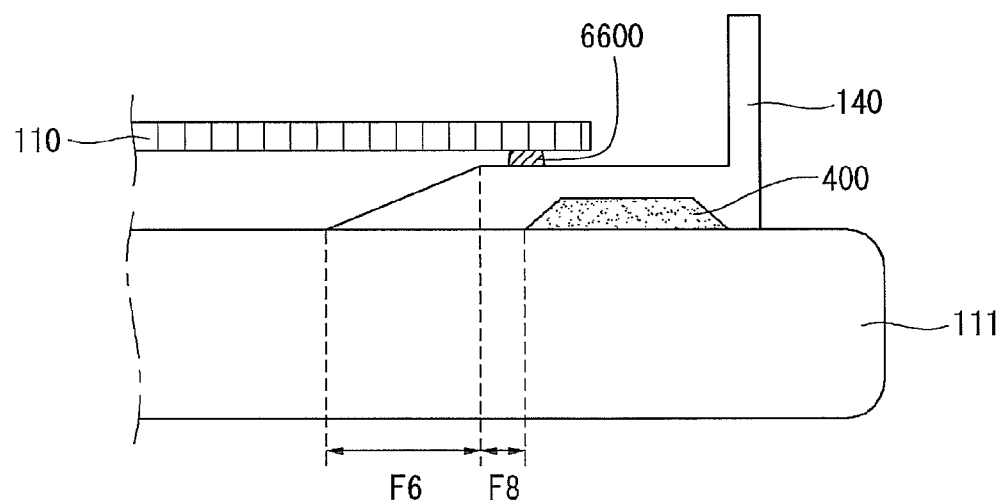

Alternatively, as shown in FIG. 103, the second portion F6 of the bracket 140 does not overlap the adhesive layer 400 in the width direction of the display panel 100 and may be separated from the adhesive layer 400 by a predetermined distance F8.

Figure 104:
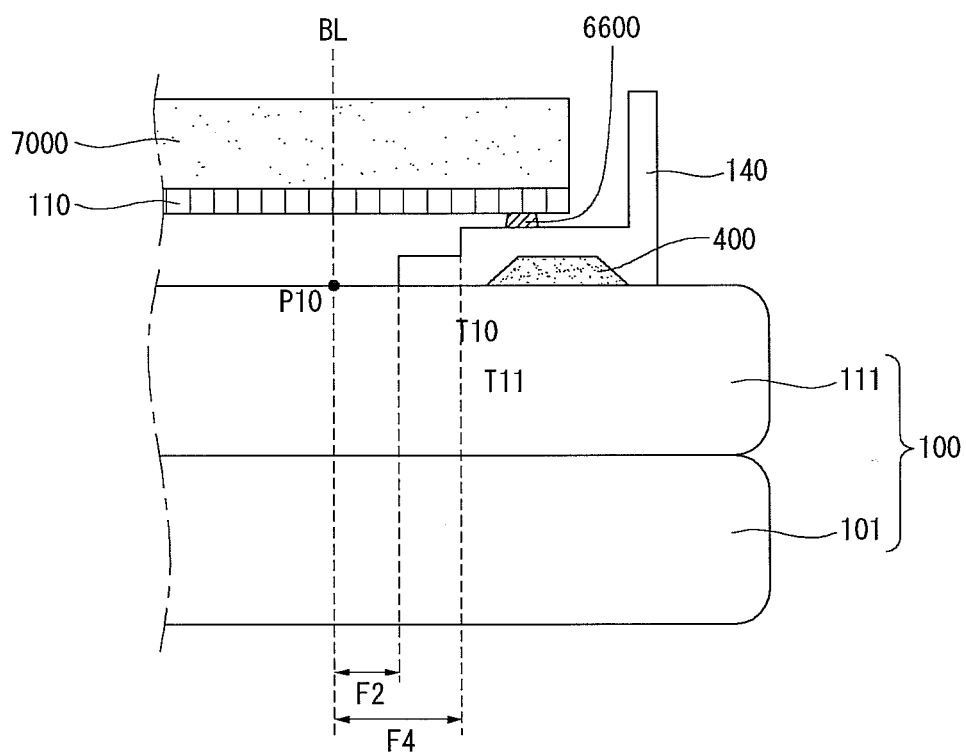

Alternatively, as shown in FIG. 104, one side of the bracket 140 may have a step shape.

Hereinafter, an image display using the display device according to the embodiment of the invention is described. In the following description, the descriptions of the configuration and the structure described above are omitted.

The image display equipment disclosed herein is a smart image display equipment to which a computer assisted function is added depending on a broadcast receiving function. Thus, the smart image display equipment may faithfully perform the broadcast receiving function and also may perform an internet function. The smart image display equipment may be equipped with a user-friendly interface, such as an input device driven by a manual operation, a touch screen, or a spatial remote controller. The smart image display equipment may be connected to the internet and the computer by the support of wired/wireless internet function and thus may perform e-mail, web browsing, banking, games, etc. The standard universal operating system (OS) may be used for various functions disclosed herein.

Accordingly, because various applications may be freely added to or omitted in universal OS kernel in the image display equipment disclosed herein, various user-friendly functions may be performed. The image display equipment may be a network TV, HBBTV, and a smart TV, for example. If necessary, the image display equipment may be applied to smartphones.

Figure 105:
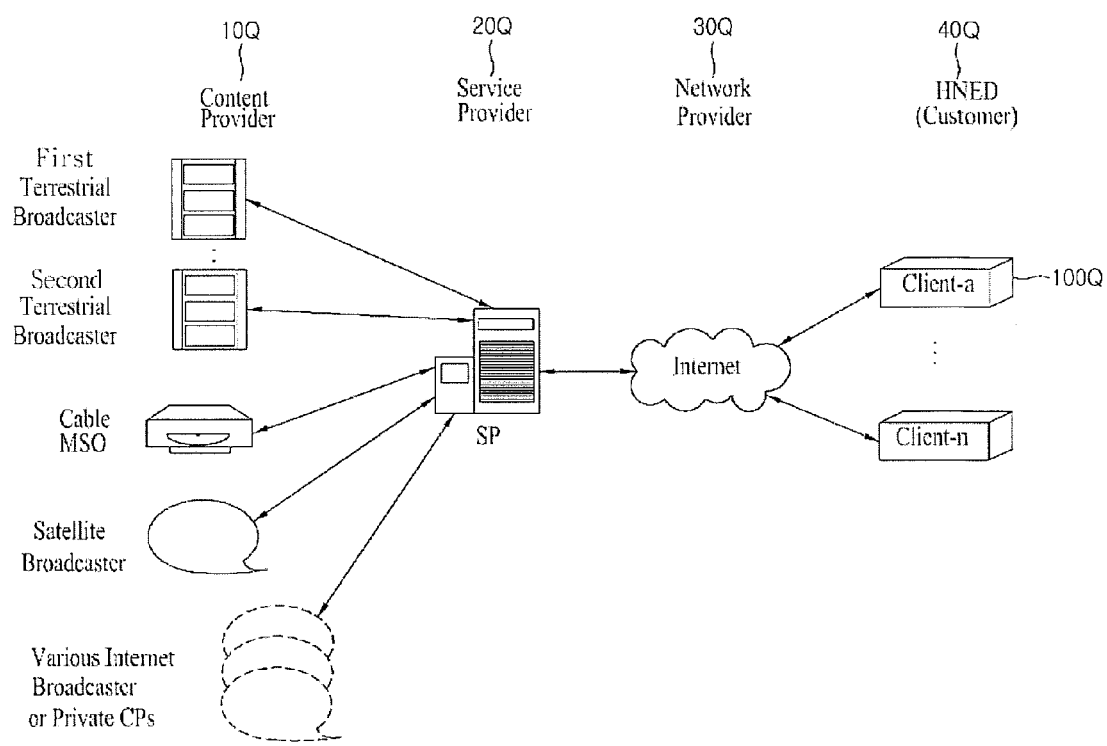
FIG. 105 schematically illustrates an example of a broadcasting system including an image display equipment according to an example embodiment of the invention.

FIG. 105 schematically illustrates an example of a broadcasting system including an image display equipment according to an example embodiment of the invention.

As shown in FIG. 105, a broadcasting system including an image display equipment according to the embodiment of the invention may be divided into a content provider 10Q, a service provider 20Q, a network provider 30Q, and HNED 40Q. For example, the HNED 40Q corresponds to a client 100Q being the image display equipment according to the embodiment of the invention. The client 100Q corresponds to the image display equipment according to the embodiment of the invention. The image display equipment is a network TV, a smart TV, IPTV, etc.

The content provider 10Q manufactures various contents and provides them. As shown in FIG. 105, examples of the content provider 10Q include terrestrial broadcaster, cable system operator (SO), multiple system operator (MSO), satellite broadcaster, and interne broadcaster. The content provider 10Q may provide various applications in addition to broadcasting contents.

The service provider 20Q may configure the contents provided by the content provider 10Q as a service package and may provide the service package.

The network provider 30Q may provide a network for providing the service to the client 100Q. The client 100Q may construct Home Network End User (HNED) and may be provided with the service.

The client 100Q may provide the contents through the network. In this instance, unlike the configuration described above, the client 100Q may be a content provider, and the content provider 10Q may receive the contents from the client 100Q. Further, interactive content service or data service is available.

Figure 106:
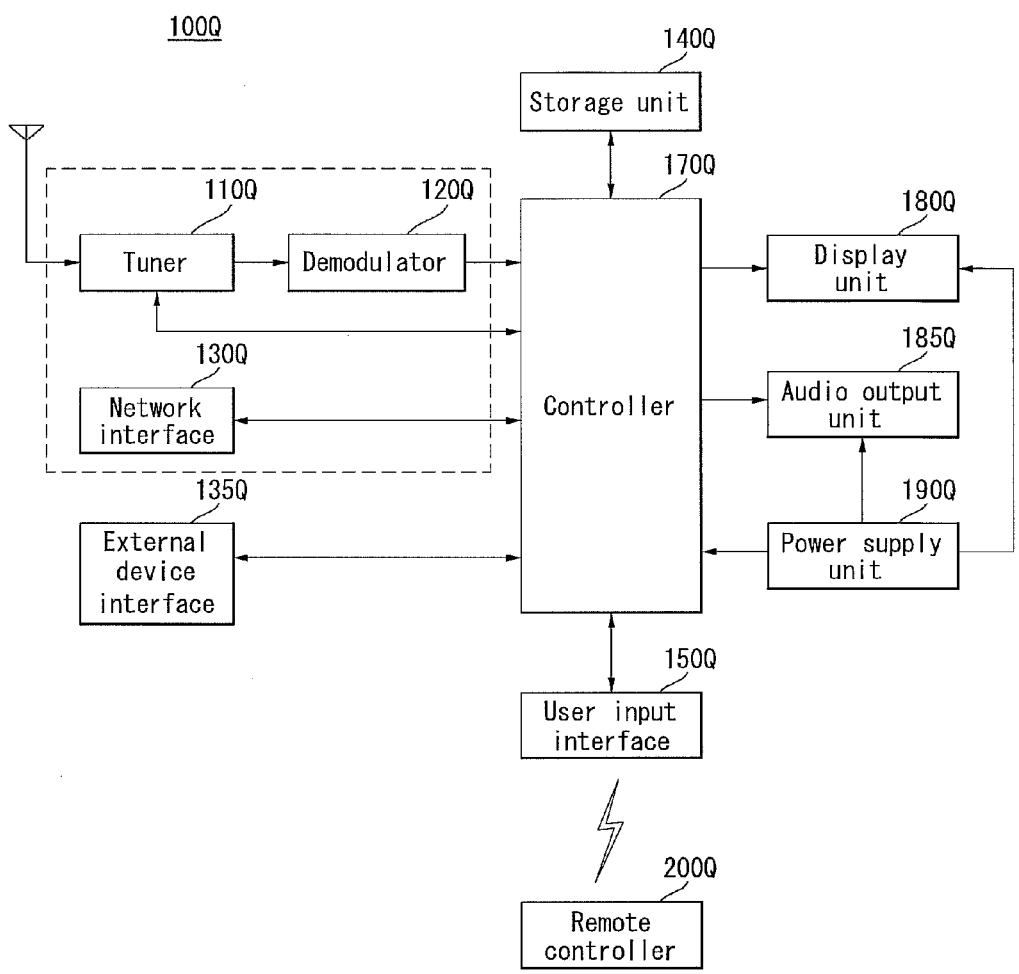
FIG. 106 illustrates another example of an image display equipment according to an example embodiment of the invention.

FIG. 106 illustrates another example of an image display equipment according to an example embodiment of the invention.

As shown in FIG. 106, an image display equipment 100Q according to the embodiment of the invention may include a broadcasting receiving unit 105Q, an external device interface 135Q, a storage unit 140Q, a user input interface 150Q, a controller 170Q, a display unit 180Q, an audio output unit 185Q, a power supply unit 190Q, and a photographing unit (not shown). The broadcasting receiving unit 105Q may include a tuner 110Q, a demodulator 120Q, and a network interface 130Q.

The demodulator 120Q receives a digital IF signal converted by the tuner 110Q and performs a demodulating operation.

The demodulator 120Q performs the demodulating operation and a channel decoding operation and then may output a stream signal. The stream signal may be a multiplexed signal of an image signal, a voice signal, and a data signal.

The stream signal output by the demodulator 120Q may be input to the controller 170Q. The controller 170Q performs demultiplexing, image/voice signal processing, etc. Then, the controller 170Q outputs an image to the display unit 180Q and outputs a voice to the audio output unit 185Q.

The external device interface 135Q may connect an external device to the image display equipment 100Q. For this, the external device interface 135Q may include an audio-visual (AV) input/output unit (not shown) or a wireless communication unit (not shown).

The external device interface 135Q may be connected to an external device, such as a digital versatile disk (DVD), a blu-ray disc (BD), a gaming device, a camera, a camcorder, and a computer (or notebook), in wired/wireless manner. The external device interface 135Q transfers the image, the voice, or the data signal received from the outside to the controller 170Q of the image display equipment 100Q through the external device connected to the external device interface 135Q. The image, the voice, or the data signal processed by the controller 170Q may output to the external device connected to the external device interface 135Q. For this, the external device interface 135Q may include the AV input/output unit (not shown) or the wireless communication unit (not shown).

The AV input/output unit may include an USB terminal, a composite video banking sync (CVBS) terminal, a component terminal, a S-video (analog) terminal, a digital visual interface (DVI) terminal, a high definition multimedia interface (HDMI) terminal, a RGB terminal, a D-SUB terminal, etc., so that the image signal and the voice signal of the external device can be input to the image display equipment 100Q.

The short-range wireless communication unit may perform near field communication with other electronic equipments. The image display equipment 100Q may be network-connected with other electronic equipments according to communication standard, such as Bluetooth, Radio Frequency Identification (RFID), Infrared Data Association (IrDA), Ultra Wideband (UWB), ZigBee, and Digital Living Network Alliance (DLNA).

The network interface 130Q provides an interface for connecting the image display equipment 100Q to a wired/wireless network including an internet network. The network interface 130Q may have an ethernet terminal, for example, for connecting the image display equipment 100Q to the wired network. Further, the network interface 130Q may use communication standards such as WLAN (Wireless LAN) (Wi-Fi), Wireless broadband (Wibro), World Interoperability for Microwave Access (Wimax), and High Speed Downlink Packet Access (HSDPA) for connecting the image display equipment 100Q to the wireless network.

The network interface 130Q may transmit or receive the data to or from another user or another electronic equipment through a network connected to the network interface 130Q or another network linked to the connected network. In particular, the network interface 130Q may transmit a portion of content data stored in the image display equipment 100Q to the user or the electronic equipment selected among other users or other electronic equipments previously registered in the image display equipment 100Q.

The storage unit 140Q may store a program for the signal processing of the controller 170Q and the control operation of the controller 170Q and may store the processed image signal, the processed voice signal, or the data signal.

FIG. 106 illustrates the image display equipment separately including the storage unit 140Q and the controller 170Q. Other configurations may be used for the image display equipment. For example, the controller 170Q may include the storage unit 140Q.

The user input interface 150Q transfers the signal the user inputs to the controller 170Q or transfers the signal received from the controller 170Q to the user.

For example, the user input interface 150Q may receive and process the control signal indicating the turn-on or turn-off operation, the channel selection, the screen setting, etc. from a remote controller 200Q based on various communication manners such as a RF communication manner and an infrared communication manner. Alternatively, the user input interface 150Q may operate so that the control signal from the controller 170Q is transmitted to the remote controller 200Q.

For example, the user input interface 150Q may transfer the control signal, which is input from a power key, a channel key, a volume key, a local key, etc., to the controller 170Q.

Further, for example, the user input interface 150Q may transfer the control signal input from a sensing unit (not shown) for sensing the user's gestures to the controller 170Q and may transmit the signal from the controller 170Q to the sensing unit. The sensing unit may include a touch sensor, a voice sensor, a position sensor, a motion sensor, etc.

The controller 170Q may perform the demultiplexing processing on the stream input through the tuner 110Q, the demodulator 120Q, or the external device interface 135Q or may perform the processing of demultiplexed signals, thereby generating or outputting the signals for outputting the image or the voice.

The image signal processed by the controller 170Q may be input to the display unit 180Q and may display an image corresponding to the image signal. Further, the image signal processed by the controller 170Q may be input to an external output device through the external device interface 135Q.

The voice signal processed by the controller 170Q may be output to the audio output unit 185Q. Further, the voice signal processed by the controller 170Q may be input to the external output device through the external device interface 135Q.

The display unit 180Q may convert the image signal, the data signal, and an OSD signal, which are processed by the controller 170Q, or the image signal and the data signal which are received from the external device interface 135Q, into red, green, and blue signals and may generate a driving signal.

The display unit 180Q may be a PDP, a LCD panel, an OLED display panel, a flexible display panel, a 3D display panel, etc.

The display unit 180Q may be configured as a touch screen and may be used as an input device in addition to an output device.

The audio output unit 185Q may receive the voice signal (for example, stereo signal, 3.1 channel signal, or 5.1 channel signal) processed by the controller 170Q and may output the voice. The audio output unit 185Q may be implemented as various types of speakers.

As described above, the image display equipment 100Q may further include a sensing unit (not shown) including at least one of a touch sensor, a voice sensor, a position sensor, and a motion sensor, so as to sense the user's gestures. The signal sensed by the sensing unit may be transferred to the controller 170Q through the user input interface 150Q.

The power supply unit 190Q supplies the power required in all of the components of the image display equipment 100Q.

The image display equipment 100Q disclosed herein may be a fixed image display equipment. Further, the image display equipment 100Q may be a digital broadcasting receiver capable of receiving at least one of ATSC type (8-VSB type) digital broadcasting, DVB-T type (COFDM type) digital broadcasting, and ISDB-T type (BST-OFDM type) digital broadcasting.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel including a front substrate and a back substrate;
   a backlight unit disposed in a rear of the display panel, the backlight unit including an optical layer positioned in rear of the display panel;
   a plurality of brackets attached to a non-display area of a back surface of the display panel, each of the plurality of brackets including a first portion disposed on a rear surface of the display panel and a second portion protruded from the first portion in a vertical direction;
   a groove formed on a first surface of the first portion of the bracket facing the rear surface of the display panel; and
   an adhesive layer disposed in the groove,
   wherein the second portion of the bracket is protruded from a second surface opposite to the first surface of the first portion in the vertical direction, and
   wherein a normal line passes through a borderline between an active area and a dummy area of the display panel, meets the bracket and passes through the optical layer.

2. The display device of claim 1,
   further comprising a light guide plate positioned in rear of the optical layer,
   wherein the normal line passes through both the optical layer and the light guide plate.

3. The display device of claim 1, wherein a first distance between an end of the groove and an end of the bracket in a direction toward a middle of the display panel is less than a width of the groove.

4. The display device of claim 3, wherein a second distance between an end of the groove and an end of the bracket in a direction away from the middle of the display panel is less than the width of the groove.

5. The display device of claim 4, wherein the second distance is equal to or greater than the first distance.

6. The display device of claim 4, wherein a sum of the first distance and the second distance is less than the width of the groove.

7. The display device of claim 1, wherein a width of the groove is greater than one half of a width of the bracket in a longitudinal direction of the display panel.

8. The display device of claim 1, wherein a width of the adhesive layer is greater than a thickness of the adhesive layer.

9. The display device of claim 1, wherein the backlight unit further includes:
   a frame in rear of the light guide plate; and
   a light source positioned on a side of the light guide plate.

10. The display device of claim 9, wherein a distance between the back substrate and the optical layer is equal to or greater than a distance between an end of the active area of the display panel and the bracket.

11. The display device of claim 1, wherein an edge of at least one side of a front surface of the display panel is exposed.

12. The display device of claim 11, wherein an edge of another side of the front surface of the display panel is hidden by a predetermined structure.

13. The display device of claim 1, further comprising a first polarizing film attached to the front substrate and a second polarizing film attached to the back substrate,
   wherein the plurality of brackets and the second polarizing film are separated from each other on the back surface of the display panel.

14. The display device of claim 13, wherein the plurality of brackets overlap the first polarizing film.

15. The display device of claim 13, wherein an end of at least one side of the first polarizing film extends further than the second polarizing film.

16. The display device of claim 13, wherein an end of at least one side of the front substrate extends further than the back substrate.

17. The display device of claim 13, wherein the display panel further includes a blocking member positioned at an edge of a front surface of the front substrate.

18. The display device of claim 17, wherein a width of the blocking member is greater than a width of each of the plurality of brackets.

19. The display device of claim 17, wherein the blocking member overlaps the plurality of brackets.

20. A display device comprising:
   a display panel having a first substrate and a second substrate, the display panel having an active area and a dummy area, and a borderline point is a point on a surface of the second substrate between the active area and the dummy area;

a backlight unit on the display panel, the backlight unit including an optical layer on the display panel;

a plurality of brackets attached to a non-display area of the surface of the second substrate, at least one bracket including a first bracket portion on the surface of the second substrate and a second bracket portion to protrude from a first surface of the first bracket portion in a vertical direction;

a groove on a second surface of the first bracket portion facing the surface of the second substrate; and an adhesive layer in the groove, wherein a normal line extends from the borderline through the optical layer and to the bracket.

* * * * *